United States Patent
Streicher et al.

(10) Patent No.: US 7,151,114 B2
(45) Date of Patent: Dec. 19, 2006

(54) USE OF SUBSTITUTED 2-PHENYLBENZIMIDAZOLES AS MEDICAMENTS

(75) Inventors: Ruediger Streicher, Biberach (DE); Juergen Mack, Biberach (DE); Rainer Walter, Biberach (DE); Ingo Konetzki, Warthausen (DE); Thomas Trieselmann, Warthausen (DE); Volkhard Austel, Biberach (DE)

(73) Assignee: Boehringer Ingelheim International GmbH, Ingelheim (DE)

( * ) Notice: Subject to any disclaimer, the term of this patent is extended or adjusted under 35 U.S.C. 154(b) by 194 days.

(21) Appl. No.: 10/744,830

(22) Filed: Dec. 23, 2003

(65) Prior Publication Data

US 2005/0014810 A1    Jan. 20, 2005

Related U.S. Application Data

(60) Provisional application No. 60/499,522, filed on Sep. 2, 2003.

(30) Foreign Application Priority Data

Jan. 9, 2003    (DE) ................ 103 00 398

(51) Int. Cl.
*A61K 31/4184* (2006.01)
*C07D 235/18* (2006.01)

(52) U.S. Cl. .................... 514/394; 548/310.7
(58) Field of Classification Search ............. 548/310.7; 514/394
See application file for complete search history.

(56) References Cited

U.S. PATENT DOCUMENTS 3,080,282 A * 3/1963 Shunk ................ 514/394

FOREIGN PATENT DOCUMENTS

| WO | WO 00/26192 | 5/2000 |
|---|---|---|
| WO | WO 01/47883 | 7/2001 |
| WO | WO 02/04425 | 1/2002 |

OTHER PUBLICATIONS

Aicher, Thomas D., et al., Triterpene and Diterpene Inhibitors of Pyruvate Dehydrogenase Kinase (PDK); Bioorganic & Medicinal Chemistrt Letters 9 (1999) 2223-2228.
Keiji, Kubo, et. al., Benzimidazole derivatives as neovascularization inhibitors and pharmaceutical compositions containing them.; American Chemical Society, 2004, Takeda Chemical Industries, Ltd., Japan XP-002280055.

* cited by examiner

Primary Examiner—Laura L. Stockton
(74) Attorney, Agent, or Firm—Michael P. Morris; Mary-Ellen Devlin; Anthony P. Bottino

(57) ABSTRACT

The present invention relates to the use of a substituted 2-phenylbenzimidazole of formula I

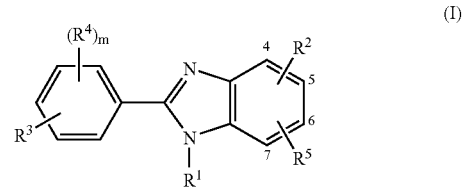

wherein $R^1$, $R^2$, $R^3$, $R^4$, $R^5$ and m have the meanings given in the claims, for the preparation of a medicament for the treatment or prevention of diseases involving glucagon receptors, as well as new compounds of formula I wherein $R^1$ is a group of formula

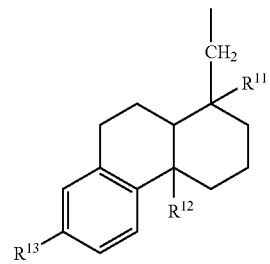

9 Claims, No Drawings

USE OF SUBSTITUTED 2-PHENYLBENZIMIDAZOLES AS MEDICAMENTS

The present invention relates to the use of substituted 2-phenylbenzimidazoles for the preparation of a medicament for the treatment or prevention of diseases involving glucagon receptors, as well as new substituted 2-phenylbenzimidazoles in which the substituent of the nitrogen atom in the 1- position of the benzimidazole group is a dehydroabietyl group.

Diabetes is a complex disease characterised by hyperglycaemia caused by a lack of insulin production or insufficient insulin activity. The metabolic complications of diabetes—hyperglycaemia and ketosis—are linked to the relative or absolute increase in the ratio of glucagon to insulin. Consequently, glucagon is a hyperglycaemic factor which brings about the rise in the blood sugar.

Therefore, suitable antagonists which block the glucagon receptor are agents for treating diabetes, by inhibiting the production of glucose in the liver and reducing the glucose levels in the patient.

Various publications disclose peptidic and non-peptidic glucagon receptor antagonists (McCormick et al., Curr. Pharm. Des. 7, 1451 (2001) a summary). In, particular, the inhibition of the glucagon-stimulated glucose production in humans by Bay 27-9955 has been reported (Petersen et al., Diabetologia 44, 2018 (2001)).

The aim of the present invention was to indicate new non-peptidic active substances which are suitable as highly effective glucagon receptor antagonists for the treatment of diabetes.

2-Phenylbenzimidazoles are already known. Thus, for example, International Patent Application WO 02/04425 proposes substituted benzimidazoles which may be substituted by phenyl, inter alia, in the 2- position, as viral polymerase inhibitors, particularly for the treatment or prevention of HCV infections. There is no reference of any kind to the possibility of using such compounds as glucagon receptor antagonists.

Surprisingly it has now been found that certain substituted 2-phenylbenzimidazoles are highly effective glucagon receptor antagonists.

The present invention thus relates to the use of a substituted 2-phenylbenzimidazole of formula I

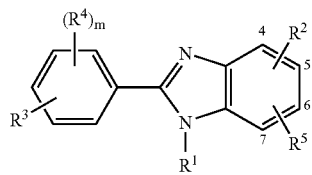

(I)

wherein
$R^1$ denotes optionally substituted $C_1$–$C_6$ alkyl, $C_6$–$C_{10}$ aryl or $C_3$–$C_8$ cycloalkyl, the substituents being selected from the group consisting of halogen, $C_6$–$C_{10}$ aryl, $C_3$–$C_8$ cycloalkyl groups and a group of formula

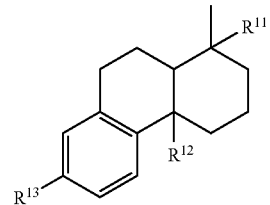

wherein
$R^{11}$, $R^{12}$ and $R^{13}$ each independently of one another denote hydrogen or halogen or $C_1$–$C_6$ alkyl, $C_1$–$C_6$ alkoxy, $C_1$–$C_6$ haloalkyl or $C_1$–$C_6$ haloalkoxy;
$R^2$ denotes hydrogen, $C_1$–$C_6$ alkyl, $C_3$–$C_7$-cycloalkyl, $C_2$–$C_6$ alkenyl, $C_6$–$C_{10}$ aryl-$C_1$–$C_6$ alkyl, $C_6$–$C_{10}$ aryl-$C_2$–$C_6$ alkenyl, carboxy or cyano; or in the 4-, 5- or 6- position of the benzimidazole denotes optionally substituted $C_6$–$C_{10}$ aryl, to which a $C_6$–$C_{10}$-aryl or a 5- or 6-membered heteroaryl may be fused, or an optionally substituted, optionally benzo- or cyclohexano-fused 5- or 6-membered heteroaryl group, wherein
the substituents are selected from the group consisting of halogen, $C_1$–$C_6$ alkyl, $C_1$–$C_6$ alkenyl, $C_1$–$C_6$ alkoxy, $C_1$–$C_6$ alkylthio, $C_1$–$C_6$ alkylsulphinyl, $C_1$–$C_6$ alkylsulphonyl, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ haloaryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, 5- to 7-membered cycloalkyleneimino-$C_1$–$C_6$ alkyl, morpholino-$C_1$–$C_6$ alkyl, piperazino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonylamino, aminocarbonyl, $C_1$–$C_6$ alkylaminocarbonyl, di-($C_1$–$C_6$ alkyl)-aminocarbonyl, carboxy-$C_1$–$C_6$ alkyl, carboxy-$C_1$–$C_6$ alkoxy, carboxy, cyano, formyl, hydroxy, nitro; or
denotes a carboxamide group of formula —CO—$NR^{21}R^{22}$ in the 5- or 6- position of the benzimidazole, while
$R^{21}$ and $R^{22}$ each independently of one another denote hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, $C_6$–$C_{10}$ aryl, $C_3$–$C_8$ cycloalkyl, $C_5$–$C_8$ cycloalkenyl, $C_3$–$C_8$ cycloalkyl-$C_1$–$C_6$ alkyl, $C_3$–$C_8$ cycloalkyloxy-$C_1$–$C_6$ alkyl, $C_3$–$C_8$ cycloalkanoyl-$C_1$–$C_6$ alkyl, $C_5$–$C_8$ cycloalkenyl-$C_1$–$C_6$ alkyl, adamantyl-$C_1$–$C_6$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl; or
one of the groups $R^{21}$ and $R^{22}$ denotes hydrogen or $C_1$–$C_6$ alkyl, and the other denotes $C_6$–$C_{10}$ aryl-$C_1$–$C_6$ alkyl, wherein
$C_6$–$C_{10}$ aryl may carry a benzo-fused aromatic 6-membered ring or one or more substituents, while the substituents are selected from the group consisting of halogen, $C_1$–$C_6$ alkyl, $C_1$–$C_6$ alkoxy, $C_1$–$C_6$-haloalkoxy, $C_6$–$C_{10}$ aryl, thiadiazolyl, $C_6$–$C_{10}$ aryloxy, hydroxy-$C_6$–$C_{10}$ aryloxy, $C_1$–$C_6$ alkoxycarbonyl, $C_1$–$C_6$ alkoxycarbonyl-$C_1$–$C_6$ alkyl, aminocarbonyl, aminosulphonyl, carboxy, amino, hydroxy, cyano and wherein $C_1$–$C_6$ alkyl may carry a hydroxy group; or one of the groups $R^{21}$ and $R^{22}$ denotes hydrogen or $C_1$–$C_6$ alkyl, and the other denotes a group of formula

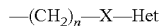
—(CH$_2$)$_n$—X—Het wherein
  n denotes 0 or an integer from 1 to 6,
  X denotes CO or a single bond and if n is other than 0 may also denote O, S or NH, and
  Het denotes an optionally substituted 5- or 6-membered heterocyclic group which may be substituted by nitro or di-($C_1$–$C_6$ alkoxy-$C_6$–$C_{10}$ aryl and wherein a CH$_2$ group may be replaced by a carbonyl group, and —(CH$_2$)$_n$— may be substituted by $C_1$–$C_6$-alkyl if n is other than 0; or $R^{21}$ and $R^{22}$ in each case form, with the enclosed nitrogen atom, an optionally substituted, optionally benzo- or cyclohexano-fused 5- to 7-membered heterocyclic ring wherein one or two CH$_2$ groups may be replaced by O, S or NR$^{23}$, wherein R$^{23}$ denotes hydrogen, $C_1$–$C_6$ alkyl, adamantyl-$C_1$–$C_6$ alkyl, $C_6$–$C_{10}$ aryl-$C_1$–$C_6$-alkyl, $C_6$–$C_{10}$ aryl, $C_1$–$C_6$ alkoxy-$C_1$–$C_6$ aryl, or di-($C_1$–$C_6$ alkoxy)-$C_1$–$C_6$ aryl and the optionally benzo-condensed ring may carry one or two $C_1$–$C_6$ alkoxy groups, $R^3$ denotes a group of formula A—(E)$_r$—Y(E)$_r$—Z— wherein
  A denotes a tetrazolyl, amido, methylamido, amidino or hydroxyamidino group or a group of formula —COOR$^{31}$, wherein R$^{31}$ denotes hydrogen or $C_1$–$C_6$ alkyl; and
  E denotes a $C_1$–$C_6$ alkylenediyl or $C_2$–$C_6$ alkenylenediyl group optionally mono- or polysubstituted by halogen or hydroxy or a $C_2$–$C_6$ alkynylenediyl group; and
  Y denotes O, S, CO—NH, CO—N(CH$_3$), NH—CO, N(CH$_3$)—CO, NH, N(CH$_3$) or a single bond; and
  Z denotes O, S, NH, N(CH$_3$) or a single bond; and
  r denotes 0 or 1; or denotes a 4–7-membered cycloalkyleneimino or 4 to 7-membered cycloalkyleneiminocarbonyl group, which is substituted by the abovementioned group A;

$R^4$ in each case independently of one another denotes halogen, cyano, nitro, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, amino, $C_1$–$C_6$ alkanoylamino or $C_1$–$C_6$ haloalkanoylamino or when m=2 denotes a fused-on aromatic 6-membered ring;

$R^5$ denotes a hydrogen atom, halogen, hydroxy or $C_1$–$C_6$ alkoxy; and m denotes 0 or is an integer from 1 to 4;

for the preparation of a medicament for the treatment or prevention of diseases involving glucagon receptors.

The invention further relates to substituted 2-phenylbenzimidazoles of formula IA

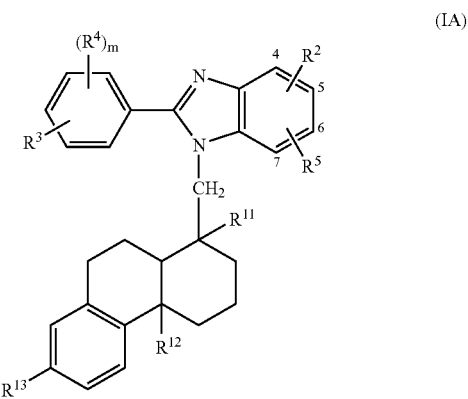

(IA)

wherein
$R^{11}$, $R^{12}$ and $R^{13}$ each independently of one another denote hydrogen or halogen or $C_1$–$C_6$ alkyl, $C_1$–$C_6$ alkoxy, $C_1$–$C_6$ haloalkyl or $C_1$–$C_6$ haloalkoxy;

$R^2$ denotes hydrogen, $C_1$–$C_6$ alkyl, $C_3$–$C_7$-cycloalkyl, $C_2$–$C_6$ alkenyl, $C_6$–$C_{10}$ aryl-$C_1$–$C_6$ alkyl, $C_6$–$C_{10}$ aryl-$C_2$–$C_6$ alkenyl, carboxy or cyano; or in the 4-, 5- or 6- position of the benzimidazole denotes optionally substituted $C_6$–$C_{10}$ aryl, to which a $C_6$–$C_{10}$-aryl or a 5- or 6-membered heteroaryl may be fused, or an optionally substituted, optionally benzo- or cyclohexano-fused 5- or 6-membered heteroaryl group, while
  the substituents are selected from the group consisting of halogen, $C_1$–$C_6$ alkyl, $C_2$–$C_6$ alkenyl, $C_1$–$C_6$ alkoxy, $C_1$–$C_6$ alkylthio, $C_1$–$C_6$ alkylsulphinyl, $C_1$–$C_6$ alkylsulphonyl, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ haloaryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, 5–7-membered cycloalkyleneimino-$C_1$–$C_6$ alkyl, morpholino-$C_1$–$C_6$ alkyl, piperazino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonylamino, aminocarbonyl, $C_1$–$C_6$ alkylaminocarbonyl, di-($C_1$–$C_6$ alkyl)-aminocarbonyl, carboxy-$C_1$–$C_6$ alkyl, carboxy-$C_1$–$C_6$ alkoxy, carboxy, cyano, formyl, hydroxy, nitro, or denotes a carboxamide group of formula —CO—NR$^{21}$R$^{22}$ in the 5- or 6- position of the benzimidazole, while
  $R^{21}$ and $R^{22}$ each independently of one another denote hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, $C_6$–$C_{10}$ aryl, $C_3$–$C_8$ cycloalkyl, $C_5$–$C_8$ cycloalkenyl, $C_3$–$C_8$ cycloalkyl-$C_1$–$C_6$ alkyl, $C_3$–$C_8$ cycloalkyloxy-$C_1$–$C_6$ alkyl, $C_3$–$C_8$ cycloalkanoyl-$C_1$–$C_6$ alkyl, $C_5$–$C_8$ cycloalkenyl-$C_1$–$C_6$ alkyl, adamantyl-$C_1$–$C_6$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl; or one of the groups $R^{21}$ and $R^{22}$ denotes hydrogen or $C_1$–$C_6$ alkyl, and the other denotes $C_6$–$C_{10}$ aryl-$C_1$–$C_6$ alkyl, wherein $C_6$–$C_{10}$ aryl may carry a benzo-fused aromatic 6-membered ring or one or more substituents, the substituents being selected from the group consisting of halogen, $C_1$–$C_6$ alkyl, $C_1$–$C_6$ alkoxy, $C_1$–$C_6$-haloalkoxy, $C_6$–$C_{10}$ aryl, thiadiazolyl, $C_6$–$C_{10}$ aryloxy, hydroxy-$C_6$–$C_{10}$ aryloxy, $C_1$–$C_6$ alkoxycarbonyl, $C_1$–$C_6$ alkoxycarbonyl-$C_1$–$C_6$ alkyl, aminocarbonyl, aminosulphonyl, carboxy, amino, hydroxy, cyano and $C_1$–$C_6$ alkyl may carry a hydroxy group; or one of the groups $R^{21}$ and $R^{22}$ denotes hydrogen or $C_1$–$C_6$ alkyl, and the other denotes a group of formula —$(CH_2)_n$—X—Het wherein n denotes 0 or an integer from 1 to 6, X denotes CO or a single bond and if n is other than 0 may also denote O, S or NH, and Het denotes an optionally substituted 5- or 6-membered heterocyclic group which may be substituted by nitro or di-($C_1$–$C_6$ alkoxy-$C_6$–$C_{10}$ aryl and wherein a $CH_2$ group may be replaced by a carbonyl group, and —$(CH_2)_n$— may be substituted by $C_1$–$C_6$-alkyl if n is other than 0; or $R^{21}$ and $R^{22}$ in each case form, with the enclosed nitrogen atom, an optionally substituted, optionally benzo- or cyclohexano-fused 5–7-membered heterocyclic ring, wherein one or two $CH_2$ groups may be replaced by O, S or $NR^{23}$, wherein $R^{23}$ denotes hydrogen, $C_1$–$C_6$ alkyl, adamantyl-$C_1$–$C_6$ alkyl, $C_6$–$C_{10}$ aryl-$C_1$–$C_6$-alkyl, $C_6$–$C_{10}$ aryl, $C_1$–$C_6$ alkoxy-$C_1$–$C_6$ aryl or di-($C_1$–$C_6$ alkoxy)-$C_1$–$C_6$ aryl and the optionally benzo-condensed ring may carry one or two $C_1$–$C_6$ alkoxy groups, $R^3$ denotes a group of formula A—(E)$_r$—Y—(E)$_r$—Z— wherein

A denotes a tetrazolyl, amido, methylamido, amidino or hydroxyamidino group or a group of formula —$COOR^{31}$, wherein $R^{31}$ denotes hydrogen or $C_1$–$C_6$ alkyl; and E denotes a $C_1$–$C_6$ alkylenediyl or $C_2$–$C_6$ alkenylenediyl group optionally mono- or polysubstituted by halogen or hydroxy or a $C_2$–$C_6$ alkynylenediyl group; and Y denotes O, S, CO—NH, CO—N($CH_3$), NH—CO, N($CH_3$)—CO, NH, N($CH_3$) or a single bond; and Z denotes O, S, NH, N($CH_3$) or a single bond; and r denotes 0 or 1; or denotes a 4- to 7-membered cycloalkyleneimino or 4- to 7-membered cycloalkyleneiminocarbonyl group which is substituted by the abovementioned group A;

$R^4$ in each case independently of one another represents halogen, cyano, nitro, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, amino, $C_1$–$C_6$ alkanoylamino or $C_1$–$C_6$ haloalkanoylamino or where m=2 denotes a fused-on aromatic 6-membered ring;

$R^5$ denotes a hydrogen atom, halogen, hydroxy or $C_1$–$C_6$ alkoxy; and m denotes 0 or is an integer from 1 to 4.

The alkyl groups used (including those which are part of other groups, especially alkoxy) unless otherwise specified are branched or unbranched alkyl groups with 1 to 12 carbon atoms, preferably 1 to 8 carbon atoms, more preferably with 1 to 6 carbon atoms, particularly with 1 to 4 carbon atoms. The following are mentioned by way of example: methyl, ethyl, propyl, butyl, pentyl, hexyl etc. Unless otherwise specified, the above terms propyl, butyl, pentyl or hexyl include all the possible isomeric forms. For example, the term propyl includes the two isomeric groups n-propyl and iso-propyl, the term butyl includes n-butyl, iso-butyl, sec. butyl and tert.-butyl, the term pentyl includes iso-pentyl, neopentyl etc. In some cases common abbreviations such as Me for methyl, Et for ethyl etc may be used to denote the abovementioned alkyl groups.

Examples of haloalkyl groups (including those which are part of other groups, particularly haloalkoxy) unless otherwise specified include branched and unbranched haloalkyl groups with 1 to 12 carbon atoms, preferably 1 to 6 carbon atoms, particularly preferably with 1 to 3 carbon atoms, which are substituted by at least one halogen atom, particularly a fluorine atom. Fluorinated groups of formula —$(CH_2)_p$—$(CF_2)_q$—Y are preferred wherein p denotes 0 or an integer from 1 to 4, q denotes an integer from 1 to 4, and Y denotes hydrogen or fluorine.

The following may be mentioned by way of example: trifluoromethyl, trifluoromethoxy, difluoromethoxy, perfluoroethyl, perfluoropropyl, 2,2,2-trifluoroethyl, 2,2,2-trifluoroethoxy, 1,1,1-trifluoroprop-2-yl, etc.

Suitable alkenyl groups (including those which are part of other groups) are branched and unbranched alkenyl groups with 2 to 8 carbon atoms, preferably 2 to 6 carbon atoms, particularly 2 to 4 carbon atoms, provided that they have at least one double bond, for example the aforementioned alkyl groups provided that they have at least one double bond, such as for example vinyl (provided that no unstable enamines or enolethers are formed), propenyl, iso-propenyl, butenyl, pentenyl, hexenyl.

Suitable alkadienyl groups (including those which are part of other groups) are alkadienyl groups with 4 to 12 carbon atoms, preferably 4 to 8 carbon atoms, particularly 4 to 6 carbon atoms, provided that they have at least two double bonds, for example butadienyl, pentadienyl and hexadienyl.

Suitable cycloalkyl groups (including those which are part of other groups) are cycloaliphatic groups with 3 to 8 carbon atoms, preferably 3 to 6 carbon atoms, particularly 4 to 6 carbon atoms, such as for example cyclopropyl, cyclobutyl, cyclopentyl, cyclohexyl.

The term halogen generally denotes fluorine, chlorine, bromine or iodine.

Suitable aryl groups (including those which are part of other groups, particularly aryloxy or aryl-alkyl) are, unless otherwise specified, aromatic groups with 6 to 10 carbon atoms, preferably 6 carbon atoms. The following are mentioned by way of example: phenyl or naphthyl, which may be substituted by 1 to 5 substituents, preferably 1 to 2 substituents selected from among halogen, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, piperidyl-$C_1$–$C_6$ alkyl, morpholino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonylamino, aminocarbonyl, $C_1$–$C_6$ alkylaminocarbonyl, di-($C_1$–$C_6$ alkyl)-aminocarbonyl, carboxy-$C_1$–$C_6$ alkyl, carboxy-$C_1$–$C_6$ alkoxy, carboxy, cyano, formyl, hydroxy and nitro.

The term "5- or 6-membered heterocyclic group containing nitrogen, oxygen and/or sulphur" as used in connection with the group $R^2$, generally denotes an aromatic or saturated group with 5 or 6 ring atoms, at least one ring atom being a heteroatom selected from among N, O and S, which may optionally be fused to another ring system.

The term "5- to 7-membered heterocyclic ring" as used for the group formed by $R^{21}$ and $R^{22}$ together with the enclosed nitrogen atom, generally denotes a saturated nitrogen-containing group with 5 to 6 ring atoms which may optionally comprise one or more heteroatoms selected from among N, O and S.

Examples of particularly preferred 5- or 6-membered, saturated or unsaturated heterocycles which may contain nitrogen, oxygen or sulphur as heteroatoms, unless otherwise stated in the definitions, may include, for example, furan, tetrahydrofuran, tetrahydrofuranone, γ-butyrolactone, α-pyran, γ-pyran, dioxolane, tetrahydropyran, dioxane, thiophene, dihydrothiophene, thiolane, dithiolane, pyrrole, pyrroline, pyrrolidine, pyrazole, pyrazoline, pyrazolidine, imidazole, imidazoline, imidazolidine, triazole, tetrazole, pyridine, piperidine, pyridazine, pyrimidine, pyrazine, piperazine, triazine, tetrazine, morpholine, thiomorpholine, diazepan, oxazole, isoxazole, oxazine, thiazole, isothiazole, thiadiazole, oxadiazole and pyrazolidine, while the heterocyclic group may be substituted as in the definitions.

Compounds of general formula I may have acid groups, mainly carboxyl groups, and/or basic groups such as e.g. amino functions. Compounds of general formula I may therefore be present as internal salts, as salts with pharmaceutically acceptable inorganic acids such as hydrochloric acid, sulphuric acid, phosphoric acid, sulphonic acid or organic acids (such as for example maleic acid, fumaric acid, citric acid, tartaric acid or acetic acid) or as salts with pharmaceutically acceptable bases such as alkali or alkaline earth metal hydroxides or carbonates, zinc or ammonium hydroxides or organic amines such as e.g. diethylamine, triethylamine, triethanolamine etc.

The compounds according to the invention may occur as racemates or mixtures of diastereomers but may also be obtained as pure enantiomers or diastereomers, i.e. in the (R) or (S) form. Compounds of formula IA wherein the group $R_1$ is derived from (+)-dehydroabietylamine and thus has the same absolute configuration as dehydroabietylamine are preferred.

Preferred substituted 2-phenylbenzimidazoles of formula IA are those wherein $R^{11}$, $R^{12}$ and $R^{13}$ each independently of one another denote hydrogen or $C_1$–$C_6$ alkyl;

$R^2$ denotes hydrogen, $C_1$–$C_6$ alkyl, $C_3$–$C_7$-cycloalkyl, $C_2$–$C_6$-alkenyl, phenyl-$C_1$–$C_6$ alkyl, phenyl-$C_2$–$C_6$ alkenyl, carboxy or cyano; or in the 4, 5 or 6 position of the benzimidazole denotes optionally substituted phenyl, naphthyl, quinolinyl, isoquinolinyl or a 5- or 6-membered heteroaryl group selected from the group consisting of imidazolyl, pyrazolyl, furanyl, tetrahydrofuranyl, thiophenyl, thiazolyl, pyridyl, pyrimidyl, pyrazinyl, wherein the substituents are selected from the group consisting of fluorine, chlorine, bromine, $C_1$–$C_6$ alkyl, $C_2$–$C_6$ alkenyl, $C_1$–$C_6$ alkoxy, $C_1$–$C_6$ alkylthio, $C_1$–$C_6$ alkylsulphinyl, $C_1$–$C_6$ alkylsulphonyl, $C_1$–$C_6$ haloalkyl, $C_1$–$C_6$ haloalkoxy, $C_1$–$C_6$ alkanoyl, phenyl, halophenyl, phenoxy, phenyl-$C_1$–$C_6$ alkyl, phenyl-$C_1$–$C_6$ alkoxy, $C_5$–$C_6$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, piperidyl-$C_1$–$C_6$ alkyl, morpholino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonylamino, aminocarbonyl, $C_1$–$C_6$ alkylaminocarbonyl, di-($C_1$–$C_6$ alkyl)-aminocarbonyl, carboxy-$C_1$–$C_6$ alkyl, carboxy-$C_1$–$C_6$ alkoxy, carboxy, cyano, formyl, hydroxy and nitro; or denotes a carboxamide group of formula —CO—NR$^{21}$R$^{22}$ in the 5 or 6 position of the benzimidazole, wherein $R^{21}$ denotes hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, phenyl, $C_5$–$C_6$ cycloalkyl, $C_5$–$C_6$ cycloalkenyl, $C_5$–$C_8$ cycloalkyl-$C_1$–$C_6$ alkyl, $C_3$–$C_8$ cycloalkoxy-$C_1$–$C_6$ alkyl, $C_3$–$C_8$ cycloalkanoyl-$C_1$–$C_3$ alkyl, $C_5$–$C_8$ cycloalkenyl-$C_1$–$C_3$ alkyl, adamantyl-$C_1$–$C_2$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl or denotes phenyl-$C_1$–$C_6$ alkyl, wherein phenyl may carry a fused-on benzene ring or one or more substituents, the substituents being selected from the group consisting of fluorine, chlorine, bromine, $C_1$–$C_6$ alkyl, $C_1$–$C_6$ alkoxy, $C_1$–$C_6$-haloalkoxy, phenyl, thiadiazolyl, phenyloxy, hydroxyphenyloxy, $C_1$–$C_6$ alkoxycarbonyl, $C_1$–$C_6$ alkoxycarbonyl-$C_1$–$C_6$ alkyl, aminocarbonyl, aminosulphonyl, carboxy, amino, hydroxy, cyano and $C_1$–$C_6$ alkyl may carry a hydroxy group; and
$R^{22}$ denotes hydrogen or $C_1$–$C_3$ alkyl, or
one of the groups $R^{21}$ and $R^{22}$ denotes hydrogen or $C_1$–$C_3$ alkyl, and the other denotes a group of formula —(CH$_2$)$_n$—X—Het wherein
n denotes an integer from 1 to 4,
X denotes CO, O, S, NH or a single bond, and
Het denotes an optionally substituted 5- or 6-membered heterocyclic group selected from among imidazolyl, pyrrolidinyl, pyrrolidonyl, morpholino, furanyl, thienyl, pyridyl and pyrimidyl, while the above-mentioned heterocyclic group may be substituted by nitro or di-($C_1$–$C_6$ alkoxy)-phenyl; or
$R^{21}$ and $R^{22}$ in each case form, with the enclosed nitrogen atom, a tetrahydrobenzoazepino, morpholino, piperidyl, benzopiperidyl or cyclohexanopiperidyl group, or a piperazyl group optionally substituted by $C_1$–$C_6$ alkyl, adamantyl-$C_1$–$C_2$ alkyl, phenyl-$C_1$–$C_2$ alkyl, phenyl, $C_1$–$C_6$ alkoxyphenyl or di-($C_1$–$C_6$ alkoxy)-phenyl, $R^3$ denotes a group of formula A—(E)$_r$—Y—(E)$_r$—Z— wherein
A denotes a 1H-tetrazol-5-yl group or a group of formula —COOR$^{31}$, wherein R$^{31}$ denotes hydrogen or $C_1$–$C_6$ alkyl; and
E denotes a $C_1$–$C_4$ alkylenediyl or an ethenylenediyl group optionally mono- or polysubstituted by halogen or hydroxy or a butynyldiyl group; and
Y denotes O, S, CO—NH, CO—N(CH$_3$), NH—CO, N(CH$_3$)—CO, NH, N(CH$_3$) or a single bond; and
Z denotes O, S, NH, N(CH$_3$) or a single bond; and
r denotes 1; or
denotes pyrrolidinyl, piperidinyl, pyrrolidinylcarbonyl or piperidinylcarbonyl, each of which is substituted by the abovementioned group A;

$R^4$ in each case independently of one denotes another fluorine, chlorine, bromine, cyano, nitro, $C_1$–$C_3$ alkyl, $C_1$–$C_3$ haloalkyl, $C_1$–$C_3$ alkoxy, $C_1$–$C_3$-haloalkoxy, amino, $C_1$–$C_3$ alkanoylamino, $C_1$–$C_3$ haloalkanoylamino or, where m=2, a fused-on benzene ring;

$R^5$ denotes a hydrogen atom; and
m is 0 or an integer from 1 to 2.

Also preferred are substituted 2-phenylbenzimidazoles of formula IA wherein
$R^{11}$ and $R^{12}$ denote methyl, and
$R^{13}$ denotes isopropyl.

Particularly preferred are substituted 2-phenylbenzimidazoles of formula IA wherein
$R^2$ denotes hydrogen, $C_1$–$C_6$ alkyl, $C_3$–$C_7$-cycloalkyl, $C_2$–$C_6$ alkenyl, phenyl-$C_1$–$C_6$ alkyl, phenyl-$C_2$–$C_6$ alkenyl, carboxy or cyano; or
denotes optionally substituted phenyl, naphthyl, quinolinyl, isoquinolinyl, imidazolyl, furanyl, thiophenyl, thiazolyl, tetrahydrofuranyl, pyridyl, pyrimidinyl, pyrazinyl in the 4, 5 or 6 position of the benzimidazole, wherein the substituents are selected from the group consisting of fluorine, chlorine, bromine, $C_1$–$C_3$ alkyl, trifluoromethyl, $C_1$–$C_3$ alkoxy, $C_1$–$C_3$ alkylthio, $C_1$–$C_6$ alkylsulphinyl, $C_1$–$C_6$ alkylsulphonyl, trifluoromethoxy, difluoromethoxy, $C_1$–$C_3$ alkanoyl, phenyl, chlorophenyl, phenoxy, phenyl-$C_1$–$C_2$ alkyl, phenyl-$C_1$–$C_2$ alkoxy, cyclohexyl, amino-$C_1$–$C_3$ alkyl, $C_1$–$C_3$ alkylamino-$C_1$–$C_3$ alkyl, di-($C_1$–$C_3$ alkyl)-amino-$C_1$–$C_3$ alkyl, piperidyl-$C_1$–$C_3$ alkyl, morpholino-$C_1$–$C_3$ alkyl, $C_1$–$C_3$ alkoxy-$C_1$–$C_3$ alkyl, di-($C_1$–$C_3$ alkoxy)-$C_1$–$C_3$ alkyl, cyano-$C_1$–$C_3$ alkyl, hydroxy-$C_1$–$C_3$ alkyl, dihydroxy-$C_1$–$C_3$ alkyl, amino, $C_1$–$C_3$ alkylamino, di-($C_1$–$C_3$ alkyl)-amino, $C_1$–$C_3$ alkanoylamino, $C_1$–$C_3$ alkylsulphonylamino, aminocarbonyl, $C_1$–$C_6$ alkylaminocarbonyl, carboxy-$C_1$–$C_3$ alkyl, carboxy-$C_1$–$C_3$ alkoxy, carboxy, cyano, formyl, hydroxy and nitro; or
denotes a carboxamide group of formula —CO—NR$^{21}$R$^{22}$ in the 5- or 6- position of the benzimidazole, wherein
$R^{21}$ denotes hydrogen, $C_1$–$C_3$ alkyl, $C_2$–$C_6$ alkenyl, $C_6$–$C_{12}$ alkadienyl, 2,2,2-trifluoroethyl, $C_1$–$C_3$ alkoxy-$C_1$–$C_3$ alkyl, $C_1$–$C_3$ alkylthio-$C_1$–$C_3$ alkyl, phenyl, cyclohexyl, cyclohexenyl, cyclohexyl-$C_1$–$C_3$ alkyl, cyclohexyloxy-$C_1$–$C_3$ alkyl, cyclohexanoyl-$C_1$–$C_3$ alkyl, cyclohexenyl-$C_1$–$C_3$ alkyl, adamantyl-$C_1$–$C_2$ alkyl, amino-$C_1$–$C_3$ alkyl, $C_1$–$C_3$ alkylamino-$C_1$–$C_3$ alkyl, di-($C_1$–$C_3$ alkyl)-amino-$C_1$–$C_3$ alkyl, $C_1$–$C_3$ alkoxycarbonylamino-$C_1$–$C_3$ alkyl, cyano-$C_1$–$C_3$ alkyl, hydroxy-$C_1$–$C_3$ alkyl; or
denotes phenyl-$C_1$–$C_6$ alkyl, wherein
phenyl may carry a fused-on benzene ring or one or more substituents, the substituents being selected from the group consisting of fluorine, chlorine, bromine, $C_1$–$C_4$ alkyl, $C_1$–$C_3$ alkoxy, trifluoromethoxy, phenyl, thiadiazolyl, phenyloxy, hydroxy-phenyloxy, $C_1$–$C_3$ alkoxycarbonyl, $C_1$–$C_3$ alkoxycarbonyl-$C_1$–$C_6$ alkyl, aminocarbonyl, aminosulphonyl, amino, hydroxy, cyano and $C_1$–$C_3$ alkyl may carry a hydroxy group; or
denotes a group of formula —(CH$_2$)$_n$—X—Het wherein
n denotes an integer from 1 to 4,
X denotes CO, O, S, NH or a single bond, and
Het denotes imidazolyl, pyrrolidinyl, pyrrolidonyl, morpholino, furanyl, thienyl and pyridyl, which may be substituted by nitro or dimethoxyphenyl, and
$R^{22}$ denotes hydrogen or methyl, or
$R^{21}$ and $R^{22}$ in each case form, with the enclosed nitrogen atom, a tetrahydrobenzoazepino, morpholino, piperidyl, benzopiperidyl or cyclohexanopiperidyl group, or a piperazyl group optionally substituted by $C_1$–$C_3$ alkyl, adamantyl-$C_1$–$C_2$ alkyl, phenyl-$C_1$–$C_2$ alkyl, phenyl, methoxyphenyl or dimethoxyphenyl, $R^3$ denotes a group of formula A—(E)$_r$—Y—(E)$_r$—Z— wherein
A denotes a 1H-tetrazol-5-yl group or a group of formula —COOR$^{31}$, wherein R$^{31}$ denotes hydrogen or $C_1$–$C_3$ alkyl; and E denotes a $C_1$–$C_4$ alkylenediyl or an ethenylenediyl group optionally mono- or polysubstituted by fluorine, chlorine, bromine or hydroxy; and Y denotes O, S, CO—NH, CO—N($CH_3$), NH—CO, N($CH_3$)—CO, NH, N($CH_3$) or a single bond; and Z denotes O or a single bond; and r denotes 0 or 1; or denotes a 4- to 7-membered cycloalkyleneimino or 4- to 7-membered cycloalkyleneimino-carbonyl group which is substituted by the abovementioned group A;

$R^4$ in each case independently of one another denotes fluorine, chlorine, bromine, nitro, $C_1$–$C_3$ alkyl, $C_1$–$C_3$ haloalkyl, $C_1$–$C_3$ alkoxy, $C_1$–$C_3$-haloalkoxy, amino, acetylamino or trifluoroacetylamino;

$R^5$ denotes a hydrogen atom; and m is 0 or an integer from 1 to 2.

Compounds of formula IA are preferred wherein $R^2$ is in the 4-, 5- or 6- position, particularly in the 5- position of the benzimidazole structure. The remaining 5- or 6- position of the benzimidazole structure is preferably substituted by the substituent $R^5$. Particularly preferred compounds are those wherein the 5- position of the benzimidazole structure is substituted by $R^2$ and the 6- position of the benzimidazole structure is substituted by $R^5$.

Most particularly preferred are the substituted 2-phenyl-benzimidazoles of formula IA1

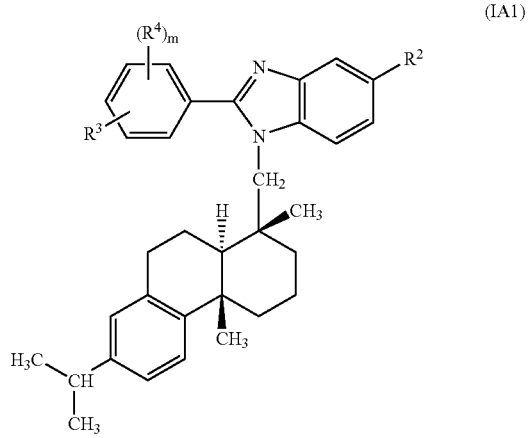

(IA1)

wherein $R^2$, $R^3$, $R^4$ and m have the meanings given hereinbefore and hereinafter.

Also preferred are those substituted 2-phenylbenzimidazoles of formulae I, IA and IA1, wherein the group $R^3$ is in the meta or para position relative to the benzimidazole group.

The invention also relates to the substituted 2-phenylbenzimidazoles of formulae IA and IA1 as pharmaceutical compositions as well as pharmaceutical preparations containing at least one substituted 2-phenylbenzimidazole of formulae IA or IA1 and a pharmacologically acceptable carrier.

Preferred are pharmaceutical preparations containing at least one substituted 2-phenylbenzimidazole of formula IA or IA1 as well as an active substance selected from among:

acarbose, beraprost, bexarotene, captopril, denileukin, diftitox, etanercept, farglitazar, fidarestat, glibenclamide, glibornuride, gliclazide, glimepiride, glipizide, glucagon, ilomastat, imidapril, insulin, lanreotide, linogliride, lisinopril, metformin, mexiletine, miglitol, minalrestat, mitiglinide, moxonidine, nafagrel, nateglinide, octreotide, orlistat, oxcarbazepine, pegvisomant, pioglitazone, ponalrestat, pramlintide, ramipril, repaglinide, rosiglitazone, sirolimus, sorbinil, tolrestat, troglitazone, voglibose, zenarestat and zopolrestat.

The invention further relates to the use of a substituted 2-phenylbenzimidazole of formulae IA or IA1 for the preparation of a medicament for the treatment or prevention of diseases involving glucagon receptors, particularly for the treatment or prevention of diabetes mellitus.

The substituted 2-phenylbenzimidazole derivatives of formula (I) may be synthesised by various methods. Possible approaches based on and using conventional chemical synthesis methods are illustrated by way of example hereinafter. Diagram 1 shows a possible method of synthesising the basic 2-phenylbenzimidazole component of the compounds according to the invention.

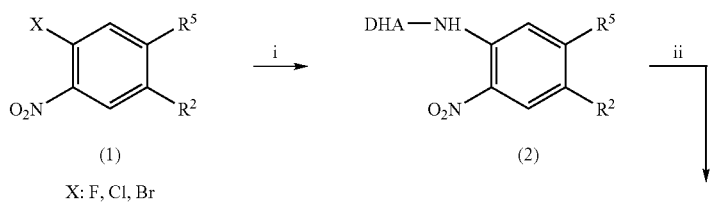

(1) X: F, Cl, Br (2)

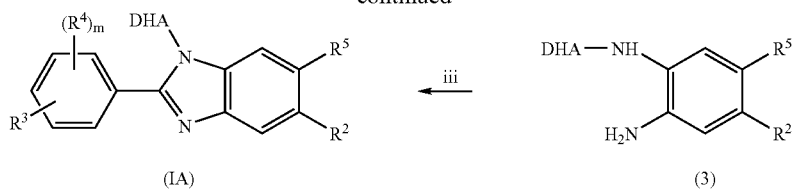

(DHA bedeutet eine Dehydroabietylgruppe)
(DHA denotes a dehydroabietyl group)

Diagram 1:

Starting from the 2-halo-nitrobenzenes (1), first of all aminolysis may be carried out with dehydroabietylamine to obtain the 2-abietylamino-nitrobenzenes (2) according to Diagram 1 (Step i). The aminolysis of the compounds (1) with the primary dehydroabietylamine DHA-NH$_2$ is carried out in suitable organic solvents such as for example dimethylsulphoxide, N,N-dimethylformamide, N-methylpyrrolidone, acetone or optionally also in water or alcohols at ambient temperature or in a temperature range from 30–80° C., preferably 40–50° C.

The 2-dehydroabietylamino-nitrobenzene derivatives (2) which may be obtained by the procedure described above may be reductively converted into the 2-dehydroabietylaminoanilines (3) (Step ii, Diagram 1). The reduction of the nitro group to obtain the compounds (3) is carried out for example by catalytic hydrogenation in organic solvents such as for example methanol, ethanol, isopropanol, tetrahydrofuran, optionally also mixed with dimethylformamide, ethyl acetate, dioxane or acetic acid, at elevated hydrogen pressure or at normal pressure at temperatures between 0–50° C., preferably at 20–40° C. Suitable catalysts are common hydrogenation catalysts. Palladium and Raney nickel are preferred. According to the invention Raney nickel is preferably used. An alternative method of reducing the nitro compounds (3) envisages using reducing agents such as Na$_2$S$_2$O$_4$ or SnCl$_2$. This reaction is carried out in protic, water-miscible organic solvents such as short-chained alcohols (methanol, ethanol, isopropanol) or in a mixture of the abovementioned solvents with water, optionally with acetic acid, dimethylformamide or ethyl acetate. The reaction is usually carried out at elevated temperature, preferably at the reflux temperature of the solvent or mixture of solvents used. After all the starting compounds (3) have reacted the mixture is worked up in the usual way. The compounds (4) may be purified for example by crystallisation from non-polar organic solvents such as diethyl ether, petroleum ether, optionally mixed with ethyl acetate.

The reaction of the compounds (3) with benzaldehyde derivatives in the presence of dehydrating conditions produces the 1-dehydroabietyl-2-phenyl-benzimidazoles (IA). The reaction is optionally carried out in a solvent or mixture of solvents such as acetic acid, methylene chloride, dimethylformamide, benzene, toluene, chlorobenzene, tetrahydrofuran, benzene/tetrahydrofuran or dioxane. Suitable dehydrating agents include for example isobutyl chloroformate, tetraethyl orthocarbonate, trimethyl orthoacetate, 2,2-dimethoxypropane, tetramethoxysilane, phosphorus oxychloride, thionyl chloride, trimethylchlorosilane, phosphorus trichloride, phosphorus pentoxide, ethyl 1,2-dihydro-2-ethoxy-quinoline-1-carboxylate (EEDQ), i-propyl 1,2-dihydro-2-i-propyloxy-quinoline-1-carboxylate (IIDQ), N,N'-dicyclohexylcarbodiimide, N,N'-dicyclohexylcarbodiimide/N-hydroxysuccinimide, N,N'-dicyclohexylcarbodiimide/1-hydroxy-benzotriazole, 2-(1H-benzotriazol-1-yl)-1,1,3,3-tetramethyluronium-tetrafluoroborate, 2-(1H-benzotriazol-1-yl)-1,1,3,3-tetramethyluronium-tetrafluoroborate/1-hydroxy-benzotriazole, N,N'-carbonyldiimidazole or triphenylphosphine/carbon tetrachloride. It may optionally be helpful to add a base such as pyridine, 4-dimethylaminopyridine, N-methyl-morpholine or triethylamine. The reaction is usually carried out at temperatures between 0 and 150° C., preferably at temperatures between 20 and 120° C.

Of course, it is also possible, by proceeding according to Diagram 1, to prepare compounds of formula IA wherein one or more of the groups R$^1$ to R$^5$ have a particular meaning and are then chemically converted into another group. For example a compound of formula IA wherein R$^2$ denotes a benzyl group may be prepared, then the benzyl group can be cleaved hydrogenolytically at the stage of the compound of formula (3), so as to obtain a compound of formula IA wherein R$^2$ denotes COOH. This carboxylic acid group can then be converted into an amide, for example.

Diagram 2 describes the preparation of the starting product of formula (1) wherein R$^2$ denotes an optionally substituted phenyl group and X denotes fluorine:

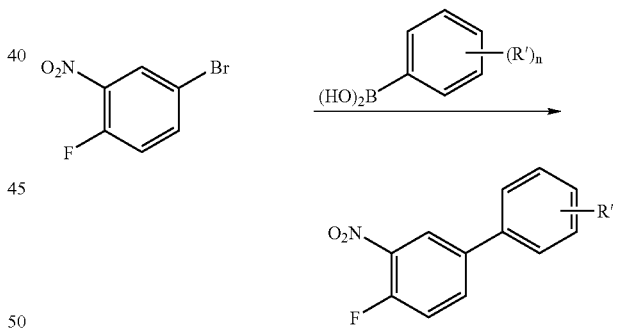

Diagram 2

R' in Diagram 2 preferably denotes hydrogen, halogen, C$_1$–C$_6$ alkyl, C$_1$–C$_6$ alkoxy, di(C$_1$–C$_6$ alkyl)amine, C$_2$–C$_6$ alkanoyl, C$_2$–C$_6$ alkanoylamino, carboxamide or a group of formula —CO—NH—CH$_2$-aryl, while the aryl group may be substituted by one or two C$_1$–C$_6$ alkoxy groups, and n denotes 0, 1 or 2.

The cross-coupling with the phenylborane may be carried out in the presence of a homogeneous palladium catalyst such as for example tetrakis-(triphenylphosphine)-palladium(0) or palladium diacetate, a suitable phosphine ligand and a base such as for example sodium carbonate by methods known from the literature [e.g. J. Med. Chem. 42 (1999) 5120–5130].

Some methods of preparing the compounds according to the invention will now be described in more detail by way of example. The examples of synthesis that follow serve to provide a more detailed explanation without restricting the subject matter of the invention thereto.

Abbreviations used:
9-BBN: 9-borabicyclo[3.3.1]nonane
BINAP: 2,2'-bis-(diphenylphosphino)-1,1'-binaphthyl
CDI: N,N'-carbonyldiimidazole
dehydroabietyl: 7-isopropyl-1,4a-dimethyl-1,2,3,4,4a,9,10,10a-octahydrophenanthren-1-ylmethyl:

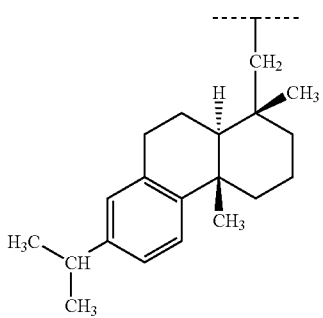

DMAP: 4-N,N-dimethylaminopyridine
DMF: N,N-dimethylformamide
DMSO dimethylsulphoxide
EDC: N'-(3-dimethylaminopropyl)-N-ethylcarbodiimide
HOBt: 1-hydroxy-1H-benzotriazole
TBTU: O-(benzotriazol-1-yl)-N,N,N',N'-tetramethyluronium-tetrafluoroborate
THF tetrahydrofuran Preparation of the starting compounds:

EXAMPLE I 2-nitro-4-phenyl-fluorobenzene

Analogously to methods known from the literature [J. Med. Chem. 42 (1999) 5120–5130] 1.54 g (7.0 mmol) 5-bromo-2-fluoro-nitrobenzene are dissolved in 7.5 ml dioxane under argon and combined with 0.91 g (7.5 mmol) benzeneboric acid and 0.34 g (0.3 mmol) tetrakis-(triphenylphosphine)-palladium(0). The mixture is heated to 80° C. and 7.5 ml of 2M aqueous sodium carbonate solution are added. Then the mixture is refluxed for 15 hours. After cooling water and ethyl acetate are added. The reaction solution is extracted with ethyl acetate. The combined organic phases are washed with saturated sodium chloride solution, filtered through Celite and evaporated to dryness. The residue is chromatographed on silica gel (n-hexane/ethyl acetate/ethanol=100:5:5).

Yield: 1.4 g (6.4 mmol, 92% of theory)
$C_{12}H_8FNO_2$ (217.20)
Mass spectrum: $M^+=217$ The following compounds were prepared analogously to Example I:
(1) 2-nitro-4-(3-fluorophenyl)-fluorobenzene
$C_{12}H_7F_2NO_2$ (235.19)
$R_f$ value: 0.55 (silica gel; hexane/ethyl acetate/ethanol=100:5:5)
(2) 2-nitro-4-(3,4-difluorophenyl)-fluorobenzene
$C_{12}H_6F_3NO_2$ (253.18)
$R_f$ value: 0.50 (silica gel; hexane/ethyl acetate/ethanol=100:5:5)
(3) 2-nitro-4-(3,5-difluorophenyl)-fluorobenzene
$C_{12}H_6F_3NO_2$ (253.18)
$R_f$ value: 0.35 (silica gel; hexane/ethyl acetate/ethanol=100:5:5)
(4) 2-nitro-4-(4-isopropylphenyl)-fluorobenzene
$C_{15}H_{14}FNO_2$ (259.28)
Mass spectrum: $(M+NH_4)^+=277$
(5) 2-nitro-4-(2-methylphenyl)-fluorobenzene
$C_{13}H_{10}FNO_2$ (231.23)
Mass spectrum: $M^+=231$
(6) 2-nitro-4-(2,4-difluorophenyl)-fluorobenzene
$C_{12}H_6F_3NO_2$ (253.18)
$R_f$ value: 0.60 (silica gel; hexane/ethyl acetate/ethanol=100:5:5)
(7) 2-nitro-4-(2-fluorophenyl)-fluorobenzene
$C_{12}H_7F_2NO_2$ (235.19)
Mass spectrum: $M^+=235$
(8) 2-nitro-4-(4-fluorophenyl)-fluorobenzene
$C_{12}H_7F_2NO_2$ (235.19)
$R_f$ value: 0.60 (silica gel; hexane/ethyl acetate/ethanol=100:5:5)
(9) 2-nitro-4-(3-methylphenyl)-fluorobenzene
$C_{13}H_{10}FNO_2$ (231.23)
$R_f$ value: 0.60 (silica gel; hexane/ethyl acetate/ethanol=100:5:5)
(10) 2-nitro-4-(2-acetylphenyl)-fluorobenzene
$C_{14}H_{10}FNO_3$ (259.24)
Mass spectrum: $M^+=259$

EXAMPLE II 2-nitro-4-(4-dimethylamino-phenyl)-fluorobenzene 220 mg (1 mmol) 5-bromo-2-fluoro-nitrobenzene, 0.5 ml (3.6 mmol) triethylamine, 8.98 mg (0.04 mmol) palladium (II)acetate and 24 mg (0.08 mmol) 2-(di-tert-butylphosphino)-biphenyl are added to a solution of 165 mg (1 mmol) 4-dimethylamino-benzeneboric acid in 5 ml DMF. The mixture is stirred for 60 hours at ambient temperature and then the reaction solution is filtered through basic Alox. The filtrate is freed from solvent in vacuo. The residue is chromatographed through silica gel (cyclohexane/ethyl acetate=9:1–>5:1).

Yield: 159 mg (0.61 mmol, 61% of theory)
$C_{14}H_{13}FN_2O_2$ (260.27)
Mass spectrum: $(M+H)^+=261$ The following compounds were prepared analogously to Example II:
(1) 2-nitro-4-(3-acetylamino-phenyl)-fluorobenzene
$C_{14}H_{11}FN_2O_3$ (274.25)
$R_f$ value: 0.43 (silica gel; dichloromethane/methanol=15:1)
(2) 2-nitro-4-(3-acetylphenyl)-fluorobenzene
$C_{14}H_{10}FNO_3$ (259.24)
Mass spectrum: $M^+=259$
(3) 2-nitro-5-(4-chlorophenyl)-fluorobenzene
$C_{12}H_7ClFNO_2$ (251.65) (crude product further reacted without purification)

EXAMPLE III

4-(3-aminocarbonyl-phenyl)-2-nitro-fluorobenzene a. 3-(2,4-dimethoxyphenylmethylaminocarbonyl)-benzeneboric acid 10.5 ml (69.8 mmol) 2,4-dimethoxybenzylamine, 24.6 g (76.7 mmol) TBTU and 11.6 ml (83.7 mmol) triethylamine are added to a solution of 11.6 g (69.8 mmol) 3-carboxy-benzeneboric acid in 200 ml DMF. The mixture is stirred for 2 hours at ambient temperature. Then the solvent is eliminated in vacuo and the residue is chromatographed on silica gel (dichloromethane/methanol=9:1).

Yield: 13.5 g (43 mmol, 61% of theory)
$C_{16}H_{18}BNO_5$ (315.14)
Mass spectrum: $(M+H)^+$=316 b. 4-[3-(2,4-dimethoxyphenylmethylaminocarbonyl)-phenyl]-2-nitro-fluorobenzene Prepared analogously to Example II by reacting 3-(2,4-dimethoxyphenylmethyl-aminocarbonyl)-benzeneboric acid with 5-bromo-2-fluoro-nitrobenzene.

Yield: 38% of theory
$C_{22}H_{19}FN_2O_5$ (410.41)
$R_f$ value: 0.45 (cyclohexane/ethyl acetate=1:1)

c. 4-(3-aminocarbonyl-phenyl)-2-nitro-fluorobenzene 6.75 g (16.4 mmol) 4-[3-(2,4-dimethoxyphenylmethylaminocarbonyl)-phenyl]-2-nitro-fluorobenzene are dissolved in 35 ml dichloromethane and combined with 35 ml trifluoroacetic acid. The mixture is stirred for 15 hours at ambient temperature. The solvent is eliminated in vacuo. The residue is taken up in dichloromethane and insoluble matter is filtered off. The filtrate is washed successively with saturated sodium hydrogen carbonate solution, 1 M hydrochloric acid and saturated saline solution. The product is dried over sodium sulphate and the solvent is eliminated in vacuo.

Yield: 3.65 g (14 mmol, 85% of theory)
$C_{13}H_9FN_2O_3$ (260.23)
Mass spectrum: $(M+H)^+$=261

EXAMPLE IV

1-dehydroabietylamino-4-(2-methylphenyl)-2-nitrobenzene a. 4-bromo-1-dehydroabietylamino-2-nitrobenzene 9.14 g (32 mmol) (+)-dehydroabietylamine are dissolved in 192 ml DMF and combined with 7.74 g (35.2 mmol) 4-bromo-1-fluoro-2-nitrobenzene and 13.5 g (98 mmol) potassium carbonate. The mixture is stirred for 3 hours at ambient temperature. The solid is filtered off and the filtrate is evaporated to dryness. The residue is dissolved in warm acetone. The product is precipitated out by the addition of water and suction filtered.

Yield: 13.7 g (28 mmol, 88% of theory)
$C_{26}H_{33}BrN_2O_2$ (485.47)
Mass spectrum: $(M+H)^+$=484, $(M+HCOO)^-$=531, 529 b. 1-dehydroabietylamino-4-(2-methylphenyl)-2-nitrobenzene

Prepared analogously to Example I by reacting 4-bromo-1-dehydroabietylamino-2-nitrobenzene with 2-methylbenzeneboric acid.

Yield: 87% of theory
$C_{33}H_{40}N_2O_2$ (496.70)
Mass spectrum: $(M+H)^+$=497

The following compounds were prepared analogously to Example IV:

(1) 1-dehydroabietylamino-4-(4-chlorophenyl)-2-nitrobenzene
$C_{32}H_{37}ClN_2O_2$ (517.12)
Mass spectrum: $(M+Na)^+$=541, 539

(2) 1-dehydroabietylamino-4-(2-chlorophenyl)-2-nitrobenzene
$C_{32}H_{37}ClN_2O_2$ (517.12)
Mass spectrum: $(M+Na)^+$=541, 539

(3) 1-dehydroabietylamino-4-(pyridin-4-yl)-2-nitrobenzene
$C_{31}H_{37}N_3O_2$ (483.66)
Mass spectrum: $M^+$=483

(4) 1-dehydroabietylamino-4-(pyridin-3-yl)-2-nitrobenzene
$C_{31}H_{37}N_3O_2$ (483.66)
Mass spectrum: $(M+H)^+$=484

(5) 1-dehydroabietylamino-4-(3-chlorophenyl)-2-nitrobenzene
$C_{32}H_{37}ClN_2O_2$ (517.12)
Mass spectrum: $M^+$=518, 516

(6) 1-dehydroabietylamino-4-(3-furanyl)-2-nitrobenzene
$C_{30}H_{36}N_2O_3$ (472.63)
Mass spectrum: $(M+H)^+$=473

(7) 1-dehydroabietylamino-4-(4-trifluoromethoxy-phenyl)-2-nitrobenzene
$C_{33}H_{37}F_3N_2O_3$ (566.67)
Mass spectrum: $(M+H)^+$=567

(8) 1-dehydroabietylamino-4-[4-(4-chlorophenyl)-phenyl)]-2-nitrobenzene
$C_{38}H_{41}ClN_2O_2$ (593.22)
Mass spectrum: $(M+H)^+$=595, 593

(9) 1-dehydroabietylamino-4-(4-methoxyphenyl)-2-nitrobenzene
$C_{33}H_{40}N_2O_3$ (512.70)
Mass spectrum: $(M+Na)^+$=535

(10) 1-dehydroabietylamino-4-(3-trifluoromethoxy-phenyl)-2-nitrobenzene
$C_{33}H_{37}F_3N_2O_3$ (566.67)
Mass spectrum: $(M+Na)^+$=589

(11) 1-dehydroabietylamino-4-(2-thiophenyl)-2-nitrobenzene
$C_{30}H_{36}N_2O_2S$ (488.70)
Mass spectrum: $(M+H)^+$=489

(12) 1-dehydroabietylamino-4-(2-methoxyphenyl)-2-nitrobenzene
$C_{33}H_{40}N_2O_3$ (512.70)
Mass spectrum: $(M+H)^+$=513

(13) 1-dehydroabietylamino-4-(3-methoxyphenyl)-2-nitrobenzene
$C_{33}H_{40}N_2O_3$ (512.70)
Mass spectrum: $(M+H)^+$=513

(14) 1-dehydroabietylamino-4-(2-trifluoromethoxy-phenyl)-2-nitrobenzene
$C_{33}H_{37}F_3N_2O_3$ (566.67)
Mass spectrum: $(M+H)^+$=567

(15) 1-dehydroabietylamino-4-(2-phenylethenyl)-2-nitrobenzene
$C_{34}H_{40}N_2O_2$ (508.71)
Mass spectrum: $(M+H)^+=509$
(16) 1-dehydroabietylamino-4-(furan-3-yl)-2-nitrobenzene
$C_{30}H_{36}N_2O_3$ (472.63)
Mass spectrum: $(M+H)^+=473$

EXAMPLE V 1-dehydroabietylamino-4-(2-morpholinomethyl-phenyl)-2-nitrobenzene a. 2-morpholinomethyl-benzeneboric acid 500 mg (3.2 mmol) 2-formylbenzeneboric acid and 282 µl (3.2 mmol) morpholine are dissolved in 30 ml THF. The reaction solution is adjusted to pH 5 with glacial acetic acid. At ambient temperature 722 mg (3.2 mmol) sodium triacetoxyborohydride are added and the mixture is stirred for 4 hours at ambient temperature. Then another 282 µl (3.2 mmol) of morpholine and 320 mg (1.4 mmol) of sodium triacetoxyborohydride are added. The mixture is stirred for 16 hours at ambient temperature. Then the solvent is distilled off and the residue is combined with water. It is extracted with dichloromethane. The combined extracts are washed with saturated sodium chloride solution and dried over magnesium sulphate. Then the solvent is eliminated in vacuo.
Yield: 320 mg (1.4 mmol, 45% of theory)
$C_{11}H_{16}BNO_3$ (221.07)
Mass spectrum: $(M+H)^+=222$
$R_f$ value: 0.39 (silica gel, dichloromethane/methanol=9:1)

b. 1-dehydroabietylamino-4-(2-morpholinomethyl-phenyl)-2-nitrobenzene

Prepared analogously to Example I by reacting 4-bromo-1-dehydroabietylamino-2-nitrobenzene with 2-morpholinomethyl-benzeneboric acid.
Yield: 64% of theory
$C_{37}H_{47}N_3O_3$ (581.80)
Mass spectrum: $(M+H)^+=582$
The following compounds were prepared analogously to Example V:
(1) 1-dehydroabietylamino-4-(3-morpholinomethyl-phenyl)-2-nitrobenzene
$C_{37}H_{47}N_3O_3$ (581.80)
Mass spectrum: $(M+H)^+=582$
(2) 1-dehydroabietylamino-4-(4-morpholinomethyl-phenyl)-2-nitrobenzene
$C_{37}H_{47}N_3O_3$ (581.80)
Mass spectrum: $(M+H)^+=582$

EXAMPLE VI 1-dehydroabietylamino-4-(4-methylsulphonylamino-phenyl)-2-nitrobenzene a. 4-methylsulphonylamino-benzeneboric acid

A solution of 0.93 ml (12 mmol) methanesulphonic acid chloride in 10 ml dichloromethane is slowly added dropwise at 0° C. to a solution of 1.0 g (4.6 mmol) 4-(4,4,5,5-tetramethyl-1,3,2-dioxaborolan-2-yl)-aniline in 10 ml of pyridine. The mixture is left to come up slowly to ambient temperature and then the solvent is eliminated in vacuo. The residue is taken up in dichloromethane and washed with water. Then it is evaporated to dryness.
Yield: 1.8 g (4.6 mmol, 99% of theory)
$C_{13}H_{20}BNO_4S$ (297.18)
Mass spectrum: $(M+NH_4)^+=315$
$R_f$ value: 0.69 (silica gel, petroleum ether/ethyl acetate=1:1)

b. 1-dehydroabietylamino-4-(4-methylsulphonylamino-phenyl)-2-nitrobenzene

Prepared analogously to Example I by reacting 4-bromo-1-dehydroabietylamino-2-nitrobenzene with 4-methylsulphonylamino-benzeneboric acid
Yield: 46% of theory
$C_{33}H_{41}N_3O_4S$ (575.78)
Mass spectrum: $(M+H)^+=576$
$R_f$ value: 0.7 (silica gel, petroleum ether/ethyl acetate=1:1)
The following compounds were prepared analogously to Example VI:
(1) 1-dehydroabietylamino-4-(3-methylsulphonylamino-phenyl)-2-nitrobenzene
$C_{33}H_{41}N_3O_4S$ (575.78)
Mass spectrum: $(M+H)^+=576$
(2) 1-dehydroabietylamino-4-(2-methylsulphonylamino-phenyl)-2-nitrobenzene
$C_{33}H_{41}N_3O_4S$ (575.78)
Mass spectrum: $(M+Na)^+=598$
$R_f$ value: 0.11 (silica gel, cyclohexane/dichloromethane=2:1)

EXAMPLE VII 1-dehydroabietylamino-4-(pyridin-2-yl)-2-nitrobenzene 1.0 g (2.1 mmol) 4-bromo-1-dehydroabietylamino-2-nitrobenzene, 262 mg (6.2 mmol) anhydrous lithium chloride and 112 mg (0.1 mmol) tetrakis-(triphenylphosphine)-palladium(0) are dissolved in 50 ml dioxane under a nitrogen atmosphere. 773 mg (2.1 mmol) of 2-(tri-n-butylstannyl)-pyridine are added and the mixture is refluxed for 48 hours. Then the precipitate is removed by suction filtering and the filtrate is evaporated to dryness. The residue is dissolved in 20 ml petroleum ether/ethyl acetate (1:1) and chromatographed on silica gel (petroleum ether/ethyl acetate=84:16->80:20).
Yield: 504 mg (1.0 mmol, 51% of theory)
$C_{31}H_{37}N_3O_2$ (483.66)
Mass spectrum: $(M+H)^+=484$
$R_f$ value: 0.27 (silica gel, petroleum ether/ethyl acetate=5:1)

EXAMPLE VIII 1-dehydroabietylamino-4-(4-aminocarbonyl-phenyl)-2-nitrobenzene a. 1-dehydroabietylamino-4-(4,4,5,5-tetramethyl-[1,3,2]dioxaborolan-2-yl)-2-nitrobenzene 5 g (10 mmol) 4-bromo-1-dehydroabietylamino-2-nitrobenzene are added to a solution of 253 mg (0.31 mmol) [1,1'-bis-(diphenylphosphino)-ferrocene]-palladium(II)-chloride-dichloromethane complex (1:1), 3.0 g (31 mmol)

potassium acetate and 2.9 g (11 mmol) of bis-(pinacolato)-diboron in 60 ml DMSO. The mixture is refluxed for 60 hours. Then the reaction solution is poured onto 1 liter of water. The precipitate is suction filtered and dried in vacuo. The crude product is chromatographed on silica gel (petroleum ether/ethyl acetate=4:1).

Yield: 2.34 g (4.4 mmol, 43% of theory)
$C_{32}H_{45}BN_2O_4$ (532.54)
Mass spectrum: $(M+H)^+$=533, 532
$R_f$ value: 0.62 (silica gel, petroleum ether/ethyl acetate=9:1)

b. 1-dehydroabietylamino-4-(4-aminocarbonyl-phenyl)-2-nitrobenzene 500 mg (0.94 mmol) 1-dehydroabietylamino-4-(4,4,5,5-tetramethyl-[1,3,2]dioxaborolan-2-yl)-2-nitrobenzene and 235 mg (1.1 mmol) 4-bromobenzoic acid amide are dissolved in 10 ml dioxane and combined with 2 ml of 2 M aqueous sodium carbonate solution. 80 mg (0.07 mmol) of tetrakis-(triphenylphosphine)-palladium(0) are added and the mixture is stirred for 72 h at ambient temperature. Then the solvent is eliminated in vacuo and the residue is taken up in dichloromethane. It is washed twice with water, dried over magnesium sulphate and evaporated to dryness. The residue is filtered through silica gel (dichloromethane/ethyl acetate/petroleum ether=1:2:2) and crystallised from dichloromethane/petroleum ether.

Yield: 402 mg (0.77 mmol, 81% of theory)
$C_{33}H_{39}N_3O_3$ (525.70)
Mass spectrum: $(M+H)^+$=526
$R_f$ value: 0.49 (silica gel, petroleum ether/ethyl acetate=1:3)

The following compounds were prepared analogously to Example VIII:

(1) 1-dehydroabietylamino-4-(5-chlorothiophen-2-yl)-2-nitrobenzene
$C_{30}H_{35}ClN_2O_2S$ (523.14)
Mass spectrum: $(M+H)^+$=525, 523
$R_f$ value: 0.49 (silica gel, petroleum ether/ethyl acetate=9:1)

(2) 1-dehydroabietylamino-4-(thiazol-2-yl)-2-nitrobenzene
$C_{29}H_{35}N_3O_2S$ (489.69)
Mass spectrum: $(M+H)^+$=490
$R_f$ value: 0.19 (silica gel, petroleum ether/ethyl acetate=9:1)

(3) 1-dehydroabietylamino-4-(5-methylthiophen-2-yl)-2-nitrobenzene
$C_{31}H_{38}N_2O_2S$ (502.73)
Mass spectrum: $(M+H)^+$=503
$R_f$ value: 0.67 (silica gel, petroleum ether/ethyl acetate=9:1)

(4) 1-dehydroabietylamino-4-(pyrazin-2-yl)-2-nitrobenzene
$C_{30}H_{36}N_4O_2$ (484.65)
Mass spectrum: $(M+H)^+$=485
$R_f$ value: 0.68 (silica gel, petroleum ether/ethyl acetate=1:1)

(5) 1-dehydroabietylamino-4-(pyrimidin-2-yl)-2-nitrobenzene
$C_{30}H_{36}N_4O_2$ (484.65)
Mass spectrum: $(M+H)^+$=485
$R_f$ value: 0.28 (silica gel, petroleum ether/ethyl acetate=4:1)

(6) 1-dehydroabietylamino-2-nitrobenzene

Obtained as the hydro-deborination product when reacting 1-dehydroabietylamino-4-(4,4,5,5-tetramethyl-[1,3,2]dioxaborolan-2-nitrobenzene with 4-bromo-3,5-dimethylisoxazole.
$C_{26}H_{34}N_2O_2$ (406.57)
Mass spectrum: $(M+H)^+$=407
$R_f$ value: 0.44 (silica gel, petroleum ether/ethyl acetate=9:1)

(7) 1-dehydroabietylamino-4-(2-methylpropen-1-yl)-2-nitrobenzene
$C_{30}H_{40}N_2O_2$ (460.67)
$R_f$ value: 0.68 (silica gel, petroleum ether/ethyl acetate=9:1)

EXAMPLE IX

1-dehydroabietylamino-4-(1H-imidazol-2-yl)-2-nitrobenzene a. 1-dehydroabietylamino-4-formyl-2-nitrobenzene 3 g (17.7 mmol) 4-fluoro-3-nitrobenzaldehyde, 5 g (17.7 mmol) dehydroabietylamine and 11 g (80 mmol) potassium carbonate are dissolved in 20 ml DMF and stirred for 16 hours at ambient temperature. Then the insoluble matter is filtered off and the solvent is eliminated in vacuo. The residue is triturated with ether and methanol, suction filtered and dried.

Yield: 3.5 g (8 mmol, 46% of theory)
$C_{27}H_{34}N_2O_3$ (434.58)
Mass spectrum: $(M+H)^+$=435
$R_f$ value: 0.35 (silica gel, petroleum ether/ethyl acetate=5:1)

b. 1-dehydroabietylamino-4-(1H-imidazol-2-yl)-2-nitrobenzene 1 g (2.3 mmol) 1-dehydroabietylamino-4-formyl-2-nitrobenzene, 335 mg (2.3 mmol) glyoxal and 3 ml saturated aqueous ammonia solution are heated to 100° C. in 25 ml of ethanol for 1 hour in the bomb tube. Then the solvent is eliminated in vacuo and the residue is chromatographed on silica gel (petroleum ether/ethyl acetate=67:33->0:100).

Yield: 145 mg (0.3 mmol, 13% of theory)
$C_{29}H_{36}N_4O_2$ (472.64)
Mass spectrum: $(M+H)^+$=473
$R_f$ value: 0.14 (silica gel, petroleum ether/ethyl acetate=5:1)

The following compounds were prepared analogously to Example IX:

(1) 1-dehydroabietylamino-4-methoxycarbonyl-2-nitrobenzene
$C_{28}H_{36}N_2O_4$ (464.61)
Mass spectrum: $(M+H)^+$=465
$R_f$ value: 0.7 (silica gel, cyclohexane/ethyl acetate=2:1)

(2) 1-dehydroabietylamino-4-methylaminocarbonyl-2-nitrobenzene
$C_{37}H_{43}N_3O_4$ (593.7)
Mass spectrum: $(M+H)^+$=594

(3) 1-dehydroabietylamino-4-methyl-2-nitrobenzene
$C_{27}H_{36}N_2O_2$ (420.60)
$R_f$ value: 0.64 (silica gel, cyclohexane/ethyl acetate=5:1)

EXAMPLE X 1-dehydroabietylamino-4-isopropyl-2-nitrobenzene 0.5 g (1.6 mmol) 4-isopropyl-2-nitrophenyl trifluoromethanesulphonate and 0.46 g (1.6 mmol) (+)-dehydroabietylamine are dissolved in 20 ml DMF and heated to 40° C. for 16 hours. Then the solvent is eliminated in vacuo and the residue dissolved in dichloromethane. It is washed with water and the solvent is eliminated in vacuo. The residue is triturated with water, and the precipitate is suction filtered and dried in the vacuum drying cupboard at 50° C. The residue is then chromatographed on silica gel (petroleum ether/ethyl acetate=100:0->95:5).

Yield: 270 mg (0.6 mmol, 38% of theory)
$C_{29}H_{42}N_2O_2$ (448.65)
Mass spectrum: $(M+H)^+=449$
$R_f$ value: 0.8 (silica gel, petroleum ether/ethyl acetate=5:1)

The following compounds were prepared analogously to Example X:

(1) 1-dehydroabietylamino-4-cyclohexyl-2-nitrobenzene
$C_{32}H_{44}N_2O_2$ (488.72)
Mass spectrum: $(M+H)^+=489$
$R_f$ value: 0.74 (silica gel, petroleum ether/ethyl acetate=5:1)

(2) 1-dehydroabietylamino-4-tert-butyl-2-nitrobenzene
$C_{30}H_{42}N_2O_2$ (462.68)
Mass spectrum: $(M+H)^+=463$
$R_f$ value: 0.8 (silica gel, petroleum ether/ethyl acetate=5:1)

(3) 1-dehydroabietylamino-4-cyclopentyl-2-nitrobenzene
$C_{31}H_{42}N_2O_2$ (474.69)
Mass spectrum: $(M+H)^+=475$
$R_f$ value: 0.81 (silica gel, petroleum ether/ethyl acetate=5:1)

(4) 1-dehydroabietylamino-3-methyl-2-nitrobenzene
$C_{27}H_{36}N_2O_2$ (420.60)
Mass spectrum: $(M+H)^+=421$
$R_f$ value: 0.73 (silica gel, petroleum ether/ethyl acetate=5:1)

(5) 1-dehydroabietylamino-3-phenyl-2-nitrobenzene
$C_{32}H_{38}N_2O_2$ (482.67)
Mass spectrum: $(M+H)^+=483$
$R_f$ value: 0.72 (silica gel, petroleum ether/ethyl acetate=4:1)

EXAMPLE XI 4-(4-carboxypiperidino)-benzaldehyde a. 4-(4-ethoxcarbonyl-piperidino)-benzonitrile 15.7 g (0.1 mol) ethyl piperidine-4-carboxylate and 6.1 g (0.05 mol) 4-fluorobenzonitrile are dissolved in 100 ml acetonitrile and refluxed for 176 hours. Then the acetonitrile is eliminated in vacuo. The residue is taken up in ether and washed with water. After drying over magnesium sulphate the solvent is eliminated in vacuo. The residue is chromatographed on silica gel (ethyl acetate/cyclohexane=4:1).

Yield: 12.7 g (98% of theory)
$C_{15}H_{18}N_2O_2$ (258.31)
Calc.: C, 69.74; H, 7.02; N, 10.85.
Found: 69.52; 7.12; 10.67.

b. 4-(4-carboxypiperidino)-benzonitrile 1 g (3.8 mmol) 4-(4-ethoxycarbonyl-piperidino)-benzonitrile are dissolved in 20 ml THF and combined with 9.7 ml 1 N sodium hydroxide solution. The mixture is stirred for 16 hours at ambient temperature and then 9.7 ml 1 N hydrochloric acid are added. Then the solvent is eliminated in vacuo. The residue is stirred in water.

Yield: 0.83 g (3.6 mmol, 92% of theory)
$C_{13}H_{14}N_2O_2$ (230.27)
Mass spectrum: $(M+H)^+=231$
$R_f$ value: 0.31 (silica gel, dichloromethane/methanol=9:1)

d. 4-(4-carboxypiperidino)-benzaldehyde

In a pressure vessel 830 mg (3.6 mmol) 4-(4-carboxypiperidino)-benzonitrile are dissolved in 5 ml formic acid and combined with 1 g Raney nickel. The mixture is shaken for 12 hours at 100° C. Then the catalyst is removed by suction filtering and the filtrate is evaporated to dryness. The residue is stirred with water and suction filtered.

Yield: 360 mg (1.6 mmol, 39% of theory)
$C_{13}H_{15}NO_3$ (233.27)
Mass spectrum: $(M-H)^-=232$
$R_f$ value: 0.25 (silica gel, dichloromethane/methanol=19:1)

The following compound was obtained analogously to Example XI:
3-carboxycarbonylamino-benzaldehyde
$C_9H_7NO_4$ (193.16)
Mass spectrum: $(M-H)^-=192$

EXAMPLE XII 3-(1H-tetrazol-5-ylmethylaminocarbonylmethyl)-benzaldehyde 0.5 g (3 mmol) 3-formylphenylacetic acid are dissolved in 5 ml DMF. 0.49 g (3.7 mmol) HOBt and 0.64 g (3.4 mmol) EDC-hydrochloride are added and the mixture is stirred for one hour at ambient temperature. Then 0.36 g (3.7 mmol) 5-aminomethyl-1H-tetrazole are added. The mixture is stirred for 24 [hours] at ambient temperature. Then the reaction mixture is poured into 100 ml ice water. The aqueous phase is extracted with ether. The combined organic phases are washed with saturated sodium chloride solution and dried over sodium sulphate. Then the solvent is eliminated in vacuo. The residue is chromatographed on silica gel (dichloromethane/methanol/acetic acid=9:1:0.1).

Yield: 0.22 g (0.59 mmol, 19% of theory)
$C_{11}H_{11}N_5O_2$ (245.24)
Mass spectrum: $M^+=245$
$R_f$ value: 0.28 (silica gel, dichloromethane/methanol/acetic acid=19:1:0.1)

The following compounds were prepared analogously to Example XII:

(1) 3-(1H-tetrazol-5-ylmethylaminocarbonyl)-benzaldehyde
$C_{10}H_9N_5O_2$ (231.22)
Mass spectrum: $(M+H)^+=232$ (2) 4-(1H-tetrazol-5-ylmethylaminocarbonylmethoxy)-benzaldehyde
$C_{11}H_{11}N_5O_3$ (261.24)
Mass spectrum: $(M-H)^-=260$ (3) 3-(3-ethoxycarbonylpropylaminocarbonyl)-benzaldehyde
$C_{14}H_{17}NO_4$ (263.30)

Mass spectrum: (M+H)$^+$=264
R$_f$ value: 0.25 (silica gel, petroleum ether/ethyl acetate=1:1)

(4) 3-(1H-tetrazol-5-ylmethylaminocarbonylmethoxy)-benzaldehyde
C$_{11}$H$_{11}$N$_5$O$_3$ (261.24)
Mass spectrum: (M+H)$^+$=262

(5) 3-(2-carboxyethylaminocarbonyl)-benzaldehyde
C$_{11}$H$_{11}$NO$_4$ (221.21)
Mass spectrum: (M+H)$^+$=222

(6) 4-(1H-tetrazol-5-ylmethylaminocarbonylmethyl)-benzaldehyde
C$_{11}$H$_{11}$N$_5$O$_2$ (245.24)
Mass spectrum: (M+H)$^+$=246

EXAMPLE XIII 3-(carboxymethylaminocarbonylmethoxy)-benzaldehyde a. 3-(tert-butyloxycarbonylmethylaminocarbonylmethoxy)-benzaldehyde 1.6 g (9.1 mmol) 3-formylphenoxyacetic acid, 2.9 g (9.1 mmol) TBTU and 0.9 g (9.2 mmol) triethylamine are dissolved in 10 ml DMF. The mixture is stirred for 30 minutes at ambient temperature and then 1 g (7.6 mmol) glycine-tert-butylester is added. After 76 hours' stirring at ambient temperature the reaction mixture is evaporated to dryness. The residue is chromatographed on silica gel (petroleum ether/ethyl acetate=1:1).
Yield: 1 g (3.4 mmol, 45% of theory)
C$_{15}$H$_{19}$NO$_5$ (293.32)
Mass spectrum: (M−H)$^-$=292
R$_f$ value: 0.43 (silica gel, petroleum ether/ethyl acetate=1:1)

b. 3-(carboxymethylaminocarbonylmethoxy)-benzaldehyde 0.5 g (1.7 mmol) 3-(tert-butyloxycarbonylmethylaminocarbonylmethoxy)-benzaldehyde are dissolved in 15 ml dichloromethane and combined with 15 ml trifluoroacetic acid. The mixture is stirred for 1.5 hours at ambient temperature and then the solvent is eliminated in vacuo.
Yield: 0.4 g (1.68 mmol, 98% of theory)
C$_{11}$H$_{11}$NO$_5$ (237.21)
Mass spectrum: (M+H)$^+$=238

EXAMPLE XIV 4-(3-carboxypropyloxy)-3-fluorobenzaldehyde a. 4-(3-ethoxycarbonyl-propyloxy)-3-fluorobenzaldehyde 2.5 g (12.8 mmol) ethyl 4-bromobutyrate and 1.6 g (11.7 mmol) potassium carbonate are added to a solution of 1.5 g (10.7 mmol) 3-fluoro-4-hydroxybenzaldehyde in 19 ml DMF. It is heated for 76 hours to 50° C. Then it is cooled to ambient temperature and saturated sodium hydrogen carbonate solution is added. The reaction mixture is extracted with ethyl acetate, the combined organic extracts are washed with water and dried over sodium sulphate. Then the solvent is eliminated in vacuo.
Yield: 2 g (7.9 mmol, 74% of theory)
C$_{13}$H$_{15}$FO$_4$ (254.26)
Mass spectrum: (M+H)$^+$=255
R$_f$ value: 0.58 (silica gel, petroleum ether/ethyl acetate=3:2)

b. 4-(3-carboxypropyloxy)-3-fluorobenzaldehyde

Prepared analogously to Example XIb by saponifying 4-(3-ethoxycarbonyl-propyloxy)-3-fluorobenzaldehyde with sodium hydroxide solution in ethanol.
Yield: 74% of theory
C$_{11}$H$_{11}$FO$_4$ (226.21)
Mass spectrum: (M+H)$^+$=227

The following compounds were prepared analogously to Example XIV:

(1) 4-(3-carboxypropyloxy)-2-chlorobenzaldehyde
C$_{11}$H$_{11}$ClO$_4$ (242.66)
Mass spectrum: (M+H)$^+$=245, 243
R$_f$ value: 0.59 (silica gel, petroleum ether/ethyl acetate=2:1)

(2) 5-(3-ethyloxycarbonyl-propyloxy)-2-methoxybenzaldehyde
C$_{14}$H$_{18}$O$_5$ (266.30)
Mass spectrum: (M+H)$^+$=267

(3) 3-(3-ethyloxycarbonyl-propyloxy)-2-methoxybenzaldehyde
C$_{14}$H$_{18}$O$_5$ (266.30)
Mass spectrum: (M+H)$^+$=267

(4) 3-(3-tert-butyloxycarbonyl-propyloxy)-benzaldehyde
C$_{15}$H$_{20}$O$_4$ (264.32)
Mass spectrum: (M+H)$^+$=265
R$_f$ value: 0.62 (silica gel, petroleum ether/ethyl acetate=4:1)

EXAMPLE XV 3-(N-carboxymethyl-methylamino)-benzaldehyde-hydrochloride a. 3-(N-tert-butoxycarbonyl-methylamino)-benzaldehyde 12.8 g (65.7 mmol) tert-butyl bromoacetate and 17.2 ml (98.7 mmol) triethylamine are added to a solution of 11 g (65.7 mmol) 3-dimethoxymethyl-aniline in 200 ml DMF. The mixture is stirred for 76 hours at ambient temperature. Then the solvent is eliminated in vacuo. The residue is taken up in ethyl acetate and washed with water, 10% sodium hydrogen carbonate solution and saturated saline solution. Then the organic phase is dried over sodium sulphate and evaporated to dryness. 13.9 g product mixture are obtained (dimethylacetal/aldehyde=27:73). 4 g of this mixture are dissolved in 100 ml DMF. 4.2 ml (24.1 mmol) N-ethyl-diisopropylamine and 1 ml (16.1 mmol) methyl iodide are added and the mixture is heated for 24 hours to 60° C. Then 1 ml (16.1 mmol) methyl iodide is added three times at 24 hour intervals. Then the solvent is eliminated in vacuo. The residue is taken up in ethyl acetate and washed with water, 10% sodium hydrogen carbonate solution and saturated saline solution. After drying over sodium sulphate the solvent is eliminated in vacuo. The residue is chromatographed on silica gel (cyclohexane/ethyl acetate=5:1).
Yield: 2.2 g (8.9 mmol, 56% of theory)
C$_{14}$H$_{19}$NO$_3$ (249.31)
Mass spectrum: (M+Na)$^+$=272
R$_f$ value: 0.16 (silica gel, cyclohexane/ethyl acetate=5:1)

b. 3-(N-carboxymethyl-methylamino)-benzaldehyde-hydrochloride 2.2 g (8.9 mmol) 3-(N-tert-butoxycarbonyl-methylamino)-benzaldehyde are dissolved in 100 ml acetic acid and combined with 10 ml of conc. hydrochloric acid. The mixture is stirred for 4 hours at ambient temperature. Then the solvent is eliminated in vacuo and the residue is taken up in ether. The precipitate is suction filtered.

Yield: 1.4 g (6 mmol, 70% of theory)

$C_{10}H_{11}NO_3 \times HCl$ (229.66)

$R_f$ value: 0.25 (silica gel, dichloromethane/methanol/$NH_4OH$=4:1:0.25)

EXAMPLE XVI 3-(4-carboxypiperidino)-benzaldehyde a. 2-[3-(4-ethyloxycarbonylpiperidino)-phenyl]-1,3-dioxolane 0.6 ml (3.8 mmol) 2-(3-bromophenyl)-1,3-dioxolane, 0.72 ml (4.6 mmol) ethyl piperidine-4-carboxylate and 1.7 g (5.2 mmol) sodium-tert-butoxide are added to a solution of 18 mg (0.03 mmol) BINAP and 8.7 mg (0.009 mmol) tris-(dibenzylideneacetone)-dipalladium(0) in 8 ml of toluene under a nitrogen atmosphere. The mixture is heated for 7 hours to 80° C. Then it is cooled, the reaction mixture is combined with 20% citric acid and extracted with dichloromethane. The extracts are dried over magnesium sulphate and evaporated to dryness. The residue is chromatographed on silica gel (petroleum ester/ethyl acetate=77:23->70:30).

Yield: 270 mg (23% of theory)

$C_{17}H_{23}NO_4$ (305.38)

Mass spectrum: $(M+H)^+$=306 b. 2-[3-(4-carboxypiperidino)-phenyl]-1,3-dioxolane

Prepared analogously to Example XIb by saponifying 2-[3-(4-ethyloxycarbonyl-piperidino)-phenyl]-1,3-dioxolane with sodium hydroxide solution in THF/methanol $C_{15}H_{18}NO_4$ (277.32)

$R_f$ value: 0.33 (silica gel, dichloromethane/methanol=95:5)

c. 3-(4-carboxypiperidino)-benzaldehyde 227 mg (0.82 mmol) 2-[3-(4-carboxypiperidino)-phenyl]-1,3-dioxolan are dissolved in 6 ml of methanol and combined with 3 ml 1 N hydrochloric acid. The reaction solution is stirred for 15 hours at ambient temperature. Then 3 ml 1 N sodium hydroxide solution are added. The solvent is evaporated down to half the volume. Toluene is added, the organic phase is separated off, dried over magnesium sulphate and the solvent is eliminated in vacuo. To saponify the methyl ester obtained as a by-product the residue is dissolved in 5 ml THF and 0.5 ml of methanol, combined with 2 ml 1 N sodium hydroxide solution and stirred for 15 hours at ambient temperature. Then 2 ml 1 N hydrochloric acid are added. After the solvent has been eliminated in vacuo the residue is stirred with acetone, dried over magnesium sulphate and freed from solvent.

$C_{13}H_{15}NO_3$ (233.27)

Mass spectrum: $(M+H)^+$=234

The following compound was prepared analogously to Example XVI:

(1) 2-[3-(3-carboxypyrrolidin-1-yl)-phenyl]-1,3-dioxolane $C_{14}H_{17}NO_4$ (263.30)

Mass spectrum: $(M+H)^+$=264

$R_f$ value: 0.44 (silica gel, petroleum ether/ethyl acetate=5:1)

EXAMPLE XVII 3-(3-ethoxycarbonylpropyl)-benzaldehyde 6.3 g (55 mmol) ethyl vinylacetate are dissolved in 30 ml THF under a protective gas atmosphere. While cooling with ice 240 ml (120 mmol) of a 0.5 M solution of 9-BBN in THF are added dropwise. Then the reaction solution is left to warm up to ambient temperature and stirred for 1.5 hours. 100 ml DMF are added and 40 ml (120 mmol) of a 3 M aqueous $K_3PO_4$ solution are added dropwise. Then 6.6 ml (55 mmol) 3-bromobenzaldehyde and 2.2 g (3 mmol) [1,1'-bis-(diphenylphosphino)-ferrocene]-palladium(II)-dichloride are added. The mixture is stirred for 16 hours at ambient temperature. Then the solvent is eliminated in vacuo. The residue is chromatographed on silica gel (petroleum ether/ethyl acetate=100:0->65:35).

Yield: 5.7 g (47% of theory)

$C_{13}H_{16}O_3$ (220.27)

Mass spectrum: $(M+H)^+$=221

EXAMPLE XVIII 3-(2-tert-butyloxycarbonylethylcarbonylamino)-benzaldehyde a. 3-(2-tert-butyloxycarbonylethylcarbonylamino)-benzaldehyde-dimethylacetal 1 g (6.1 mmol) CDI are added to a solution of 1 g (5.7 mmol) 3-aminobenzaldehyde-dimethylacetyl in 20 ml THF. The mixture is stirred for 1 hour at 40° C. Then 0.98 g (5.9 mmol) tert-butyl succinate are added. The mixture is stirred for 16 hours at ambient temperature. Then the solvent is eliminated in vacuo. The residue is taken up in ethyl acetate and washed with water, 1 N hydrochloric acid, 1 N sodium hydroxide solution and saturated saline solution. The organic phase is dried over magnesium sulphate and evaporated to dryness. The residue is chromatographed on silica gel (dichloromethane/methanol=100:0->95:5).

Yield 1.55 g (83% of theory)

$C_{17}H_{25}NO_5$ (323.39)

Mass spectrum: $(M+H)^+$=324

$R_f$ value: 0.75 (silica gel, dichloromethane/methanol=98:2)

b. 3-(2-tert-butyloxycarbonylethylcarbonylamino)-benzaldehyde

Prepared analogously to Example XVIc from 3-(2-tert-butyloxycarbonylethylcarbonylamino)-benzaldehyde-dimethylacetal $C_{15}H_{19}NO_4$ (277.32)

Mass spectrum: $(M+H)^+$=278

$R_f$ value: 0.5 (silica gel, petroleum ether/ethyl acetate=2:1)

EXAMPLE XIX

3-(4-ethyloxycarbonylbut-1-ynyl)-benzaldehyde

Under a protective gas atmosphere 1.3 g (6.9 mmol) ethyl 4-pentynoate, 280 mg (0.4 mmol) bis-(triphenylphosphine)-palladium(II)-dichloride and 57 mg (0.3 mmol) copper(I)-iodide are added to a solution of 1.6 g (6.9 mmol) 3-iodo-benzaldehyde in 50 ml diisopropylamine. The mixture is heated for 1.5 hours to 40° C. Then the solvent is eliminated in vacuo. The residue is chromatographed on silica gel (petroleum ether/ethyl acetate=5:1).

Yield: 1.7 g (80% of theory)

$C_{14}H_{14}O_3$ (230.27)

$R_f$ value: 0.58 (silica gel, petroleum ether/ethyl acetate=5:1)

Preparation of the end products:

EXAMPLE 1

2-(3-carboxymethoxy-phenyl)-5-(2-cyclohexylethylaminocarbonyl)-1-dehydroabietyl-benzimidazole

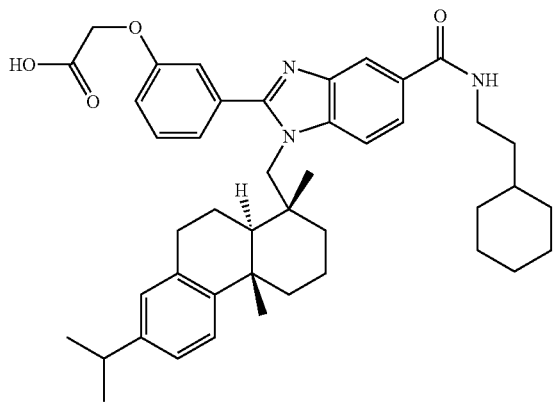

a. 4-fluoro-3-nitrobenzoic acid-2-(cyclohex-1-enyl)-ethylamide 25 g (135 mmol) 3-fluoro-3-nitrobenzoic acid are refluxed for 2 hours in 100 ml of thionyl chloride. Then excess thionyl chloride is eliminated in vacuo. 27 g (133 mmol) crude product are obtained. 8.77 g (70 mmol) 2-(cyclohex-1-enyl)-ethylamine and 11 ml (80 mmol) triethylamine dissolved in 100 ml dichloromethane are added dropwise to a solution of 14 g (70 mmol) crude product in 300 ml dichloromethane over a period of 20 min. The mixture is stirred for 3 hours at ambient temperature. Then the reaction solution is washed successively with water, dilute potassium carbonate solution and dilute hydrochloric acid and dried over sodium sulphate. After the solvent has been eliminated in vacuo the residue is chromatographed over silica gel (cyclohexane/ethyl acetate=4:1->2:1).

Yield: 14.6 g (50 mmol, 72% of theory)

$C_{15}H_{17}FN_2O_3$ (292.3)

Mass spectrum: $(M+H)^+=293$ $R_f$ value: 0.24 (silica gel, dichloromethane/methanol=50:1)

b. 3-amino-4-dehydroabietylamino-benzoic acid-2-cyclohexylethyl-amide 877 mg (3 mmol) 4-fluoro-3-nitro-benzoic acid-2-(cyclohex-1-enyl)-ethylamide are dissolved in 60 ml DMF and combined with 902 mg (3 mmol) (+)-dehydroabietylamine and 600 mg (4.3 mmol) potassium carbonate. The mixture is stirred for 15 hours at ambient temperature. The mixture is filtered through basic Alox. 1.77 g (3.2 mmol) crude product are obtained. 558 mg (1 mmol) crude product are dissolved in 20 ml of methanol and 10 ml THF and combined with 1.1 ml 1 N hydrochloric acid and 200 mg palladium/charcoal (10%). The reaction solution is hydrogenated for 4 hours at 3 bar hydrogen pressure. Then the catalyst is filtered off and the solvent is eliminated in vacuo.

Yield: 504 mg (0.89 mmol, 89% of theory)

c. 2-(3-carboxymethoxy-phenyl)-5-(2-cyclohexyl-ethylaminocarbonyl)-1-dehydroabietyl-benzimidazole 504 mg (0.89 mmol) 3-amino-4-dehydroabietylamino-benzoic acid-2-cyclohexylethyl-amide are dissolved in 20 ml DMF and combined with 160 mg (0.89 mmol) 3-formylphenoxy-acetic acid. The mixture is stirred for 15 hours at ambient temperature. Then the solvent is eliminated in vacuo and the residue is chromatographed on silica gel (dichloromethane/methanol/NH$_4$OH=9:1:0.1->1:1:0.1).

Yield: 400 mg (0.58 mmol, 65% of theory)

$C_{44}H_{55}N_3O_4$ (689.95)

Mass spectrum: $(M+H)^+=690$ $R_f$ value: 0.69 (silica gel, dichloromethane/methanol/NH$_4$OH=4:1:0.25)

The compounds of Examples 1.1 to 1.14 listed in Table I are prepared analogously to Example 1:

TABLE I

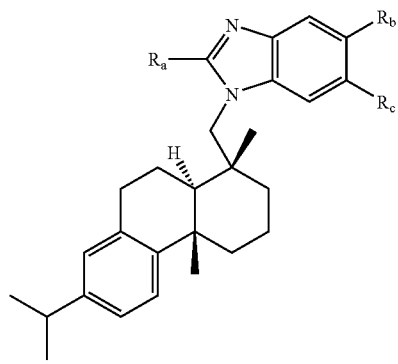

| Example | $R_a$ | $R_b$ | $R_c$ | physical data |
|---|---|---|---|---|
| 1.1 | 4-(3-carboxypropyloxy)-2-methoxy-phenyl | 2-cyclohexyl-ethylaminocarbonyl | H | $(M + H)^+ = 752$ |
| 1.2 | 4-(3-carboxypropyloxy)-2,6-dimethoxy-phenyl | 2-cyclohexyl-ethylaminocarbonyl | H | $(M + H)^+ = 782$ |
| 1.3 | 3-carboxymethyloxy-phenyl | dimethylamino-carbonyl | H | m.p. 195° C. (decomp.) $(M + H)^+ = 608$ |
| 1.4 | 3-carboxymethyloxy-phenyl | piperidinocarbonyl | H | m.p. 197° C. $(M + H)^+ = 648$ |
| 1.5 | 3-carboxymethyloxy-phenyl | morpholinocarbonyl | H | m.p. 198° C. $(M + H)^+ = 650$ |
| 1.6 | 3-carboxymethyloxy-phenyl | 4-methylpiperazino-carbonyl | H | m.p. 232° C. $(M + H)^+ = 663$ |
| 1.7 | 4-(3-carboxypropyloxy)-2-methoxy-phenyl | 4-methylpiperazino-carbonyl | H | $(M + H)^+ = 721$ |
| 1.8 | 4-(3-carboxypropyloxy)-2-methoxy-phenyl | 4-(1-adamantylmethyl)-piperazinocarbonyl | H | $(M - H)^- = 854$ |
| 1.9 | 3-carboxymethyloxy-phenyl | 2-phenylethylamino-carbonyl | H | $(M + H)^+ = 548$ |
| 1.10 | 4-(3-carboxypropyloxy)-2-methoxy-phenyl | 2-phenylethylamino-carbonyl | H | $(M + H)^+ = 742$ |
| 1.11 | 3-carboxymethylamino-phenyl | 2-cyclohexylethylamino-carbonyl | H | $(M + H)^+ = 689$ |
| 1.12 | 3-carboxymethylamino-phenyl | 4(1-adamantylmethyl)-piperazinocarbonyl | H | $(M + H)^+ = 796$ |
| 1.13 | 3-carboxymethyloxy-phenyl | 2-(3,4 dimethoxyphenyl)-ethylaminocarbonyl | H | $(M - H)^- = 742$ |
| 1.14 | 3-carboxymethyloxy-phenyl | H | 2-cyclohexyl-ethylamino-carbonyl | $(M - H)^- = 688$ |

EXAMPLE 2

5-(Benzylaminocarbonyl)-2-(3-carboxymethyloxy-phenyl)-1-dehydroabietyl-benzimidazole

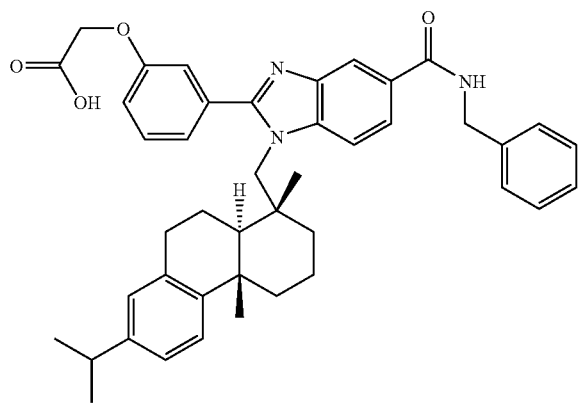

a. Benzyl 4-fluoro-3-nitrobenzoate 13.9 g (75 mmol) 4-fluoro-3-nitrobenzoic acid are dissolved in 100 ml THF. 17.4 ml (100 mmol) N-ethyl-diisopropylamine are added and 12.82 g (75 mmol) benzylbromide are added dropwise. The mixture is stirred for 15 hours at ambient temperature. Then 200 ml of ethyl acetate are added. The reaction solution is washed with water. The organic phase is extracted with 50 ml 1N hydrochloric acid and washed again with saturated sodium chloride solution, then dried with sodium sulphate and evaporated down. The residue is chromatographed on silica gel (cyclohexane/ethyl acetate=4:1). The product is dissolved in dichloromethane and filtered through basic aluminium oxide. Then the solvent is eliminated in vacuo.

Yield: 15.4 g (56 mmol, 75% of theory)
$C_{14}H_{10}FNO_4$ (275.24)
Mass spectrum: $M^+=275$
$R_f$ value: 0.61 (silica gel, cyclohexane/ethyl acetate=2:1)

b. Benzyl 4-dehydroabietylamino-3-nitro-benzoate 571 mg (2 mmol) (+)-dehydroabietylamine are dissolved in 20 ml DMF. 400 mg (2.9 mmol) potassium carbonate and a solution of 550 mg (2 mmol) benzyl 4-fluoro-3-nitrobenzoate in 20 ml DMF are added. After 15 hours' stirring a further 24 mg (0.084 mmol) (+)-dehydroabietylamine are added, and the mixture is stirred for a further hour. The reaction solution is filtered through basic Alox, washed three times more with 15 ml DMF and evaporated to dryness.

Yield: 1.09 g (2 mmol, 100% of theory)
$C_{34}H_{40}N_2O_4$ (540.71)
Mass spectrum: $(M+Na)^+=563$ c. 3-Amino-4-dehydroabietylamino-benzoic acid-hydrochloride 1.09 g (2 mmol) benzyl 4-dehydroabietylamino-3-nitro-benzoate are dissolved in 40 ml of methanol and 20 ml THF and combined with 2 ml 1 N hydrochloric acid and 200 mg palladium/charcoal (10%). The reaction solution is hydrogenated for 2 hours at 3 bar hydrogen pressure and ambient temperature. Then the catalyst is removed by suction filtering and the filtrate concentrated by rotary evaporation with some water.

Yield: 0.95 g (2 mmol, 100% of theory)
$C_{27}H_{36}N_2O_2$ (420.60)
Mass spectrum: $(M+H)^+=421$
$R_f$ value: 0.37 (silica gel, dichloromethane/methanol/$NH_4OH$=4:1:0.1)

d. 2-(3-tert-Butoxycarbonylmethyl-phenyl)-4-dehydroabietyl-benzimidazole-5-carboxylic acid 0.93 g (2 mmol) 3-amino-4-dehydroabietylamino-benzoic acid are dissolved in 40 ml DMF and combined with 0.48 g (2 mmol) 3-tert-butoxycarbonylmethyloxy-benzaldehyde. After 15 hours' stirring at ambient temperature the solvent is concentrated by evaporation and the residue chromatographed over silica gel (dichloromethane/methanol/$NH_4OH$=85:15:1.5->75:25:2.5).

Yield: 0.75 g (1.18 mmol, 58% of theory)
$C_{40}H_{48}N_2O_5$ (636.84)
Mass spectrum: $(M+H)^+=637$
$R_f$ value: 0.40 (silica gel, dichloromethane/methanol/$NH_4OH$=4:1:0.25)

e. 5-(Benzylaminocarbonyl)-2-(3-carboxymethyloxy-phenyl)-1-dehydroabietyl-benzimidazole 21.6 mg (0.034 mmol) 2-(3-tert-butoxycarbonylmethyloxy-phenyl)-4-dehydroabietyl-benzimidazole-5-carboxylic acid are added to a solution of 0.3 ml benzylamine solution (0.1M in DMSO), 11 mg (0.034 mmol) TBTU and 5 μl (0.034 mmol) triethylamine in 0.2 ml DMF and shaken for 3 days at ambient temperature. Then the mixture is filtered through basic Alox and evaporated to dryness. The residue is taken up with 0.25 ml TFA/dichloromethane/water (50:45:5), shaken, left to stand for 1 hour and concentrated by evaporation.

Yield: 21 mg (0.031 mmol, 100% of theory)
$C_{43}H_{47}N_3O_4$ (669.87)
Mass spectrum: $(M+H)^+=670$
$R_f$ value: 0.14 (dichloromethane/methanol/$NH_{40}H$=9:1:0.1)

The compounds of Examples 2.1 to 2.80 listed in Table I are prepared analogously to Example 2:

TABLE II

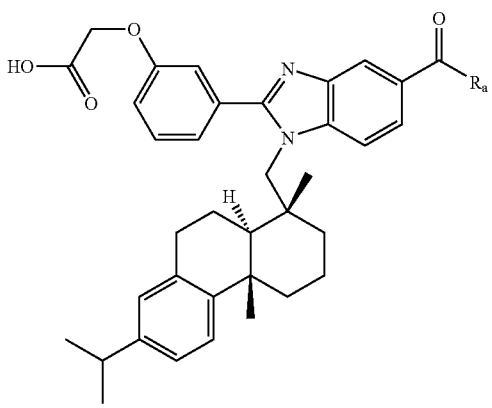

| Example | $R_a$ | physical data |
|---|---|---|
| 2.1 | 2-(1H-imidazol-4-yl)-ethylamino | $(M + H)^+ = 674$ |
| 2.2 | 4-(3,4-dimethoxyphenyl)-piperazino | $(M + H)^+ = 785$ |
| 2.3 | 3-phenylpropylamino | $(M + H)^+ = 698$ |
| 2.4 | 4-(4-methoxyphenyl)-piperazinyl | $(M + H)^+ = 755$ |

TABLE II-continued

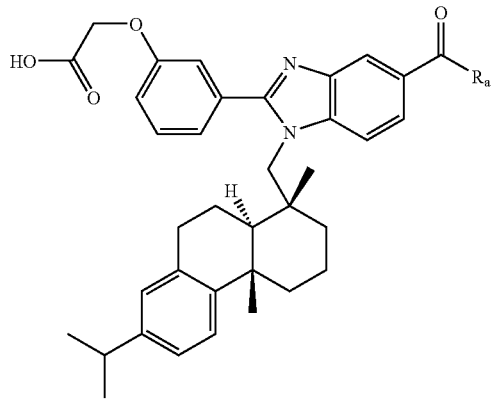

| Example | $R_a$ | physical data |
|---|---|---|
| 2.5 | 7,8-dimethoxy-1,2,4,5-tetrahydro-benzo[d]azepin-3-yl | $(M + H)^+ = 770$ |
| 2.6 | 2-(3-methoxyphenyl)-ethylamino | $(M + H)^+ = 714$ |
| 2.7 | 3-(4-amino-3,5-dichlorophenyl)-propylamino | $(M + H)^+ = 781$ |
| 2.8 | 2-phenylethylamino | $(M + H)^+ = 684$ |
| 2.9 | 2-(4-methoxyphenyl)-ethylamino | $(M + H)^+ = 714$ |
| 2.10 | 3-(4-methoxyphenyl)-propylamino | $(M + H)^+ = 728$ |
| 2.11 | 3-(imidazol-1-yl)-proylamino | $(M + H)^+ = 688$ |
| 2.12 | N-methyl-N-(2-phenylethyl)-amino | $(M + H)^+ = 698$ |
| 2.13 | 3,4,5-trimethoxybenzylamino | $(M + H)^+ = 760$ |
| 2.14 | 2-(4-amino-3,5-dibromophenyl)-ethylamino | $(M + H)^+ = 857$ |
| 2.15 | 2-(pyridin-4-yl)-ethylamino | $(M + H)^+ = 685$ |
| 2.16 | 4-trifluoromethoxybenzyl-amino | $(M + H)^+ = 754$ |
| 2.17 | 4-benzylpiperazino | $(M - H)^- = 737$ |
| 2.18 | 4-([1,2,3]thiadiazol-4-yl)-benzylamino | $(M + H)^+ = 754$ |
| 2.19 | 2-(4-nitropyridin-2-ylamino)-ethylamino | $(M + H)^+ = 745$ |
| 2.20 | 3-(cyclohexyloxy)-propylamino | $(M + H)^+ = 718$ |
| 2.21 | adamantan-1-ylmethylamino | $(M + H)^+ = 728$ |
| 2.22 | 3-[2-(2,4-dimethoxyphenyl)-1H-imidazol-4-yl]-propylamino | $(M + H)^+ = 824$ |
| 2.23 | 2-methylpropylamino | $(M + H)^+ = 636$ |
| 2.24 | 2-ethylsulphanyl-ethyl | $(M + H)^+ = 668$ |
| 2.25 | 2-(4-tert-butylphenyl)-ethylamino | $(M + H)^+ = 740$ |
| 2.26 | 2-dimethylainino-ethylamino | $(M + H)^+ = 651$ |
| 2.27 | 2-hydroxyethylamino | $(M + H)^+ = 624$ |
| 2.28 | butylamino | $(M + H)^+ = 636$ |
| 2.29 | 2,2-dimethylpropylamino | $(M + H)^+ = 650$ |
| 2.30 | 2-(1-napthyl)-ethylamino | $(M + H)^+ = 734$ |
| 2.31 | 2-(4-cyanophenyl)-ethylamino | $(M + H)^+ = 709$ |
| 2.32 | 2-carboxyethylamino | $(M + H)^+ = 652$ |
| 2.33 | 2-morpholinocarbonyl-ethylamino | $(M + H)^+ = 721$ |
| 2.34 | 2-(4-methyloxycarbonyl-phenyl)-ethylamino | $(M + H)^+ = 742$ |
| 2.35 | 2-(4-bromophenyl)-ethylamino | $(M + H)^+ = 764, 762$ |
| 2.36 | 2-methoxyethylamino | $(M + H)^+ = 638$ |
| 2.37 | allylamino | $(M + H)^+ = 620$ |
| 2.38 | 2-cyanoethylamino | $(M + H)^+ = 633$ |
| 2.39 | 2-methoxycarbonyl-ethylamino | $(M + H)^+ = 666$ |
| 2.40 | 3-(2-oxo-pyrrolidin-1-yl)-propylamino | $(M + H)^+ = 705$ |
| 2.41 | 3,3-dimethylbutylamino | $(M + H)^+ = 664$ |
| 2.42 | 2-methylsuiphanyl-ethyl | $(M + H)^+ = 654$ |
| 2.43 | 2-(4-phenylphenyl)-ethylamino | $(M + H)^+ = 760$ |
| 2.44 | 4-methylcyclohexyl-amino | $(M + H)^+ = 676$ |
| 2.45 | cyclohexylmethylamino | $(M + H)^+ = 676$ |
| 2.46 | 3-methylbutylamino | $(M + H)^+ = 650$ |
| 2.47 | 3-methoxypropylamino | $(M + H)^+ = 652$ |
| 2.48 | 2-(4-aminocarbonyl-phenyl)-ethylamino | $(M + H)^+ = 727$ |
| 2.49 | 3-hydroxybutylamino | $(M + H)^+ = 652$ |
| 2.50 | 2-hydroxy-2-phenyl-ethylamino | $(M + H)^+ = 700$ |
| 2.51 | propylamino | $(M + H)^+ = 622$ |

TABLE II-continued

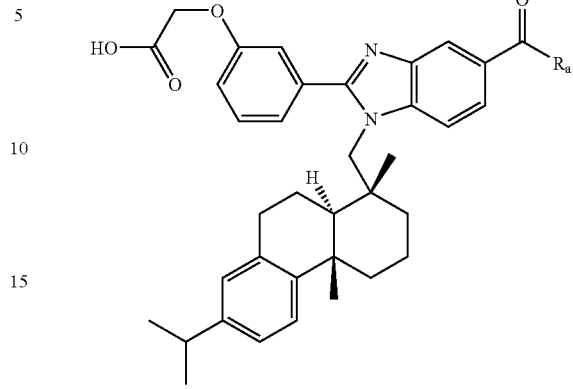

| Example | $R_a$ | physical data |
|---|---|---|
| 2.52 | 2-(thiophen-2-yl)-ethylamino | $(M + H)^+ = 690$ |
| 2.53 | 2-(imidazol-1-yl-)-ethylamino | $(M + H)^+ = 674$ |
| 2.54 | furan-2-ylcarbonyl-methylamino | $(M + H)^+ = 688$ |
| 2.55 | 2-(4-aminosulphonyl-phenyl)-ethylamino | $(M + H)^+ = 763$ |
| 2.56 | 3-hydroxypropylamino | $(M + H)^+ = 638$ |
| 2.57 | cyanomethylamino | $(M + Na)^+ = 641$ |
| 2.58 | 2-(4-methoxycarbonyl-methyl-phenyl)-ethylamino | $(M + H)^+ = 756$ |
| 2.59 | 2-(tert-butoxycarbonylamino)-ethylamino | $(M + H)^+ = 724$ |
| 2.60 | 4-cyclohexylbutylamino | $(M + H)^+ = 719$ |
| 2.61 | 3-methoxycarbonyl-propylamino | $(M + H)^+ = 680$ |
| 2.62 | pentylamino | $(M + H)^+ = 650$ |
| 2.63 | 2-isopropoxy-ethylamino | $(M + H)^+ = 666$ |
| 2.64 | 4-(pyridin-4-yl)-butylamino | $(M + H)^+ = 713$ |
| 2.65 | 1-cyclohexylcarbonyl-ethylamino | $(M + H)^+ = 718$ |
| 2.66 | 2-(N-methylpyrrolidin-2-yl)-ethylamino | $(M + H)^+ = 691$ |
| 2.67 | 2-(pyridin-3-yl)-ethylamino | $(M + H)^+ = 685$ |
| 2.68 | 4-(pyridin-3-yl)-butylamino | $(M + H)^+ = 713$ |
| 2.69 | 2-(cyclohexen-1-yl)-ethylamino | $(M + H)^+ = 688$ |
| 2.70 | 2-(4-chlorophenyl)-ethyl amino | $(M + H)^+ = 718$ |
| 2.71 | 4-(adamantan-1-ylmethyl)-piperazino | $(M + H)^+ = 797$ |
| 2.72 | 2-(pyridin-2-yl)-ethylamino | $(M + H)^+ = 685$ |
| 2.73 | 1-methyl-2-(pyridin-2-yloxy)-ethylamino | $(M - H)^- = 713$ |
| 2.74 | 2-(3-hydroxyphenyl)-ethylamino | $(M + H)^+ = 780, 778$ |
| 2.75 | (E)-3,7-dimethylocta-2,6-dienylamino | $(M + H)^+ = 716$ |
| 2.76 | 3,4-dihydro-1H-isoquinolin-2-yl | $(M + H)^+ = 696$ |
| 2.77 | octahydroisoquinolin-2-yl | $(M + H)^+ = 702$ |
| 2.78 | 2-(4-hydroxyphenyl)-ethylamino | $(M + H)^+ = 700$ |
| 2.79 | 2-(4-hydroxy-3-methoxyphenyl)-ethylamino | $(M + H)^+ = 730$ |
| 2.80 | 2-[4-(4-hydroxyphenoxy)-phenyl]-ethylamino | $(M + H)^+ = 792$ |

EXAMPLE 3

2-(3-carboxymethyloxy-phenyl)-1-dehydroabietyl-5-(2-nitrophenyl)-benzimidazole

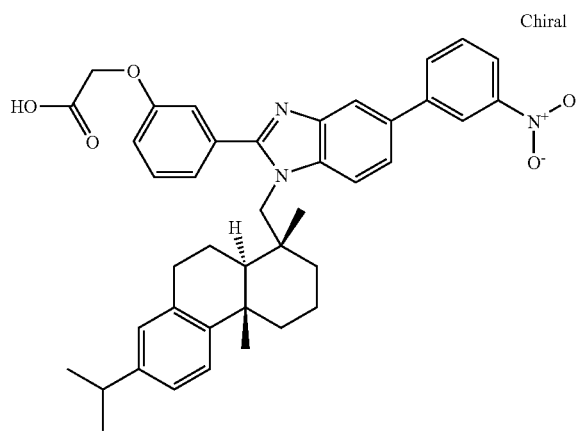

a. 4-Bromo-1-dehydroabietylamino-2-nitrobenzene 7.04 g (32 mmol) 4-bromo-1-fluoro-2-nitrobenzene are dissolved in 200 ml DMF and combined with 13.3 g (96 mmol) potassium carbonate and 9.14 g (32 mmol) (+)-dehydroabietylamine. The mixture is stirred for 3 hours at ambient temperature. Then the solid is separated off by suction filtering and the filtrate is evaporated to dryness. The orange residue is dissolved in 450 ml acetone and combined with 150 ml of water. The product precipitates out, is suction filtered and dried in vacuo.

Yield: 12 g (25 mmol, 78% of theory)
melting point: 149–150° C.
$C_{26}H_{33}BrN_2O_2$ (485.47)
Mass spectrum: $[M+H]^+=487, 485$ b. 2-Amino-4-bromo-1-dehydroabietylamino-benzene 3.5 g (7.2 mmol) 4-bromo-1-dehydroabietylamino-2-nitrobenzene are dissolved in 100 ml of ethyl acetate and 20 ml THF and combined with 1 g Raney nickel. The mixture is hydrogenated for 8 hours at ambient temperature under a hydrogen atmosphere of 3 bar. Then the catalyst is filtered off and the filtrate is freed from solvent in vacuo.

Yield 3.2 g (7 mmol, 97% of theory)
$C_{26}H_{35}BrN_2$ (455.49)
Mass spectrum: $[M+H]^+=457, 455$ c. 2-(3-tert-Butoxycarbonylmethyloxy-phenyl)-5-bromo-1-dehydroabietyl-benzimidazole Prepared analogously to Example 1c from 2-amino-4-bromo-1-dehydroabietylamino-benzene and tert-butyl 3-formylphenoxyacetate.

Yield: 40% of theory
$C_{39}H_{47}BrN_2O_3$ (671.73)
Mass spectrum: $[M+H]^+=673, 671$ d. 2-(3-tert-Butoxycarbonylmethyloxy-phenyl)-1-dehydroabietyl-5-(2-nitrophenyl)-benzimidazole 0.67 g (1 mmol) 2-(3-tert-butoxycarbonyl-methyloxy-phenyl)-5-bromo-1-dehydroabietyl-benzimidazole are dissolved in 5 ml dioxane under a nitrogen atmosphere. 0.3 g (1.8 mmol) 3-nitrophenylboric acid, 0.05 g (0.043 mmol) tetrakis-(triphenylphosphine)-palladium(0) and 1 ml 2 M aqueous sodium carbonate solution are added and the mixture is refluxed for 15 hours. Then the reaction solution is combined with aqueous sodium hydrogen carbonate solution and extracted with ethyl acetate. The combined organic phases are evaporated down. The residue is chromatographed on silica gel (petroleum ether/ethyl acetate=3:1->1:1).

Yield: 0.37 g (0.52 mmol, 52% of theory)
melting point: 126–128° C.
$C_{45}H_{51}N_3O_5$ (713.92)
Mass spectrum: $[M+H]^+=714$ e. 2-(3-Carboxymethyloxy-phenyl)-1-dehydroabietyl-5-(2-nitrophenyl)-benzimidazole 0.34 g (0.476 mmol) 2-(3-tert-butoxycarbonylmethyloxy-phenyl)-1-dehydroabietyl-5-(2-nitrophenyl)-benzimidazole are dissolved in 6 ml dichloromethane. 6 ml trifluoroacetic acid and 0.04 ml of water are added and the mixture is stirred for 1 hour at ambient temperature. Then the solution is evaporated down and the residue is chromatographed on silica gel (petroleum ether/ethyl acetate/acetic acid=3:1:0.08->ethyl acetate/methanol/acetic acid=2:1:0.06).

Yield: 0.29 g (0.44 mmol, 93% of theory)
melting point: 258–262° C.
$C_{41}H_{43}N_3O_5$ (657.82)
Mass spectrum: $[M-H]^-=656$ The compounds of Examples 3.1 to 3.37 listed in Tables IIIa and IIIb are prepared analogously to Example 3:

TABLE IIIa

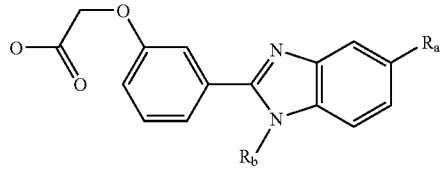

| Example | $R_a$ | $R_b$ | physical data |
|---|---|---|---|
| 3.1 | 2-nitrophenyl | dehydroabietyl | m.p. 168–172° C. $(M + H)^+ = 658$ |
| 3.2 | 4-nitrophenyl | dehydroabietyl | m.p. 172–176° C. $(M + H)^+ = 658$ |
| 3.3 | 4-fluorophenyl | dehydroabietyl | m.p. 220–226° C. $(M - H)^- = 629$ |
| 3.4 | 3-fluorophenyl | dehydroabietyl | m.p. 108° C. $(M + H)^+ = 631$ |
| 3.5 | 3,5-difluorophenyl | dehydroabietyl | m.p. 233° C. $M^+ = 648$ |
| 3.6 | 3,4-difluorophenyl | dehydroabietyl | m.p. 133–141 ° C. $(M - H)^- = 647$ |
| 3.7 | 4-chlorophenyl | dehydroabietyl | m.p. 129–156° C. $(M + H)^+ = 649, 647$ |
| 3.8 | 3-cyanophenyl | dehydroabietyl | m.p. 202° C. $(M + H)^+ = 638$ |
| 3.9 | 4-cyanophenyl | dehydroabietyl | $(M - H)^- = 636$ |
| 3.10 | 2-methoxyphenyl | dehydroabietyl | m.p. 200–203° C. $(M + H)^+ = 643$ |
| 3.11 | 3-methoxyphenyl | dehydroabietyl | m.p. 120° C. $(M + H)^+ = 643$ |

TABLE IIIa-continued

| Example | $R_a$ | $R_b$ | physical data |
|---|---|---|---|
| 3.12 | 4-methoxyphenyl | dehydroabietyl | m.p. 227–233° C. (M + H)$^+$ = 643 |
| 3.13 | 3-benzyloxyphenyl | dehydroabietyl | m.p. 138–142° C. (M + H)$^+$ = 719 |
| 3.14 | 2-trifluoromethoxy-phenyl | dehydroabietyl | m.p. 172–175° C. (M + H)$^+$ = 697 |
| 3.15 | 2-methylsulphanyl-phenyl | dehydroabietyl | m.p. 154–160° C. (M + H)$^+$ = 659 |
| 3.16 | 3-methylphenyl | dehydroabietyl | (M + H)$^+$ = 627 |
| 3.17 | 2-methylphenyl | dehydroabietyl | m.p. 146–150° C. (M − H)$^-$ = 625 |
| 3.18 | 4-trifluoromethyl-phenyl | dehydroabietyl | m.p. 157–163° C. (M − H)$^-$ = 679 |
| 3.19 | 2-acetylphenyl | dehydroabietyl | (M + H)$^+$ = 655 |
| 3.20 | 3-acetylphenyl | dehydroabietyl | m.p. 146–149° C. (M + H)$^+$ = 655 |
| 3.21 | 4-acetylphenyl | dehydroabietyl | m.p. 176–180° C. (M + H)$^+$ = 655 |
| 3.22 | 3-carboxyphenyl | dehydroabietyl | m.p. 201–205° C. M$^+$ = 656 |
| 3.23 | 4-carboxyphenyl | dehydroabietyl | m.p. 294–296° C. (M − H)$^-$ = 655 |
| 3.24 | 3-formylphenyl | dehydroabietyl | (M + H)$^+$ = 641 |
| 3.25 | 4-formylphenyl | dehydroabietyl | (M + H)$^+$ = 641 |
| 3.26 | thiophen-3-yl | dehydroabietyl | (M + H)$^+$ = 619 |
| 3.27 | pyridin-3-yl | dehydroabietyl | m.p. 252–256° C. (M − H)$^-$ = 612 |
| 3.28 | quinolin-8-yl | dehydroabietyl | (M + H)$^+$ = 664 |
| 3.29 | 3-aminocarbonyl-phenyl | dehydroabietyl | (M + H)$^+$ = 656 |
| 3.30 | 4-acetylphenyl | 4-cyclohexyl-phenyl | m.p. 187° C. (M − H)$^-$ = 543 |
| 3.31 | 4-acetylphenyl | 4-tert-butyl-phenyl | m.p. 246° C. (M − H)$^-$ = 517 |
| 3.32 | 4-acetylphenyl | 2-(4-tert-butyl-phenyl)-ethyl | m.p. 230° C. (M − H)$^-$ = 545 |
| 3.33 | 4-pyridyl | dehydroabietyl | m.p. >200° C. decomp. |

TABLE IIIb

| Example | R | physical data |
|---|---|---|
| 3.34 | 3-cyanophenyl | m.p. 185° C. (M + H)$^+$ = 696 |
| 3.35 | 4-acetylphenyl | (M + H)$^+$ = 713 |
| 3.36 | 3-Actetylaminophenyl | m.p. 257° C. (M + H)$^+$ = 728 |
| 3.37 | 4-cyanophenyl | (M + H)$^+$ = 696 |

EXAMPLE 4

2-(3-Carboxymethyloxy-phenyl)-1-dehydroabietyl-5-(3-hydroxyphenyl)-benzimidazole

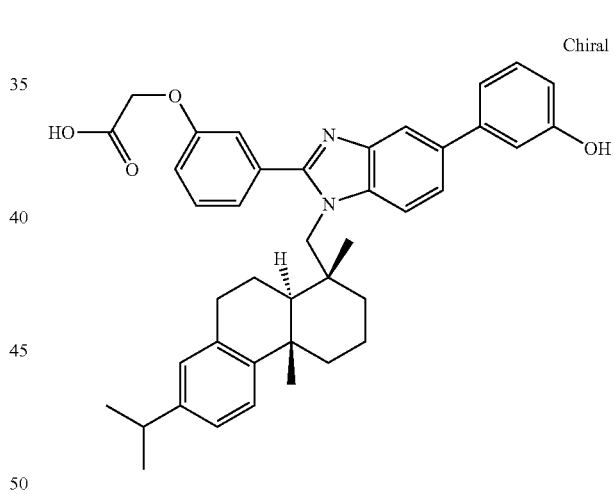

0.3 g (0.42 mmol) 2-(3-carboxymethyloxy-phenyl)-1-dehydroabietyl-5-(3-benzyloxy-phenyl)-benzimidazole (see Example 3.13) are dissolved in 30 ml of ethanol and 3 ml acetic acid and combined with 0.2 g palladium/charcoal. The mixture is hydrogenated for 27 hours at ambient temperature under a hydrogen pressure of 3.5 bar. Then the catalyst is filtered off and the solvent is distilled off. The residue is chromatographed on silica gel (ethyl acetate/petroleum ether/acetic acid=1:1:0.02->ethyl acetate/methanol/acetic acid=5:1:0.06).

Yield: 0.11 g (0.18 mmol, 42% of theory)

melting point: 238–242° C.

$C_{41}H_{44}N_2O_4$ (628.82)

Mass spectrum: [M+H]$^+$=629

EXAMPLE 5

2-(3-Carboxymethyloxy-phenyl)-1-dehydroabietyl-5-(2-methylsulphonylphenyl)-benzimidazole

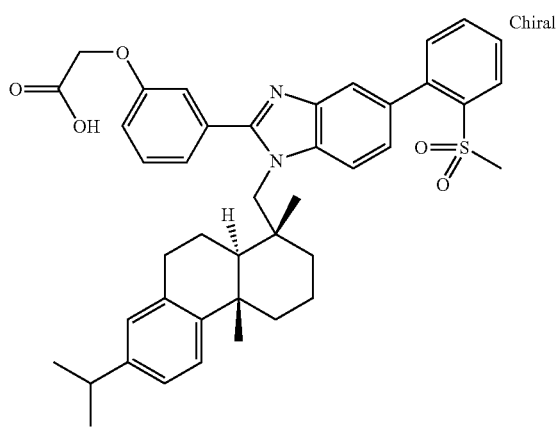

50 mg (0.076 mmol) 2-(3-carboxymethyloxy-phenyl)-1-dehydroabietyl-5-(2-methylsulphanylphenyl)-benzimidazole (see Example 3.15) are dissolved in 2 ml dichloromethane and at 0° C. combined with 33 mg (0.19 mmol) 3-chloroperbenzoic acid (77%). Then the mixture is stirred for 48 hours at ambient temperature. It is diluted with dichloromethane and the reaction solution is washed with 1 M aqueous sodium hydrogen sulphite solution. The organic phases are dried and evaporated down. The residue is chromatographed over silica gel (dichloromethane/methanol/NH$_4$OH=9:1:0.1->4:1:0.1).

Yield: 19 mg (0.03 mmol, 36% of theory)
C$_{42}$H$_{46}$N$_2$O$_5$S (690.91)
Mass spectrum: [M+H]$^+$=691

EXAMPLE 6

2-(3-Carboxymethyloxy-phenyl)-1-dehydroabietyl-5-(2-aminophenyl)-benzimidazole

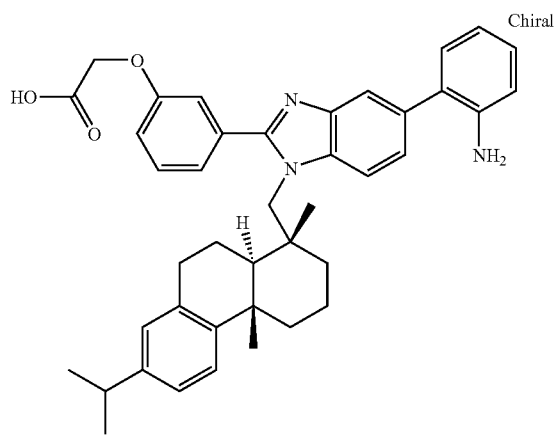

Prepared analogously to Example 3.b by catalytic hydrogenation of 2-(3-carboxymethoxy-phenyl)-1-dehydroabietyl-5-(2-nitrophenyl)-benzimidazole (Example 3.1) on Raney nickel in ethyl acetate.

Yield: 55% of theory
Melting point: 186–190° C.
C$_{41}$H$_{45}$N$_3$O$_3$ (627.83)
Mass spectrum: [M+H]$^+$=628

EXAMPLE 7

2-(3-Carboxymethyloxy-phenyl)-1-dehydroabietyl-5-(3-aminophenyl)-benzimidazole

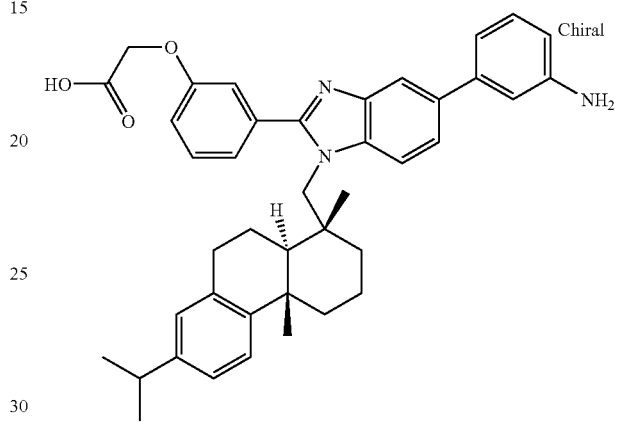

Prepared analogously to Example 3.b by catalytic hydrogenation of 2-(3-carboxymethyloxy-phenyl)-1-dehydroabietyl-5-(3-nitrophenyl)-benzimidazole (Example 3) on Raney nickel in ethyl acetate.

Yield: 49% of theory
C$_{41}$H$_{45}$N$_3$O$_3$ (627.83)
Mass spectrum: [M–H]$^-$=626

EXAMPLE 8

2-(3-carboxymethyloxy-phenyl)-1-dehydroabietyl-5-(4-dimethylaminomethyl-phenyl)-benzimidazole-hydrotrifluoroacetate

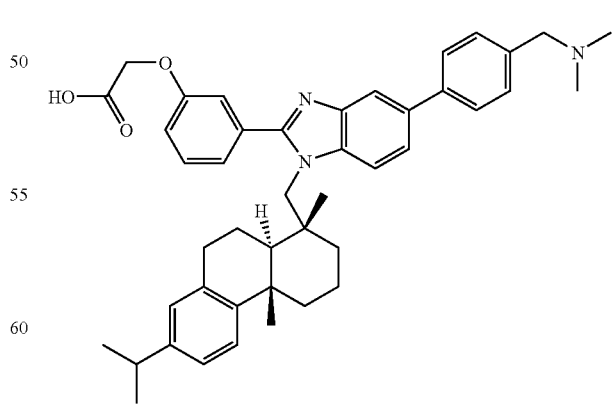

a. 2-(3-tert-butoxycarbonylmethyloxy-phenyl)-1-dehydroabietyl-5-(4-dimethylaminomethyl-phenyl)- benzimidazole 175 mg (0.25 mmol) 2-(3-tert-butoxycarbonylmethyloxy-phenyl)-1-dehydroabietyl-5-(4-formylphenyl)-benzimidazole (prepared analogously to Example 3d) are dissolved in 5 ml THF and combined with 0.5 ml (1 mmol) dimethylamine (2 M in THF). The pH is adjusted to 4–5 with acetic acid and then 53 mg (0.25 mmol) sodium triacetoxyborohydride are added and stirred for 5 hours at ambient temperature. Then sodium hydrogen carbonate solution and ethyl acetate are added. The reaction solution is extracted with ethyl acetate. The combined organic phases are dried over magnesium sulphate and evaporated down. The residue is stirred with petroleum ether, suction filtered and dried.

Yield: 130 mg (0.18 mmol, 73% of theory)

$C_{48}H_{59}N_3O_3$ (726.02)

Mass spectrum: $[M+H]^+=726$ b. 2-(3-carboxymethyloxy-phenyl)-1-dehydroabietyl-5-(4-dimethylaminomethyl-phenyl)-benzimidazole-hydrotrifluoroacetate Prepared analogously to Example 3e from 2-(3-tert-butoxycarbonylmethyloxy-phenyl)-1-dehydroabietyl-5-(4-dimethylaminomethyl-phenyl)-benzimidazole.

Yield: 74% of theory $C_{44}H_{51}N_3O_3 \times C_2HF_3O_2$ (783.94)

Mass spectrum: $[M+H]^+=670$

EXAMPLE 9

2-(3-Carboxymethyloxy-phenyl)-1-dehydroabietyl-5-(3-dimethylaminomethyl-phenyl)-benzimidazole-hydrotrifluoroacetate

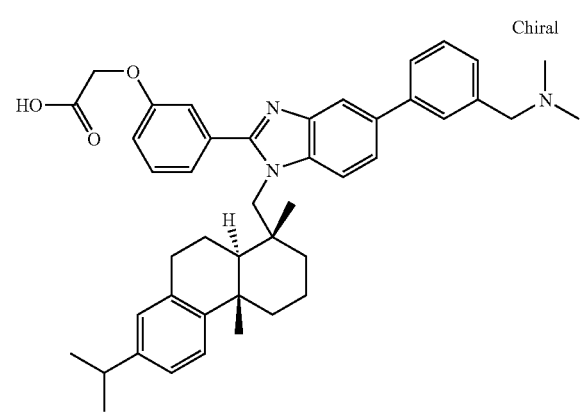

Prepared analogously to Example 8 from 2-(3-tert-butoxycarbonylmethyloxy-phenyl)-1-dehydroabietyl-5-(3-dimethylaminomethyl-phenyl)-benzimidazole.

Yield: 98% of theory

Melting point: 127° C.

$C_{44}H_{53}N_3O_3 \times C_2HF_3O_2$ (783.94)

Mass spectrum: $M^+=669$

EXAMPLE 10

2-(3-Carboxymethyloxy-phenyl)-1-dehydroabietyl-5-(3-morpholinomethyl-phenyl)-benzimidazole-hydrotrifluoroacetate

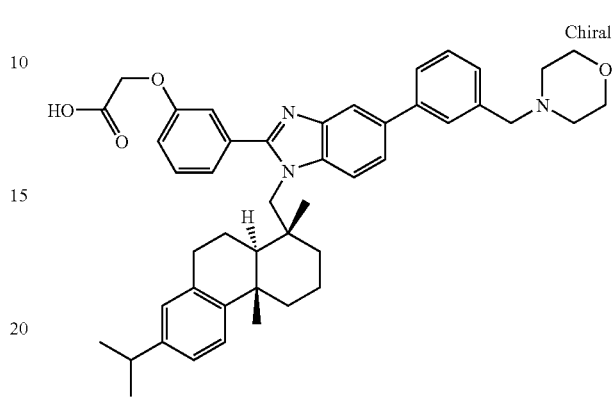

Prepared analogously to Example 8 from 2-(3-tert-butoxycarbonylmethyloxy-phenyl)-1-dehydroabietyl-5-(3-morpholinomethyl-phenyl)-benzimidazole.

Yield: 99% of theory $C_{46}H_{53}N_3O_4 \times C_2HF_3O_2$ (825.98)

Melting point: 133° C. (decomp.)

Mass spectrum: $[M+H]^+=712$

EXAMPLE 11

2-(3-Carboxymethyloxy-phenyl)-5-(3-carboxymethyloxy-phenyl)-1-dehydroabietyl-benzimidazole

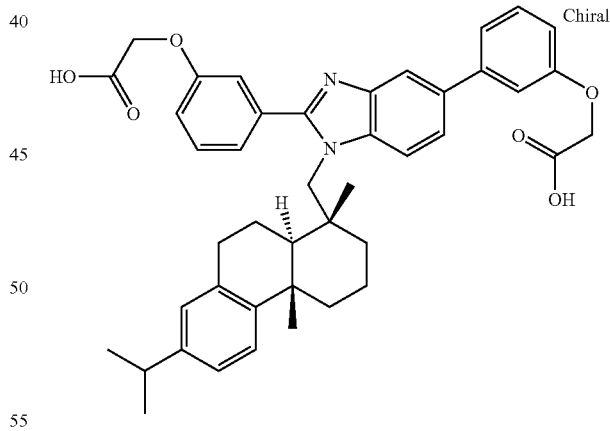

a. 2-(3-tert-butoxycarbonylmethyloxy-phenyl)-5-(3-tert-butoxycarbonylmethyloxy-phenyl)-1-dehydroabietyl-benzimidazole 0.13 g (0.19 mmol) 2-(3-tert-butoxycarbonylmethyloxy-phenyl)-5-(3-tert-butoxycarbonylmethyloxy-phenyl)-1-dehydroabietyl-benzimidazole (prepared analogously to Example 4) are dissolved in 2 ml DMF and combined with 0.026 g (0.19 mmol) potassium carbonate. The mixture is stirred for 1 hour at ambient temperature and 0.027 ml (0.19 mmol) tert-butyl chloroacetate are added. The mixture is stirred for 52 hours at ambient temperature and then the solvent is eliminated in vacuo. The residue is taken up in dichloromethane and washed twice with soda solution and twice with 10% citric acid. The organic phase is evaporated down and the residue is chromatographed on silica gel (petroleum ether/ethyl acetate=5:1->2:1).

Yield: 0.16 g (0.2 mmol, 99% of theory)
$C_{51}H_{62}N_2O_6$ (799.07)
Mass spectrum: $M^+$=799 b. 2-(3-carboxymethyloxy-phenyl)-5-(3-carboxymethyloxy-phenyl)-1-dehydroabietyl-benzimidazole Prepared analogously to Example 3e from 2-(3-tert-butoxycarbonylmethyloxy-phenyl)-5-(3-tert-butoxycarbonylmethyloxy-phenyl)-1-dehydroabietyl-benzimidazol Yield: 89% of theory
$C_{43}H_{46}N_2O_6$ (686.86)
Mass spectrum: $[M+H]^+$=687

EXAMPLE 12

5-(4-Acetylaminomethyl-phenyl)-2-(3-carboxymethyloxy-phenyl)-1-dehydroabietyl-benzimidazole

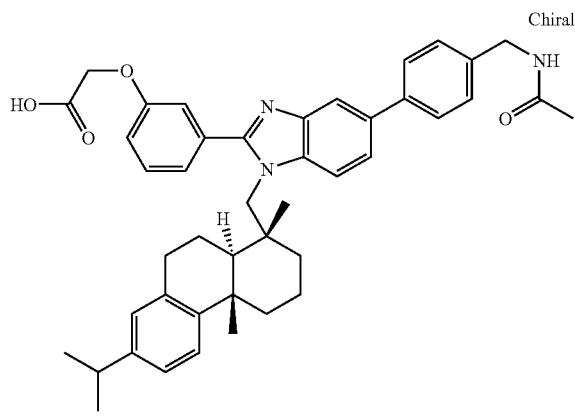

a. 5-(4-acetylaminomethyl-phenyl)-2-(3-tert-butoxycarbonylmethyloxy-phenyl)-1-dehydroabietyl-benzimidazole 250 mg (0.36 mmol) 5-(4-aminomethyl-phenyl)-2-(3-tert-butoxycarbonylmethyloxy-phenyl)-1-dehydroabietyl-benzimidazole (prepared analogously to Example 3d) are dissolved in 10 ml dichloromethane and combined with 0.2 ml (1.5 mmol) triethylamine and 0.055 ml (0.77 mmol) acetylchloride. The mixture is stirred for 15 hours at ambient temperature. Then water is added. The reaction solution is extracted with dichloromethane. The combined organic phases are washed with saturated sodium chloride solution and dried over sodium sulphate. The residue obtained after elimination of the solvent is chromatographed on silica gel (dichloromethane/methanol/$NH_4OH$=9:1:0.1).

Yield: 30 mg (0.04 mmol, 11% of theory)
$C_{48}H_{57}N_3O_4$ (740.01)
Mass spectrum: $[M+H]^+$=740 b. 5-(4-acetylaminomethyl-phenyl)-2-(3-carboxymethyloxy-phenyl)-1-dehydroabietyl-benzimidazole Prepared analogously to Example 3e from 5-(4-acetylaminomethyl-phenyl)-2-(3-tert-butoxycarbonylmethyloxy-phenyl)-1-dehydroabietyl-benzimidazole with trifluoroacetic acid.

Yield: 90% of theory
$C_{44}H_{49}N_3O_4$ (683.90)
Mass spectrum: $[M+H]^+$=684

The compounds of Examples 12.1 and 12.2 listed in Table IV are prepared analogously to Example 12:

TABLE IV

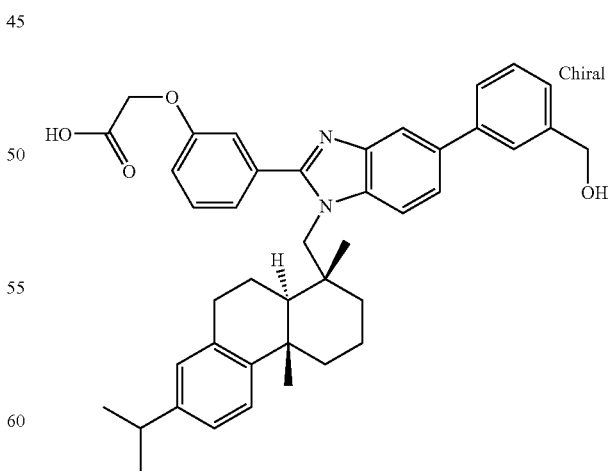

| Example | R | physical data |
|---------|---|---------------|
| 12.1 | 3-acetylamino-phenyl | m.p. 175° C. (decomp.) $(M + H)^+$ = 670 |
| 12.2 | 3-methylsulphonylamino-phenyl | m.p. 166° C. (decomp.) $(M + H)^+$ = 706 |

Example 13

5-(3-Hydroxymethyl-phenyl)-2-(3-carboxymethyloxy-phenyl)-1-dehydroabietyl-benzimidazole 5.4 mg (0.143 mmol) sodium borohydride are added to a solution of 100 mg (0.143 mmol) 5-(3-formylphenyl)-2-(3-tert-butoxycarbonylmethyloxy-phenyl)-1-dehydroabietyl-benzimidazole in 2 ml THF at ambient temperature. The mixture is stirred for 15 hours at ambient temperature. Then 5 ml trifluoroacetic acid are added. After 4 hours' stirring the solvent is eliminated in vacuo. The residue is chromatographed through an RP column (acetonitrile/water=1:9->9:1).

Yield: 9 mg (10% of theory)

$C_{42}H_{46}N_2O_4$ (642.85)

Mass spectrum: $[M+H]^+=643$

EXAMPLE 14

5-[3-(2-Carboxyethylaminocarbonyl)-phenyl]-2-phenyl-1-dehydroabietyl-benzimidazole

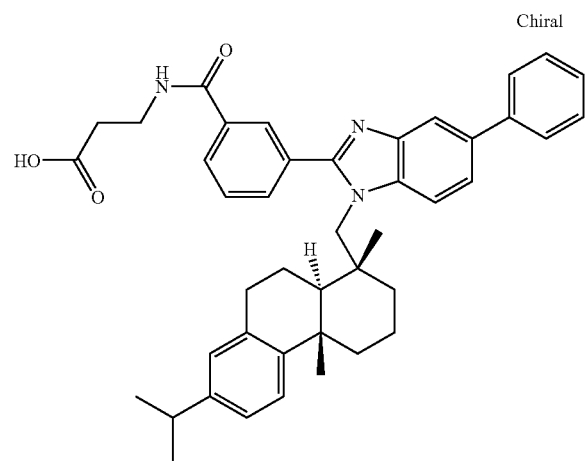

Chiral a. N-dehydroabietyl-2-nitro-4-phenylaniline 9.6 g (33.6 mmol) dehydroabietylamine and 7.2 g (33.1 mmol) 2-nitro-4-phenyl-fluorobenzene (Example I) are dissolved in 50 ml DMF. 7.1 g (51 mmol) potassium carbonate are added and the mixture is stirred for 15 hours at ambient temperature. Then sodium hydrogen carbonate solution and common salt are added and the mixture is extracted with ethyl acetate. The combined organic phases are washed with water and dried over sodium sulphate. Then the solvent is eliminated in vacuo. The residue is stirred with petroleum ether and the residue is suction filtered. The product thus obtained is dried at 60° C.

Yield: 14.9 g (92% of theory)

$C_{32}H_{38}N_2O_2$ (482.67)

Mass spectrum: $(M+H)^+=483$ b. 5-[3-(2-carboxyethylaminocarbonyl)-phenyl]-2-phenyl-1-dehydroabietyl-benzimidazole 0.24 g (0.5 mmol) N-dehydroabietyl-2-nitro-4-phenylaniline are dissolved in 10 ml of ethyl acetate and combined with 50 mg Raney nickel. The mixture is hydrogenated for 5 hours at 50° C. under 3.5 bar hydrogen pressure. Then the reaction solution is suction filtered to 0.5 ml 1 N hydrochloric acid and evaporated to dryness. The phenylenediamine thus obtained is dissolved in 10 ml DMF/water (9:1) and combined with 0.11 g (0.5 mmol) 3-(2-carboxyethylaminocarbonyl)-benzaldehyde. The mixture is stirred for 15 hours at ambient temperature. Then the solvent is eliminated in vacuo.

The residue is chromatographed on silica gel (dichloromethane/methanol/$NH_4OH$=4:1:0.25).

Yield: 0.17 g (52% of theory)

$R_f$ value: 0.56 (silica gel, dichloromethane/methanol/$NH_4OH$=4:1:0.25)

$C_{43}H_{47}N_3O_3$ (653.87)

Mass spectrum: $(M+H)^+=654$

The compounds of Examples 14.1 to 14.96 listed in Table V are prepared analogously to Example 14 using the starting materials which may be obtained by the methods described in Examples I to XIX or by methods known from the literature. If the aldehyde component contains an ester, saponification is additionally carried out using one of the following general methods:

130 mmol of the ester are dissolved in 5 ml THF and stirred with 230 mmol 1 N sodium hydroxide solution for 2 hours at ambient temperature. Then 230 mmol 1 N hydrochloric acid are added. The solvent is eliminated in vacuo and the residue is taken up in dry acetone. Insoluble matter is filtered off and the solvent is again eliminated in vacuo.

390 mmol of the ester are dissolved in 5 ml dichloromethane and combined with 5 ml trifluoroacetic acid. The mixture is stirred for 1–2 hours at ambient temperature. Then the solvent is eliminated in vacuo. Water and a few drops of conc. ammonia are added. The precipitate is suction filtered.

TABLE V

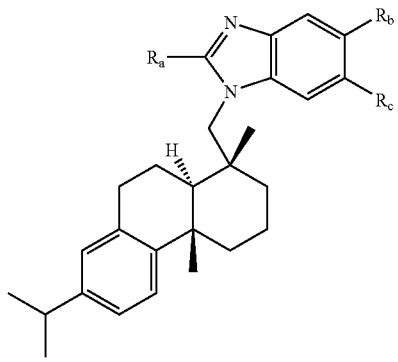

| Example | $R_a$ | $R_b$ | $R_c$ | physical data |
|---|---|---|---|---|
| 14.1 | 3-carboxymethyloxy-phenyl | phenyl | H | $(M + H)^+ = 613$ |
| 14.2 | 4-(3-carboxypropyloxy)-2-methoxy-phenyl | phenyl | H | $(M + H)^+ = 671$ |
| 14.3 | 4-(3-carboxypropyloxy)-2,6-dimethoxy-phenyl | phenyl | H | $(M + H)^+ = 701$ |
| 14.4 | 4-(2-carboxyethyl)-phenyl | phenyl | H | m.p. 298–300° C. $(M + H)^+ = 611$ |
| 14.5 | 4-(2-carboxyethylcarbonylamino)-phenyl | phenyl | H | $(M + H)^+ = 654$ |
| 14.6 | 4-(4-carboxypiperidino)-phenyl | phenyl | H | $(M + H)^+ = 666$ |
| 14.7 | 4-(3-carboxypropyloxy)-3,5-dimethoxy-phenyl | phenyl | H | $(M + H)^+ = 701$ |
| 14.8 | 4-(3-carboxypropyloxy)-3-methoxy-phenyl | phenyl | H | $(M + H)^+ = 671$ |
| 14.9 | 4-(3-carboxypropyloxy)-3-fluorophenyl | phenyl | H | $(M + H)^+ = 659$ |
| 14.10 | 3-(1H-tetrazol-5-ylmethylaminocarbonylmethyloxy)-phenyl | phenyl | H | $(M + H)^+ = 694$ |
| 14.11 | 3-(carboxymethylaminocarbonyl-methyloxy)-phenyl | phenyl | H | $(M + H)^+ = 670$ |
| 14.12 | 3-(1H-tetrazol-5-ylmethylaminocarbonyl)-phenyl | phenyl | H | $(M + H)^+ = 664$ |
| 14.13 | 3-(carboxycarbonylamino)-phenyl | phenyl | H | m.p. 235° C. $(M + H)^+ = 626$ |
| 14.14 | 4-(2-carboxyethylaminocarbonyl)-phenyl | phenyl | H | m.p. 146–171° C. $(M + H)^+ = 654$ |
| 14.15 | 3-(3-carboxypropylaminocarbonyl)-phenyl | phenyl | H | m.p. 121–141° C. $(M - H)^- = 666$ |
| 14.16 | 3-(4-carboxybutyl)-phenyl | phenyl | H | $(M + H)^+ = 639$ |
| 14.17 | 3-(1H-tetrazol-5-ylmethylaminocarbonylmethyl)-phenyl | 3-fluorophenyl | H | $(M + H)^+ = 696$ |
| 14.18 | 3-(2-carboxyethyloxy)-phenyl | phenyl | H | $(M + H)^+ = 627$ |
| 14.19 | 3-(1H-tetrazol-5-ylmethylaminocarbonyl)-phenyl | 3-fluorophenyl | H | $(M + H)^+ = 682$ |
| 14.20 | 4-(2-carboxyethylaminocarbonyl)-phenyl | 3,4-difluorophenyl | H | $(M + H)^+ = 690$ |
| 14.21 | 4-(2-carboxyethylaminocarbonyl)-phenyl | 3,5-difluorophenyl | H | $(M + H)^+ = 690$ |
| 14.22 | 3-(2-carboxyethylaminocarbonyl)-phenyl | 4-isopropylphenyl | H | $(M + H)^+ = 696$ |
| 14.23 | 3-(1H-tetrazol-5-ylmethylaminocarbonyl)-phenyl | 4-isopropylphenyl | H | $(M + H)^+ = 706$ |
| 14.24 | 3-carboxymethyloxy-phenyl | 4-dimethylamino-phenyl | H | $(M - H)^- = 654$ |
| 14.25 | 4-(3-carboxypropyloxy)-phenyl | 3-acetylamino-phenyl | H | $(M + H)^+ = 698$ |
| 14.26 | 3-(2-carboxyethyloxy)-phenyl | 3-acetylamino-phenyl | H | $(M + H)^+ = 684$ |
| 14.27 | 4-(3-carboxypropyloxy)-2-methoxy-phenyl | 3-aminocarbonyl-phenyl | H | $(M + H)^+ = 714$ |
| 14.28 | 3-(2-carboxyethyloxy)-phenyl | 3-aminocarbonyl-phenyl | H | $(M + H)^+ = 670$ |
| 14.29 | 4-(3-carboxypropyloxy)-phenyl | 3-aminocarbonyl-phenyl | H | $(M + H)^+ = 684$ |
| 14.30 | 3-(2-carboxyethylaminocarbonyl)-phenyl | 2-methylphenyl | H | $(M + H)^+ = 668$ |
| 14.31 | 3-(2-carboxyethylaminocarbonyl)-phenyl | 3,4-difluorophenyl | H | $(M + H)^+ = 690$ |

TABLE V-continued

| Example | $R_a$ | $R_b$ | $R_c$ | physical data |
|---|---|---|---|---|
| 14.32 | 3(1H-tetrazol-5-ylmethylamino-carbonyl)-phenyl | 3,4-difluorophenyl | H | $(M + H)^+ = 700$ |
| 14.33 | 3-(2-carboxyethylaminocarbonyl)-phenyl | 2,4-difluorophenyl | H | $(M - H)^- = 688$ |
| 14.34 | 3-(1H-tetrazol-5-ylmethylamino-carbonyl)-phenyl | 2,4-difluorophenyl | H | $(M + H)^+ = 700$ |
| 14.35 | 3-[(E)-2-carboxyvinyl]-phenyl | phenyl | H | $(M + H)^+ = 609$ |
| 14.36 | 3-(2-carboxyethyl)-phenyl | phenyl | H | $(M + H)^+ = 611$ |
| 14.37 | 3-(N-carboxymethyl-methylamino)-phenyl | phenyl | H | $(M + H)^+ = 626$ |
| 14.38 | 4-(3-carboxypropyloxy)-phenyl | phenyl | H | $(M + H)^+ = 641$ |
| 14.39 | 4-(3-carboxypropyloxy)-2-methoxy-phenyl | 3-acetylamino-phenyl | H | $(M + H)^+ = 728$ |
| 14.40 | 4-(3-carboxypropyloxy)-2-methoxy-phenyl | 2-methoxyphenyl | H | $(M + H)^+ = 701$ |
| 14.41 | 4-(3-carboxypropyloxy)-phenyl | 2-methoxyphenyl | H | $(M + H)^+ = 671$ |
| 14.42 | 3-(2-carboxyethyloxy)-phenyl | 3-acetylphenyl | H | $(M + H)^+ = 669$ |
| 14.43 | 3-(2-carboxyethyloxy)-phenyl | 2-methylphenyl | H | $(M + H)^+ = 641$ |
| 14.44 | 3-carboxymethyloxy-phenyl | 4-isopropylphenyl | H | $(M + H)^+ = 655$ |
| 14.45 | 3-(2-carboxyethyloxy)-phenyl | 4-isopropylphenyl | H | $(M + H)^+ = 669$ |
| 14.46 | 4-(2-carboxyethylaminocarbonyl)-phenyl | 4-isopropylphenyl | H | $(M + H)^+ = 696$ |
| 14.47 | 3-(2-carboxyethylaminocarbonyl)-phenyl | 3-acetyphenyl | H | $(M + H)^+ = 696$ |
| 14.48 | 3-(1H-tetrazol-5-ylmethylamino-carbonyl)-phenyl | 2-methylphenyl | H | $(M + H)^+ = 678$ |
| 14.49 | 3-(1H-tetrazol-5-ylmethylamino-carbonylmethyl)-phenyl | 2-methylphenyl | H | $(M + H)^+ = 692$ |
| 14.50 | 3-(1H-tetrazol-5-ylmethylamino-carbonylmethyl)-phenyl | 4-isopropylphenyl | H | $(M + H)^+ = 720$ |
| 14.51 | 3-carboxymethyloxy-phenyl | 2-fluorophenyl | H | $(M + H)^+ = 631$ |
| 14.52 | 4-(3-carboxypropyloxy)-2-methoxy-phenyl | 2-fluorophenyl | H | $(M + H)^+ = 689$ |
| 14.53 | 3-(2-carboxyethyloxy)-phenyl | 2-fluorophenyl | H | $(M + H)^+ = 645$ |
| 14.54 | 4-(3-carboxypropyloxy)-2-methoxy-phenyl | 3-fluorophenyl | H | $(M + H)^+ = 689$ |
| 14.55 | 3-(2-carboxyethyloxy)-phenyl | 3-fluorophenyl | H | $(M + H)^+ = 645$ |
| 14.56 | 4-(3-carboxypropyloxy)-2-methoxy-phenyl | 4-fluorophenyl | H | $(M + H)^+ = 689$ |
| 14.57 | 3-(2-carboxyethyloxy)-phenyl | 4-fluorophenyl | H | $(M + H)^+ = 645$ |
| 14.58 | 4-(3-carboxypropyloxy)-2-methoxy-phenyl | 3,5-difluorophenyl | H | $(M + H)^+ = 707$ |
| 14.59 | 3-(2-carboxyethyloxy)-phenyl | 3,5-difluorophenyl | H | $(M + H)^+ = 663$ |
| 14.60 | 4-(3-carboxypropyloxy)-2-methoxy-phenyl | 3,4-difluorophenyl | H | $(M + H)^+ = 707$ |
| 14.61 | 3-(2-carboxyethyloxy)-phenyl | 3,4-difluorophenyl | H | $(M + H)^+ = 663$ |
| 14.62 | 4-(3-carboxypropyloxy)-2-methoxy-phenyl | 3-methylphenyl | H | $(M + H)^+ = 685$ |
| 14.63 | 3-(2-carboxyethyloxy)-phenyl | 3-methylphenyl | H | $(M + H)^+ = 641$ |
| 14.64 | 4-(2-carboxyethylaminocarbonyl)-phenyl | 4-fluorophenyl | H | $(M + H)^+ = 672$ |
| 14.65 | 4-(2-carboxyethylaminocarbonyl)-phenyl | 3-methylphenyl | H | $(M + H)^+ = 668$ |
| 14.66 | 3-(2-carboxyethylaminocarbonyl)-phenyl | 2-fluorophenyl | H | $(M + H)^+ = 672$ |
| 14.67 | 3-(2-carboxyethylaminocarbonyl)-phenyl | 3-fluorophenyl | H | $(M + H)^+ = 672$ |

TABLE V-continued

| Example | $R_a$ | $R_b$ | $R_c$ | physical data |
|---|---|---|---|---|
| 14.68 | 3-(2-carboxyethylaminocarbonyl)-phenyl | 4-fluorophenyl | H | $(M + H)^+ = 672$ |
| 14.69 | 3-(2-carboxyethylaminocarbonyl)-phenyl | 3,5-difluorophenyl | H | $(M + H)^+ = 690$ |
| 14.70 | 3-(2-carboxyethylaminocarbonyl)-phenyl | 3-methylphenyl | H | $(M + H)^+ = 668$ |
| 14.71 | 4-(3-carboxypropyloxy)-2-chloro-phenyl | 2-fluorophenyl | H | $(M + H)^+ = 695$ |
| 14.72 | 3-(1H-tetrazol-5-ylmethylamino-carbonyl)-phenyl | 4-fluorophenyl | H | $(M + H)^+ = 682$ |
| 14.73 | 3-(1H-tetrazol-5-ylmethylamino-carbonyl)-phenyl | 3,5-difluorophenyl | H | $(M + H)^+ = 700$ |
| 14.74 | 3-(1H-tetrazol-5-ylmethylamino-carbonyl)-phenyl | 3-methylphenyl | H | $(M + H)^+ = 678$ |
| 14.75 | 3-(1H-tetrazol-5-ylmethylamino-carbonylmethyl)-phenyl | 2-fluorophenyl | H | $(M + H)^+ = 696$ |
| 14.76 | 4-(3-carboxypropyloxy)-2-methoxy-phenyl | H | 4-chloro-phenyl | m.p. 145–159° C.<br>$(M + H)^+ = 707, 705$ |
| 14.77 | 4-(1H-tetrazol-5-ylmethylamino-carbonylmethyl)-phenyl | phenyl | H | m.p. 165° C.<br>$(M + H)^+ = 678$ |
| 14.78 | 3-(3-carboxypropyl)-phenyl | phenyl | H | $(M + H)^+ = 625$ |
| 14.79 | 5-(3-carboxypropyloxy)-2-methoxy-phenyl | phenyl | H | $(M - H)^- = 669$ |
| 14.80 | 3-(3-carboxypropyloxy)-2-methoxy-phenyl | phenyl | H | $(M + H)^+ = 671$ |
| 14.81 | 3-(2-carboxyethyl-carbonylamino)-phenyl | phenyl | H | $(M + H)^+ = 654$ |
| 14.82 | 4-(3-carboxypropyloxy)-2-methoxy-phenyl | 4-isopropylphenyl | H | $(M + H)^+ = 713$ |
| 14.83 | 4-(3-carboxypropyloxy)-2-methoxy-phenyl | 3,4-difluorophenyl | H | $(M - H)^- = 705$ |
| 14.84 | 4-(3-carboxypropyloxy)-2-methoxy-phenyl | 3-methyl | H | $(M + H)^+ = 685$ |
| 14.85 | 4-(3-carboxypropyloxy)-2-methoxy-phenyl | 2,4-difluorophenyl | H | $(M + H)^+ = 707$ |
| 14.86 | 4-(3-carboxypropyloxy)-2-methoxy-phenyl | 4-fluorophenyl | H | m.p. 179° C.<br>$(M + H)^+ = 689$ |
| 14.87 | 4-(3-carboxypropyloxy)-2-methoxy-phenyl | 3-fluorophenyl | H | m.p. 182° C.<br>$(M + H)^+ = 689$ |
| 14.88 | 3-(4-carboxypiperidino)-phenyl | phenyl | H | m.p. 166–178° C.<br>$(M + H)^+ = 666$ |
| 14.89 | 3-(3-carboxypropyloxy)-phenyl | phenyl | H | m.p. 144–151° C.<br>$(M + H)^+ = 641$ |
| 14.90 | 3-(4-carboxybut-1-inyl)-phenyl | phenyl | H | $(M + H)^+ = 635$ |
| 14.91 | 3-(4-carboxypiperidino)-phenyl | 3-fluorophenyl | H | $(M + H)^+ = 684$ |
| 14.92 | 3-(4-carboxypiperidino)-phenyl | 3,5-difluorophenyl | H | $(M + H)^+ = 702$ |
| 14.93 | 3-(2-carboxy-2-hydroxyethyl-aminocarbonyl)-phenyl | phenyl | H | $(M + H)^+ = 670$ |
| 14.94 | 4-(3-carboxypropyloxy)-2-methoxy-phenyl | 3,5-difluorophenyl | H | $(M + H)^+ = 707$ |
| 14.95 | 3-(2-carboxyethylcarbonylamino)-phenyl | 4-isopropylphenyl | H | $(M + H)^+ = 696$ |
| 14.96 | 3-(3-carboxypyrrolidin-1-yl)-phenyl | 3-fluorophenyl | H | $(M + H)^+ = 670$ |

EXAMPLE 15

2-[4-(3-Carboxypropyloxy)-2-methoxy-phenyl]-1-dehydroabietyl-5-(2-methylphenyl)-benzimidazole

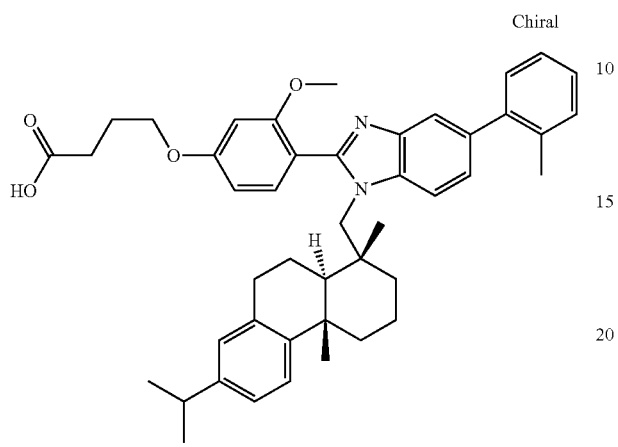

Prepared analogously to Example 14b by catalytic reduction of N-dehydroabietyl-2-nitro-4-(2-methylphenyl)-aniline on Raney nickel in ethyl acetate and subsequent reaction with 4-(3-carboxypropyloxy)-2-methoxy-benzaldehyde in DMF.

Yield: 38% of theory $C_{45}H_{52}N_2O_4$ (684.93)

Mass spectrum: $(M-H)^- = 683$

The compounds of Examples 15.1 to 15.151 listed in Tables VIa and VIb are prepared analogously to Example 15 using starting materials as described in Examples I to XIX or obtainable by methods known from the literature:

TABLE VIa

| Example | $R_a$ | $R_b$ | physical data |
|---|---|---|---|
| 15.1 | 3-(2-carboxyethylaminocarbonyl)-phenyl | 4-chlorophenyl | $(M + H)^+ = 690, 688$ |
| 15.2 | 3-(2-carboxyethylaminocarbonyl)-phenyl | pyridin-4-yl | $(M + H)^+ = 655$ |
| 15.3 | 4-(3-carboxypropyloxy)-2-methoxy-phenyl | pyridin-3-yl | $(M + H)^+ = 672$ |
| 15.4 | 4-(3-carboxypropyloxy)-2-methoxy-phenyl | 3-chlorophenyl | $(M + H)^+ = 707, 705$ |
| 15.5 | 4-(3-carboxypropyloxy)-2-methoxy-phenyl | 2-chlorophenyl | $(M - H)^- = 705, 703$ |
| 15.6 | 3-(1H-tetrazol-5-ylmethylaminocarbonyl)-phenyl | tetrahydrofuran-3-yl | $(M + H)^+ = 658$ |
| 15.7 | 3-(2-carboxyethylaminocarbonyl)-phenyl | tetrahydrofuran-3-yl | $(M + H)^+ = 648$ |
| 15.8 | 4-(2-carboxyethylaminocarbonyl)-phenyl | 4-trifluoromethoxy-phenyl | $(M + H)^+ = 738$ |
| 15.9 | 3-(1H-tetrazol-5-ylmethylaminocarbonylmethyl)-phenyl | 4-methylsulphonylamino-phenyl | $(M + H)^+ = 771$ |
| 15.10 | 4-(2-carboxyethylaminocarbonyl)-phenyl | 4-(4-chlorophenyl)-phenyl | $(M + H)^+ = 766, 764$ |
| 15.11 | 4-(2-carboxyethylaminocarbonyl)-phenyl | 3-chlorophenyl | $(M + H)^+ = 690, 688$ |
| 15.12 | 4-(3-carboxypropyloxy)-phenyl | 3-chlorophenyl | $(M + H)^+ = 677, 675$ |
| 15.13 | 3-(1H-tetrazol-5-ylmethylaminocarbonyl)-phenyl | pyridin-4-yl | $(M + H)^+ = 665$ |

TABLE VIa-continued

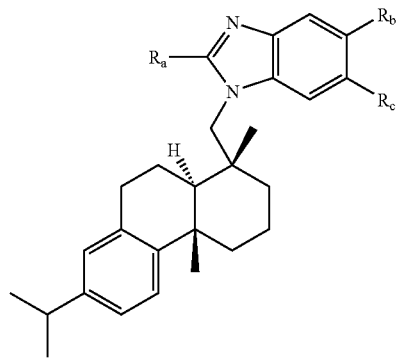

| Example | $R_a$ | $R_b$ | physical data |
|---|---|---|---|
| 15.14 | 3-(1H-tetrazol-5-ylmethylamino-carbonyl)-phenyl | 4-chlorophenyl | $(M + H)^+ = 700, 698$ |
| 15.15 | 3-(2-carboxyethylaminocarbonyl)-phenyl | pyridin-2-yl | $(M + H)^+ = 655$ |
| 15.16 | 4-(3-carboxypropyloxy)-2-methoxy-phenyl | 1H-imidazol-2-yl | $(M - H)^- = 659$ |
| 15.17 | 3-(2-carboxyethylaminocarbonyl)-phenyl | pyridin-3-yl | $(M + H)^+$ 655 |
| 15.18 | 3-(1H-tetrazol-5-ylmethylamino-carbonyl)-phenyl | pyridin-3-yl | $(M + H)^+ = 665$ |
| 15.19 | 3-(2-carboxyethylaminocarbonyl)-phenyl | 3-chlorophenyl | $(M + H)^+ = 690, 688$ |
| 15.20 | 3-(1H-tetrazol-5-ylmethylamino-carbonyl)-phenyl | 3-chlorophenyl | $(M + H)^+ = 700, 698$ |
| 15.21 | 3-(2-carboxyethylaminocarbonyl)-phenyl | 2-chlorophenyl | $(M + H)^+ = 690, 688$ |
| 15.22 | 3-(1H-tetrazol-5-ylmethylamino-carbonyl)-phenyl | 2-chlorophenyl | $(M + H)^+ = 700, 698$ |
| 15.23 | 3-(2-carboxyethylaminocarbonyl)-phenyl | 4-methoxyphenyl | $(M + H)^+$ 684 |
| 15.24 | 3-(1H-tetrazol-5-ylmethylamino-carbonyl)-phenyl | 4-methoxyphenyl | $(M + H)^+ = 694$ |
| 15.25 | 3-(2-carboxyethylaminocarbonyl)-phenyl | 3-trifluoromethoxy-phenyl | $(M + H)^+ = 738$ |
| 15.26 | 3-(1H-tetrazol-5-ylmethylamino-carbonyl)-phenyl | 3-trifluoromethoxy-phenyl | $(M - H)^- = 746$ |
| 15.27 | 3-(2-carboxyethylaminocarbonyl)-phenyl | 3-morpholinomethyl-phenyl | $(M + H)^+ = 753$ |
| 15.28 | 3-(1H-tetrazol-5-ylmethylamino-carbonyl)-phenyl | 3-morpholinomethyl-phenyl | $(M + H)^+ = 763$ |
| 15.29 | 3-(2-carboxyethylaminocarbonyl)-phenyl | 4-methylsulphonylamino-phenyl | $(M + H)^+ = 747$ |
| 15.30 | 3-(1H-tetrazol-5-ylmethylamino-carbonyl)-phenyl | 4-methylsulphonylamino-phenyl | $(M + H)^+$ 757 |
| 15.31 | 3-(2-carboxyethylaminocarbonyl)-phenyl | 4-morpholinomethyl-phenyl | $(M + H)^+ = 753$ |
| 15.32 | 3-(1H-tetrazol-5-ylmethylamino-carbonyl)-phenyl | 4-morpholinomethyl-phenyl | $(M + H)^+ = 763$ |
| 15.33 | 3-(2-carboxyethylaminocarbonyl)-phenyl | 2-morpholinomethyl-phenyl | $(M + H)^+ = 753$ |
| 15.34 | 3-(1H-tetrazol-5-ylmethylamino-carbonyl)-phenyl | 2-morpholinomethyl-phenyl | $(M + H)^+ = 763$ |
| 15.35 | 3-(2-carboxyethylaminocarbonyl)-phenyl | thiophen-2-yl | $(M + H)^+ = 660$ |
| 15.36 | 3-(1H-tetrazol-5-ylmethylamino-carbonyl)-phenyl | thiophen-2-yl | $(M + H)^+ = 670$ |
| 15.37 | 3-(2-carboxyethylaminocarbonyl)-phenyl | 4-aminocarbonyl-phenyl | $(M + H)^+ = 697$ |
| 15.38 | 3-(1H-tetrazol-5-ylmethylamino-carbonyl)-phenyl | 4-aminocarbonyl-phenyl | $(M + H)^+ = 707$ |
| 15.39 | 3-(2-carboxyethylaminocarbonyl)-phenyl | thiazol-2-yl | $(M + H)^+ = 661$ |
| 15.40 | 3-(1H-tetrazol-5-ylmethylamino-carbonyl)-phenyl | thiazol-2-yl | $(M + H)^+ = 671$ |
| 15.41 | 3-(2-carboxyethylaminocarbonyl)-phenyl | pyrazin-2-yl | $(M - H)^- = 654$ |
| 15.42 | 3-(1H-tetrazol-5-ylmethylamino-carbonyl)-phenyl | pyrazin-2-yl | $(M - H)^- = 664$ |

TABLE VIa-continued

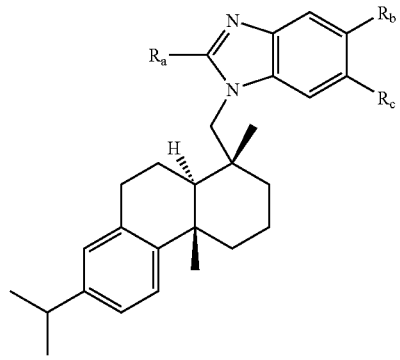

| Example | $R_a$ | $R_b$ | physical data |
|---|---|---|---|
| 15.43 | 3-(2-carboxyethylaminocarbonyl)-phenyl | pyrimidin-2-yl | $(M + H)^+$ 656 |
| 15.44 | 3-(1H-tetrazol-5-ylmethylamino-carbonyl)-phenyl | pyrimidin-2-yl | $(M + H)^+ = 666$ |
| 15.45 | 3-(2-carboxyethylaminocarbonyl)-phenyl | 5-chlorothiophen-2-yl | $(M + H)^+ = 696, 694$ |
| 15.46 | 3-(1H-tetrazol-5-ylmethylamino-carbonyl)-phenyl | 5-chlorothiophen-2-yl | $(M + H)^+ = 706, 704$ |
| 15.47 | 3-(2-carboxyethylaminocarbonyl)-phenyl | isopropyl | $(M + H)^+ = 620$ |
| 15.48 | 3-(1H-tetrazol-5-ylmethylamino-carbonyl)-phenyl | isopropyl | $(M - H)^- = 628$ |
| 15.49 | 3-(2-carboxyethylaminocarbonyl)-phenyl | tertbutyl | $(M + H)^+ = 634$ |
| 15.50 | 3-(1H-tetrazol-5-ylmethylamino-carbonyl)-phenyl | tert-butyl | $(M + H)^+ = 644$ |
| 15.51 | 3-(2-carboxyethylaminocarbonyl)-phenyl | cyclohexyl | $(M + H)^+ = 660$ |
| 15.52 | 3-(1H-tetrazol-5-ylmethylamino-carbonyl)-phenyl | cyclohexyl | $(M - H)^- = 668$ |
| 15.53 | 3-(2-carboxyethylaminocarbonyl)-phenyl | 5-methylthiophen-2-yl | $(M - H)^- = 672$ |
| 15.54 | 3-(1H-tetrazol-5-ylmethylamino-carbonyl)-phenyl | 5-methylthiophen-2-yl | $(M - H)^- = 682$ |
| 15.55 | 3-(2-carboxyethyloxy)-phenyl | 4-chlorophenyl | $(M + H)^+ = 661$ |
| 15.56 | 3-(2-carboxyethyloxy)-phenyl | pyridin-3-yl | $(M + H)^+ = 628$ |
| 15.57 | 3-carboxymethyloxy-phenyl | 3-chlorophenyl | $(M + H)^+ = 647$ |
| 15.58 | 3-(2-carboxyethyloxy)-phenyl | 3-chlorophenyl | $(M + H)^+ = 661$ |
| 15.59 | 3-(2-carboxyethyloxy)-phenyl | 2-chlorophenyl | $(M + H)^+ = 661$ |
| 15.60 | 3-carboxymethyloxy-phenyl | 1H-imidazol-2-yl | $(M + H)^+ = 603$ |
| 15.61 | 3-(2-carboxyethyloxy)-phenyl | 1H-imidazol-2-yl | $(M + H)^+ = 617$ |
| 15.62 | 3-carboxymethyloxy-phenyl | pyridin-4-yl | $(M + H)^+ = 614$ |
| 15.63 | 3-(2-carboxyethyloxy)-phenyl | pyridin-4-yl | $(M + H)^+ = 628$ |
| 15.64 | 3-(2-carboxyethyloxy)-phenyl | pyridin-2-yl | $(M + H)^+ = 628$ |
| 15.65 | 4-(3-carboxypropyloxy)-2,6-dimethoxy-phenyl | 2-chlorophenyl | $(M + H)^+ = 735$ |
| 15.66 | 3-(2-carboxyethylaminocarbonyl)-phenyl | 1H-imidazol-2-yl | $(M + H)^+ = 644$ |
| 15.67 | 3-(1H-tetrazol-5-ylmethylamino-carbonyl)-phenyl | 1H-imidazol-2-yl | $(M + H)^+ = 654$ |
| 15.68 | 3-(1H-tetrazol-5-ylmethylamino-carbonyl)-phenyl | pyridin-2-yl | $(M + H)^+ = 665$ |
| 15.69 | 4-(1H-tetrazol-5-ylmethylamino-carbonylmethyloxy)-phenyl | 4-chlorophenyl | $(M + H)^+ = 728$ |
| 15.70 | 3-(1H-tetrazol-5-ylmethylamino-carbonylmethyloxy)-phenyl | 4-chlorophenyl | $(M + H)^+ = 712$ |
| 15.71 | 3-(1H-tetrazol-5-ylmethylamino-carbonylmethyl)-phenyl | pyridin-3-yl | $(M + H)^+ = 679$ |
| 15.72 | 3-(1H-tetrazol-5-ylmethylamino-carbonylmethyl)-phenyl | 3-chlorophenyl | $(M + H)^+ = 712$ |
| 15.73 | 3-(2-carboxyethyloxy)-phenyl | 2-methoxyphenyl | $(M + H)^+ = 657$ |
| 15.74 | 3-carboxymethyloxy-phenyl | 2-methylsulphonylamino-phenyl | $(M + H)^+ = 706$ |
| 15.75 | 3-(2-carboxyethyloxy)-phenyl | 2-methylsulphonylamino-phenyl | $(M + H)^+ = 720$ |
| 15.76 | 4-(3-carboxypropyloxy)-2-methoxy-phenyl | 3-methoxyphenyl | $(M + H)^+ = 701$ |
| 15.77 | 3-(2-carboxyethyloxy)-phenyl | 3-methoxyphenyl | $(M + H)^+ = 657$ |
| 15.78 | 4-(3-carboxypropyloxy)-2-methoxy-phenyl | 4-methoxyphenyl | $(M + H)^+ = 701$ |

TABLE VIa-continued

| Example | $R_a$ | $R_b$ | physical data |
|---|---|---|---|
| 15.79 | 3-(2-carboxyethyloxy)-phenyl | 4-methoxyphenyl | (M + H)$^+$ = 657 |
| 15.80 | 3-caroxymethyloxy-phenyl | 3-trifluoromethoxy-phenyl | (M + H)$^+$ = 697 |
| 15.81 | 4-(3-carboxypropyloxy)-2-methoxy-phenyl | 3-trifluoromethoxy-phenyl | (M + H)$^+$ = 755 |
| 15.82 | 3-carboxyethyloxy)-phenyl | 3-trifluoromethoxy-phenyl | (M + H)$^+$ = 711 |
| 15.83 | 3-(N-carboxymethyl-methylamino)-phenyl | 4-methoxyphenyl | (M + H)$^+$ = 656 |
| 15.84 | 4-(2-carboxyethylaminocarbonyl)-phenyl | 3-trifluoromethoxy-phenyl | (M + H)$^+$ = 738 |
| 15.85 | 3-(2-carboxyethylaminocarbonyl)-phenyl | 2-methoxyphenyl | (M + H)$^+$ = 684 |
| 15.86 | 3-(2-carboxyethylaminocarbonyl)-phenyl | 2-methylsulphonylamino-phenyl | (M + H)$^+$ = 747 |
| 15.87 | 3-(2-carboxyethylaminocarbonyl)-phenyl | 3-methoxyphenyl | (M + H)$^+$ = 684 |
| 15.88 | 3-(1H-tetrazol-5-ylmethylamino-carbonyl)-phenyl | 2-methoxyphenyl | (M + H)$^+$ = 694 |
| 15.89 | 3-(1H-tetrazol-5-ylmethylamino-carbonyl)-phenyl | methylsulphonylamino-phenyl | (M + H)$^+$ = 757 |
| 15.90 | 3-(1H-tetrazol-5-ylmethylamino-carbonyl)-phenyl | 3-methoxyphenyl | (M + H)$^+$ = 694 |
| 15.91 | 3-carboxymethyloxy-phenyl | 4-trifluoromethoxy-phenyl | (M + H)$^+$ = 697 |
| 15.92 | 4-(3-carboxypropyloxy)-2-methoxy-phenyl | 4-trifluoromethoxy-phenyl | (M + H)$^+$ = 755 |
| 15.93 | 3-(2-carboxyethyloxy)-phenyl | 4-trifluoromethoxy-phenyl | (M + H)$^+$ = 711 |
| 15.94 | 3-(2-carboxyethyloxy)-phenyl | 2-trifluoromethoxy-phenyl | (M + H)$^+$ = 711 |
| 15.95 | 4-(3-carboxypropyloxy)-2-methoxy-phenyl | 3-methylsulphonylamino-phenyl | (M + H)$^+$ = 764 |
| 15.96 | 3-(2-carboxyethyloxy)-phenyl | 3-methylsulphonylamino-phenyl | (M + H)$^+$ = 720 |
| 15.97 | 3-carboxymethyloxy-phenyl | 2,4-difluorophenyl | (M + H)$^+$ = 649 |
| 15.98 | 4-(3-carboxypropyloxy)-2-methoxy-phenyl | 2,4-difluorophenyl | (M + H)$^+$ = 707 |
| 15.99 | 3-(2-carboxyethyloxy)-phenyl | 2-acetyphenyl | (M + H)$^+$ = 669 |
| 15.100 | 3-carboxymethyloxy-phenyl | 4-methylsulphonylamino-phenyl | (M + H)$^+$ = 706 |
| 15.101 | 4-(3-carboxypropyloxy)-2-methoxy-phenyl | 4-methylsulphonylamino-phenyl | (M + H)$^+$ = 764 |
| 15.102 | 3-(2-carboxyethyloxy)-phenyl | 4-methylsulphonylamino-phenyl | (M + H)$^+$ = 720 |
| 15.103 | 3-(N-carboxymethyl-methylamino) phenyl | 3-methylsulphonylamino-phenyl | (M + H)$^+$ = 719 |
| 15.104 | 3-(N-carboxymethyl-methylamino)-phenyl | 4-methylsulphonylamino-phenyl | (M + H)$^+$ = 719 |
| 15.105 | 4-(3-carboxypropyloxy)-2,6-dimethoxy-phenyl | 4-methylsulphonylamino-phenyl | (M + H)$^+$ = 794 |
| 15.106 | 3-(2-carboxyethylaminocarbonyl)-phenyl | 4-trifluoromethoxy-phenyl | (M + H)$^+$ = 738 |
| 15.107 | 3-(2-carboxyethylaminocarbonyl)-phenyl | 2-trifluoromethoxy-phenyl | (M + H)$^+$ = 738 |
| 15.108 | 3-(2-carboxyethylaminocarbonyl)-phenyl | 3-methylsulphonylamino-phenyl | (M + H)$^+$ = 747 |
| 15.109 | 3-(2-carboxyethylaminocarbonyl)-phenyl | 2-acetyphenyl | (M + H)$^+$ = 696 |

TABLE VIa-continued

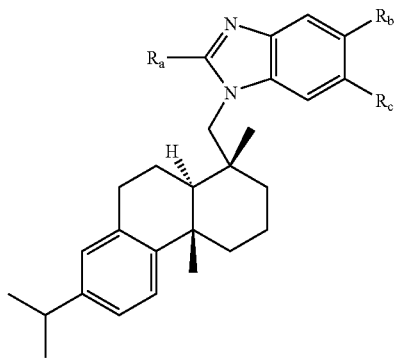

| Example | $R_a$ | $R_b$ | physical data |
|---|---|---|---|
| 15.110 | 3-(1H-tetrazol-5-ylmethylamino-carbonyl)-phenyl | 4-trifluoromethoxy-phenyl | $(M + H)^+ = 748$ |
| 15.111 | 4-(3-carboxypropyloxy)-2-chloro-phenyl | 4-trifluoromethoxy-phenyl | $(M + H)^+ = 759$ |
| 15.112 | 3-(1H-tetrazol-5-ylmethylamino-carbonyl)-phenyl | 2-trifluoromethoxy-phenyl | $(M + H)^+ = 748$ |
| 15.113 | 3-(1H-tetrazol-5-ylmethylamino-carbonyl)-phenyl | 3-methylsulphonylamino-phenyl | $(M + H)^+ = 757$ |
| 15.114 | 3-(1H-tetrazol-5-ylmethylamino-carbonyl)-phenyl | 2-acetyphenyl | $(M + H)^+ = 706$ |
| 15.115 | 3-(1H-tetrazol-5-ylmethylamino-carbonylmethyl)-phenyl | 3-methylsulphonylamino-phenyl | $(M + H)^+ = 771$ |
| 15.116 | 3-carboxymethyloxy-phenyl | methoxycarbonyl | $(M + H)^+ = 595$ |
| 15.117 | 3-carboxymethyloxy-phenyl | methyl | $(M + H)^+ = 551$ |
| 15.118 | 4-(3-carboxypropyloxy)-2-methoxy-phenyl | 4-acetylphenyl | m.p. 256–262° C. $(M + H)^+ = 699$ |
| 15.119 | 4-(3-carboxypropyloxy)-2-methoxy-phenyl | thiophen-2-yl | $(M − H)^− = 675$ |
| 15.120 | 4-(3-carboxypropyloxy)-2-methoxy-phenyl | 4-chlorophenyl | $(M + H)^+ = 707, 705$ |
| 15.121 | 3-carboxymethyloxy-phenyl | H | $(M + H)^+ += 537$ |
| 15.122 | 3-carboxymethyloxy-phenyl | methylaminocarbonyl | $(M + H)^+ += 594$ |
| 15.123 | 3-(1H-tetrazol-5-ylmethylamino-carbonylmethyl)-phenyl | 4-methoxyphenyl | $(M + H)^+ = 708$ |
| 15.124 | 4-(3-carboxypropyloxy)-2-methoxy-phenyl | 2-phenylethyl | m.p. 110–120° C. $(M + H)^+ = 699$ |
| 15.125 | 3-(3-carboxypyrrolidin-1-yl)-phenyl | phenyl | m.p. 165–190° C. $(M + H)^+ = 652$ |
| 15.126 | 4-(3-carboxypropyloxy)-2-methoxy-phenyl | cyclopentyl | $(M + H)^+ = 663$ |
| 15.127 | 4-(3-carboxypropyloxy)-2-methoxy-phenyl | 2-methylpropyl | $(M + H)^+ = 651$ |
| 15.128 | 4-(3-carboxypropyloxy)-2-methoxy-phenyl | 3-trifluoromethoxyphenyl | $(M + H)^+ = 755$ |
| 15.129 | 4-(3-carboxypropyloxy)-2-methoxy-phenyl | 4-trifluoromethoxyphenyl | $(M + H)^+ = 755$ |
| 15.130 | 4-(3-carboxypropyloxy)-2-methoxy-phenyl | 2-trifluoromethoxyphenyl | $(M + H)^+ = 755$ |
| 15.131 | 4-(3-carboxypropyloxy)-2-methoxy-phenyl | 3-methylsulphonylamino-phenyl | $(M + H)^+ = 764$ |
| 15.132 | 4-(3-carboxypropyloxy)-2-methoxy-phenyl | 4-methylsulphonylamino-phenyl | $(M + H)^+ = 764$ |
| 15.133 | 4-(3-carboxypropyloxy)-2-methoxy-phenyl | butyl | $(M + H)^+ = 651$ |
| 15.134 | 4-(3-carboxypropyloxy)-2-methoxy-phenyl | cyclohexyl | $(M + H)^+ = 677$ |
| 15.135 | 4-(3-carboxypropyloxy)-2-methoxy-phenyl | 2-methoxyphenyl | $(M + H)^+ = 701$ |
| 15.136 | 3-(3-carboxypropyloxy)-2-methoxy-phenyl | 3,5-difluorophenyl | $(M + H)^+ = 707$ |
| 15.137 | 3-(4-carboxypiperidino)-phenyl | 4-chlorophenyl | $(M + H)^+ = 702, 700$ |
| 15.138 | 3-(4-carboxypiperidino)-phenyl | 2-chlorophenyl | $(M + H)^+ = 702, 700$ |
| 15.139 | 3-(3-carboxypropyloxy)-2-methoxy-phenyl | 4-chlorophenyl | $(M + H)^+ = 707, 705$ |

TABLE VIa-continued

| Example | $R_a$ | $R_b$ | physical data |
|---|---|---|---|
| 15.140 | 3-(3-carboxypropyloxy)-2-methoxy-phenyl | 4-methylsulphonylamino-phenyl | $(M + H)^+ = 764$ |
| 15.141 | 3-(4-carboxypiperidino)-phenyl | 3-trifluoromethoxyphenyl | $(M + H)^+ = 750$ |
| 15.142 | 3-(2-carboxyethylcarbonylamino)-phenyl | 4-trifluoromethoxyphenyl | $(M + H)^+ = 738$ |
| 15.143 | 3-(2-carboxyethylcarbonylamino)-phenyl | 4-Clorphenyl | $(M + H)^+ = 690, 688$ |
| 15.144 | 3-(2-carboxyethylcarbonylamino)-phenyl | 4-methylsulphonylamino-phenyl | $(M + H)^+ = 747$ |
| 15.145 | 3-(3-carboxypyrrolidin-1-yl)-phenyl | 4-isopropylphenyl | $(M + H)^+ = 694$ |
| 15.146 | 3-(3-carboxypyrrolidin-1-yl)-phenyl | 3-trifluoromethoxyphenyl | $(M + H)^+ = 736$ |
| 15.147 | 3-(3-carboxypropyloxy)-2-methoxy-phenyl | 3-trifluoromethoxyphenyl | $(M + H)^+ = 755$ |
| 15.148 | 3-(3-carboxypyrrolidin-1-yl)-phenyl | 4-chlorophenyl | $(M + H)^+ = 688, 686$ |
| 15.149 | 3-(4-carboxypiperidino)-phenyl | 4-methylsulphonylamino-phenyl | $(M + H)^+ = 759$ |

TABLE VIb

| Example | $R_a$ | $R_b$ | physical data |
|---|---|---|---|
| 15.150 | 4-(3-carboxypropyloxy)-2-methoxy-phenyl | methyl | $(M + H)^+ = 609$ |
| 15.151 | 4-(3-carboxypropyloxy)-2-methoxy-phenyl | phenyl | $(M + H)^+ = 671$ |

Example 16

2-[3-(2-Carboxypropylaminocarbonyl)-phenyl]-1-dehydroabietyl-5-phenyl-benzimidazole

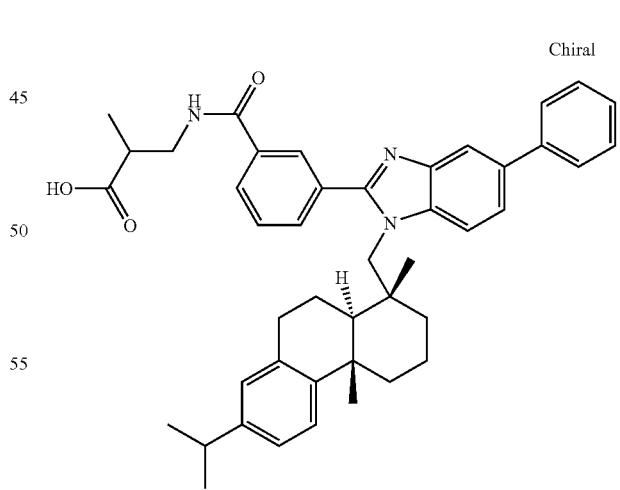

6.6 ml 1 N sodium hydroxide solution are added to a solution of 0.3 g (0.43 mmol) 2-[3-(2-ethoxycarbonyl-propylaminocarbonyl)-phenyl]-1-dehydroabietyl-5-phenyl-benzimidazole (prepared analogously to Example 15) in 6.6 ml of ethanol. The mixture is stirred for 15 hours at ambient temperature. The solution is evaporated down and combined with 6.6 ml 1 N hydrochloric acid. The precipitate is suction filtered and washed with water.

Yield: 0.18 g (63% of theory)
$C_{44}H_{49}N_3O_3$ (667.90)
Mass spectrum: $(M+H)^+=668$ The following compound was prepared analogously to Example 16:

Example 16.1

3-[(2-Carboxy-2-fluorethylaminocarbonyl)-phenyl]-1-dehydroabietyl-5-phenyl-benzimidazole

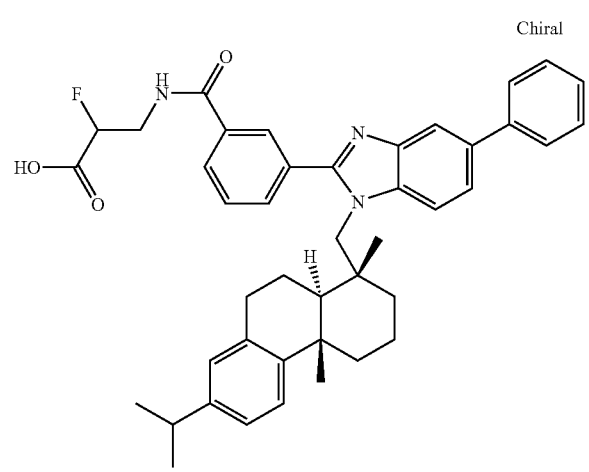

$C_{43}H_{46}FN_3O_3$ (671.86)
Mass spectrum: $(M+H)^+=672$

Example 17

2-(3-Carboxymethyloxy-4-nitrophenyl)-1-dehydroabietyl-5-phenyl-benzimidazole-hydrotrifluoroacetate

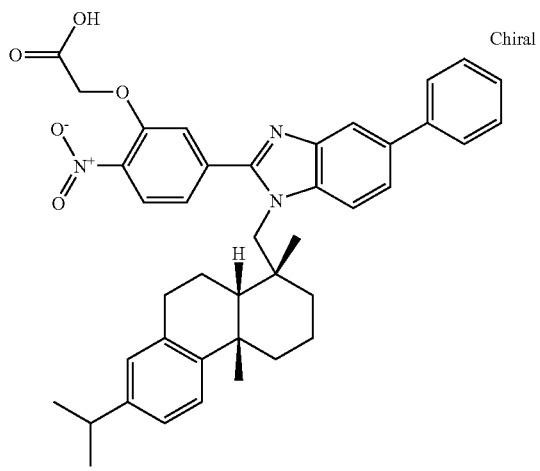

a. 2-(3-tert-butoxycarbonylmethyloxy-4-nitrophenyl)-1-dehydroabietyl-5-phenyl-benzimidazole 0.16 g (1.17 mmol) potassium carbonate are added to a solution of 0.7 g (1.17 mmol) 2-(3-hydroxy-4-nitrophenyl)-1-dehydroabietyl-5-phenyl-benzimidazole (prepared analogously to Example 15) in 20 ml DMF. The mixture is stirred for 30 minutes at ambient temperature and then 0.17 ml (1.17 mmol) tert-butyl chloroacetate are added dropwise. After 3.5 hours another 0.5 ml (3.4 mmol) tert-butyl chloroacetate are added. After 3 days' stirring at ambient temperature the reaction solution is evaporated down, combined with 100 ml of water and extracted with ethyl acetate. The combined organic phases are washed with saturated saline solution, dried over sodium sulphate and concentrated by evaporation.

Yield: 140 mg (196 mmol, 17% of theory)
$C_{45}H_{51}N_3O_5$ (713.92)
Mass spectrum: $(M+H)^+=714$ b. 2-(3-carboxymethyloxy-4-nitrophenyl)-1-dehydroabietyl-5-phenyl-benzimidazole-hydrotrifluoroacetate Prepared analogously to Example 3e by reacting 2-(3-tert-butoxycarbonylmethyloxy-4-nitrophenyl)-1-dehydroabietyl-5-phenyl-benzimidazole with trifluoroacetic acid in dichloromethane.

Yield: 93% of theory
$C_{41}H_{43}N_3O_5 \times C_2HF_3O_2$ (771.84)
Mass spectrum: $(M+H)^+=658$ The following compound was prepared analogously to Example 17:

Example 17.1

2-(5-Carboxymethyloxy-2-methoxy-phenyl)-1-dehydroabietyl-5-phenyl-benzimidazole-hydrotrifluoroacetate

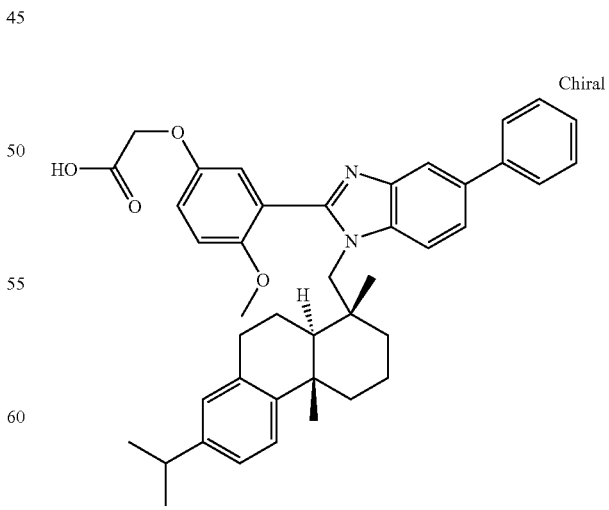

$C_{42}H_{46}N_2O_4$ (642.85)
Mass spectrum: $(M+H)^+=643$

Example 18

2-(3-Carboxymethylamino-phenyl)-1-dehydroabietyl-5-phenyl-benzimidazole

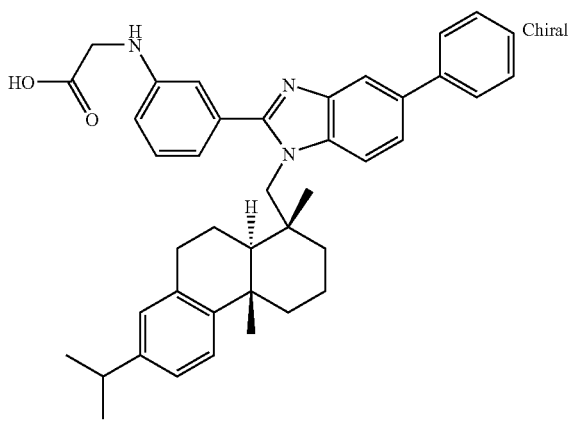

a. 2-(3-ethyloxycarbonylmethylamino-phenyl)-1-dehydroabietyl-5-phenyl-benzimidazole 0.16 g (0.29 mmol) 2-(3-aminophenyl)-1-dehydroabietyl-5-phenyl-benzimidazole (prepared analogously to Example 14) are dissolved in 2.5 ml DMF and at ambient temperature combined with 54 µl (0.32 mmol) N-ethyl-diisopropylamine. After 15 minutes 35 µl (0.32 mmol) ethyl bromoacetate are added. The mixture is stirred for 15 hours at ambient temperature and then for 5 hours at 50° C. Then 20 ml of water are added. It is extracted with ethyl acetate, the combined organic phases are washed with saturated saline solution, dried over sodium sulphate and evaporated to dryness. The residue is chromatographed on silica gel (ethyl acetate/petroleum ether=2:3).

Yield: 80 mg (43% of theory)
$C_{43}H_{49}N_3O_2$ (639.89)
Mass spectrum: $(M+H)^+=640$ b. 2-(3-carboxymethylamino-phenyl)-1-dehydroabietyl-5-phenyl-benzimidazole

Prepared analogously to Example 17 by saponifying 2-(3-ethyloxycarbonylmethylamino-phenyl)-1-dehydroabietyl-5-phenyl-benzimidazole with lithium hydroxide in methanol/THF (1:3).

Yield: 27% of theory
melting point: 180° C.
$C_{41}H_{45}N_3O_2$ (611.84)
Mass spectrum: $(M-H)^-=610$ The following compound was prepared analogously to Example 18:

Example 18.1

2-(2-Carboxyethylaminophenyl)-1-dehydroabietyl-5-phenyl-benzimidazole-hydrotrifluoroacetate

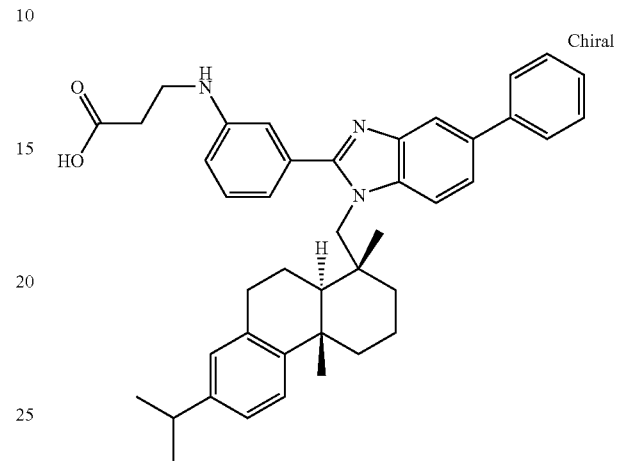

$C_{42}H_{47}N_3O_2$ (625.86)
Mass spectrum: $(M+H)^+=626$

Example 19

2-(2-Amino-5-carboxymethyloxy-phenyl)-1-dehydroabietyl-5-phenyl-benzimidazole

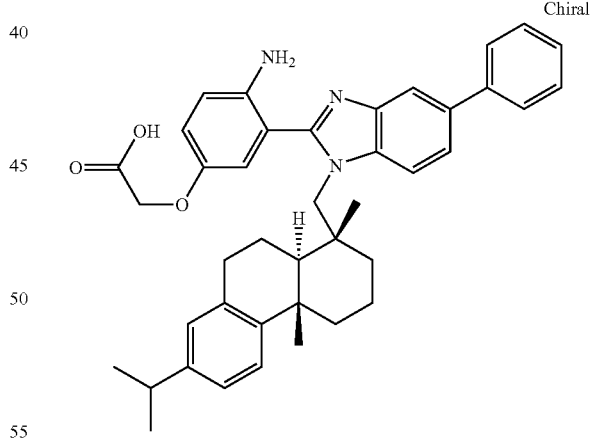

a. 2-(5-tert-butoxycarbonylmethyloxy-2-nitrophenyl)-1-dehydroabietyl-5-phenyl-benzimidazole Prepared analogously to Example 17a by reacting 2-(5-hydroxy-2-nitrophenyl)-1-dehydroabietyl-5-phenyl-benzimidazole with tert butyl chloroacetate in DMF.

Yield: 80% of theory
$C_{45}H_{51}N_3O_5$ (713.92)
Mass spectrum: $(M+H)^+=714$ b. 2-(2-amino-5-tert-butoxycarbonylmethyloxy-phenyl)-1-dehydroabietyl-5-phenyl-benzimidazole Prepared analogously to Example 6 by catalytic hydrogenation of 2-(5-tert-butoxycarbonylmethyloxy-2-nitrophenyl)-1-dehydroabietyl-5-phenyl-benzimidazole on Raney nickel.
Yield: 52% of theory
$C_{45}H_{53}N_3O_3$ (683.94)
Mass spectrum: $(M+H)^+=684$ c. 2-(2-amino-5-carboxymethyloxy-phenyl)-1-dehydroabietyl-5-phenyl-benzimidazole 125 mg (0.18 mmol) 2-(2-amino-5-tert-butoxycarbonylmethyloxy-phenyl)-1-dehydroabietyl-5-phenyl-benzimidazole are dissolved in 10 ml acetonitrile and combined successively with 110 mg (0.73 mmol) sodium iodide and 80 mg (0.73 mmol) trimethylsilane. The mixture is stirred for 5 hours at 40° C. Then the solvent is eliminated in vacuo. The residue is stirred twice with petroleum ether, suction filtered and in vacuo dried.
Yield: 100 mg (0.16 mol, 87% of theory)
melting point: >295° C. (decomp.)
$C_{41}H_{45}N_3O_3$ (627.83)
Mass spectrum: $(M+H)^+=628$ Example 20

2-(2-Acetylamino-5-carboxymethyloxy-phenyl)-1-dehydroabietyl-5-phenyl-benzimidazole

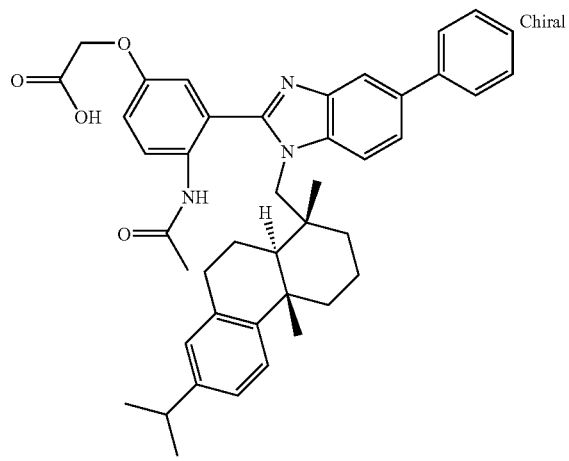

a. 2-(2-acetylamino-5-tert-butoxycarbonylmethyloxy-phenyl)-1-dehydroabietyl-5-phenyl-benzimidazole 350 mg (0.51 mmol) 2-(2-acetylamino-5-carboxymethyloxy-phenyl)-1-dehydroabietyl-5-phenyl-benzimidazole (Example 19b) are dissolved in 10 ml dichloromethane and combined with 0.17 ml (0.95 mmol) N-ethyl-diisopropylamine and 57 µl (0.6 mmol) acetic anhydride. The mixture is stirred for 3 hours at ambient temperature. Then saturated sodium hydrogen carbonate solution is added and the mixture is stirred for 15 minutes at ambient temperature. Then the reaction solution is extracted with dichloromethane. The combined organic phases are dried over sodium sulphate and evaporated to dryness. The residue is chromatographed on silica gel (ethyl acetate/petroleum ether=1:1).
Yield: 150 mg (0.2 mmol, 40% of theory)
$C_{47}H_{55}N_3O_4$ (725.98)
Mass spectrum: $(M+H)^+=726$ b. 2-(2-acetylamino-5-carboxymethyloxy-phenyl)-1-dehydroabietyl-5-phenyl-benzimidazole Prepared analogously to Example 3e by reacting 2-(2-acetylamino-5-tert-butoxycarbonylmethyloxy-phenyl)-1-dehydroabietyl-5-phenyl-benzimidazole with trifluoroacetic acid in dichloromethane.
Yield: 87% of theory
melting point: 179° C.
$C_{43}H_{47}N_3O_4$ (669.87)
Mass spectrum: $(M+H)^+=670$ Example 21

2-(5-Carboxymethyloxy-2-trifluoracetylamino-phenyl)-1-dehydroabietyl-5-phenyl-benzimidazole

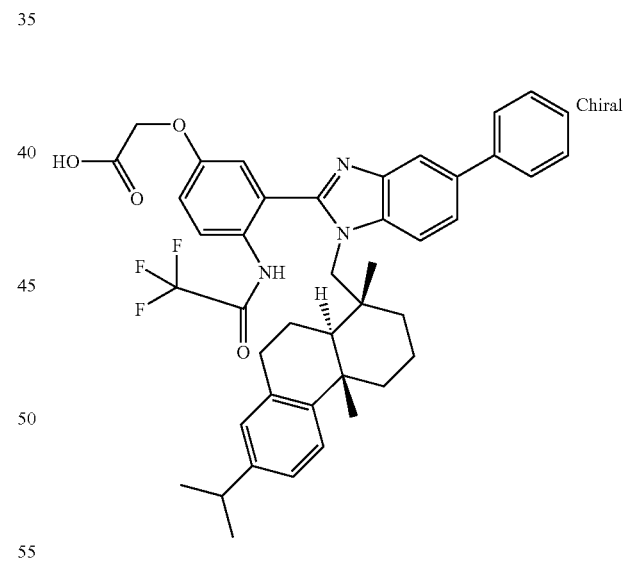

Prepared analogously to Example 20c by reacting 2-(5-tert-butoxycarbonylmethyloxy-2-trifluoracetylamino-phenyl)-1-dehydroabietyl-5-phenyl-benzimidazole with trifluoroacetic acid in dichloromethane.
Yield: 99% of theory
melting point: 168–172° C.
$C_{43}H_{44}F_3N_3O_4$ (723.84)
Mass spectrum: $(M+H)^+=724$

Example 22

2-(3-Carboxymethylcarbonylamino-phenyl)-1-dehydroabietyl-5-phenyl-benzimidazole

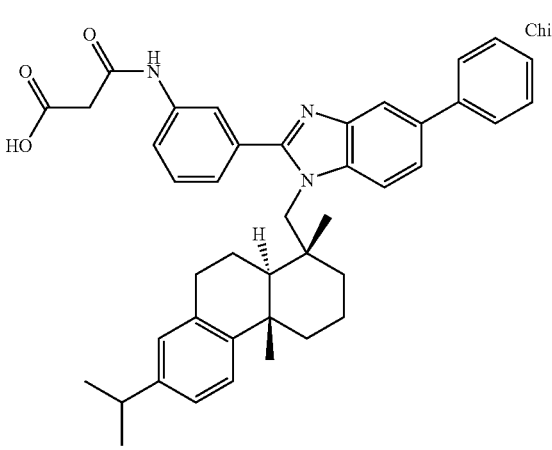

a. 2-(3-ethyloxycarbonylmethylcarbonylamino-phenyl)-1-dehydroabietyl-5-phenyl-benzimidazole Prepared analogously to Example 1a by reacting 2-(3-aminophenyl)-1-dehydroabietyl-5-phenyl-benzimidazole (prepared analogously to Example 14) with ethyl malonate chloride and triethylamine in dichloromethane.

Yield: 83% of theory $C_{44}H_{49}N_3O_3$ (667.90)

Mass spectrum: $(M+H)^+=668$ b. 2-(3-carboxymethylcarbonylamino-phenyl)-1-dehydroabietyl-5-phenyl-benzimidazole Prepared analogously to Example 16 by saponifying 2-(3-ethyloxycarbonylmethylcarbonylamino-phenyl)-1-dehydroabietyl-5-phenyl-benzimidazole with sodium hydroxide solution in THF.

Yield: (86% of theory)

melting point: 210–215° C.

$C_{42}H_{45}N_3O_3$ (639.85)

Mass spectrum: $(M+H)^+=640$

EXAMPLE 23

2-[3-(1H-tetrazol-5-ylmethylcarbonylamino)-phenyl]-1-dehydroabietyl-5-phenyl-benzimidazole

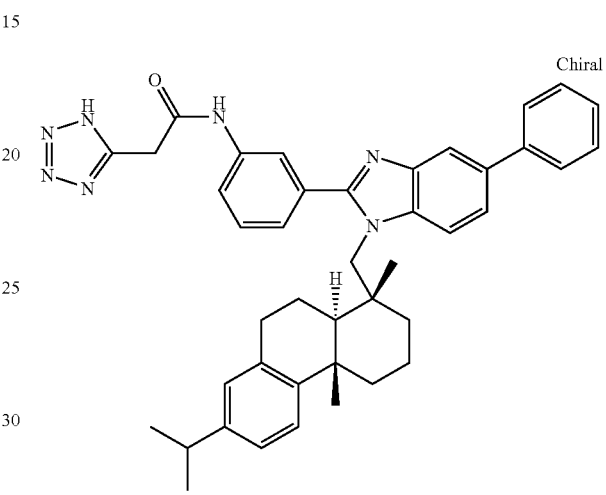

0.16 g (0.29 mmol) 2-(3-aminophenyl)-1-dehydroabietyl-5-phenyl-benzimidazole (prepared analogously to Example 14), 37 mg (0.29 mmol) 1H-tetrazol-5-ylacetic acid and 0.19 ml (1.73 mmol) N-methylmorpholine are dissolved in 20 ml dichloromethane and at −10° C. combined with 0.34 ml (0.58 mmol) propanephosphonic acid cycloanhydride solution (50 wt. % in ethyl acetate). The reaction solution is left to warm up to ambient temperature and stirred for 15 hours. Then the solvent is eliminated in vacuo and the residue is taken up in ethyl acetate. It is washed with saturated sodium hydrogen carbonate solution, 1 N hydrochloric acid and saturated saline solution. Then it is evaporated to dryness. The residue is stirred with ether, suction filtered and dried in vacuo.

Yield: 0.11 g (57% of theory)

melting point: 200° C.

$C_{42}H_{45}N_7O$ (663.87)

Mass spectrum: $(M+H)^+=664$

EXAMPLE 24

2-[4-(3-Methylaminocarbonyl-propyloxy)-2-methoxy-phenyl]-1-dehydroabietyl-5-phenyl-benzimidazole

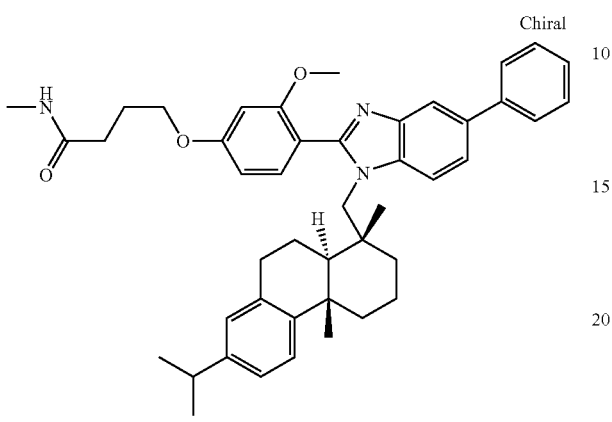

0.3 g (0.45 mmol) 2-[4-(3-carboxypropyloxy)-2-methoxyphenyl]-1-dehydroabietyl-5-phenyl-benzimidazole (Example 14.2) are dissolved in 10 ml DMF and combined with 0.18 g (0.55 mmol) TBTU, 0.22 ml (1.6 mmol) triethylamine and 30 mg (0.45 mmol) methylamine-hydrochloride. The mixture is stirred for 15 hours at ambient temperature. Then ethyl acetate is added and the mixture is washed with sodium hydroxide solution and saturated saline solution. The organic phase is dried over sodium sulphate and concentrated by evaporation. The residue is chromatographed on silica gel (dichloromethane/methanol=90:10->84:16).

Yield: 0.18 g (0.3 mmol, 58% of theory)
$C_{45}H_{53}N_3O_3$ (683.94)
Mass spectrum: $(M+H)^+=684$

EXAMPLE 25

2-(3-Aminocarbonylmethyloxy-phenyl)-1-dehydroabietyl-5-phenyl-benzimidazole

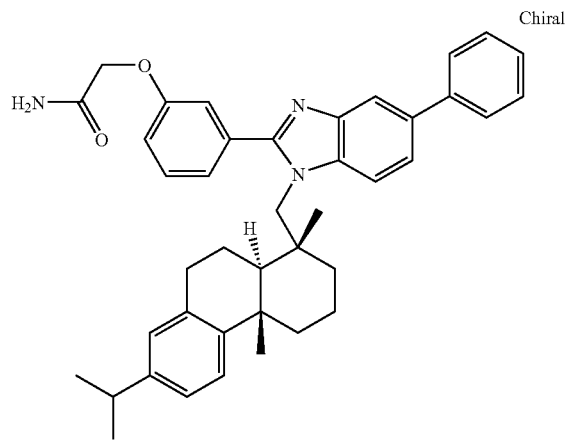

Prepared analogously to Example 24 by reacting 2-(3-carboxymethyloxy-phenyl)-1-dehydroabietyl-5-phenyl-benzimidazole (Example 14.1) with 0.5 M ammonia solution in dioxane and TBTU in THF.

Yield: 31% of theory
$C_{41}H_{45}N_3O_2$ (611.84)
Mass spectrum: $(M+H)^+=612$

EXAMPLE 26

2-[4-(3-Carboxypropyloxy)-2-methoxy-phenyl]-1-dehydroabietyl-6-fluoro-5-phenyl-benzimidazole

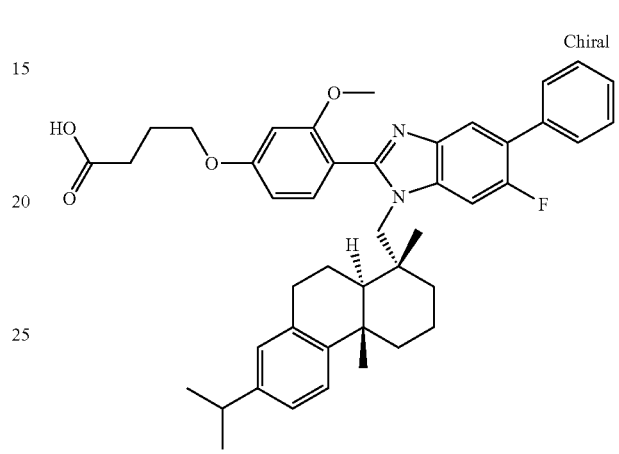

a. 5-bromo-2-dehydroabietylamino-4-fluoroaniline

Prepared analogously to Example 1b by reacting 1-bromo-2,4-difluoro-5-nitrobenzene [prepared according to J. Amer. Chem. Soc. 78 (1956) 2593–2596] with dihydroabietylamine and potassium carbonate in DMF and subsequent catalytic hydrogenation on Raney nickel in ethyl acetate.

Yield: 64% of theory
$C_{26}H_{34}BrFN_2$ (473.48)
Mass spectrum: $(M+H)^+=475, 473$ b. 5-bromo-1-dehydroabietyl-2-[4-(3-ethoxycarbonylpropyloxy)-2-methoxy-phenyl]-6-fluoro-benzimidazole Prepared analogously to Example 1c from 5-bromo-2-dehydroabietylamino-4-fluoroaniline and 4-(3-ethoxycarbonylpropyloxy)-2-methoxy-benzaldehyde in DMF.

Yield: 64% of theory
$C_{40}H_{48}BrFN_2O_4$ (719.74)
Mass spectrum: $(M+H)^+=721, 719$ c. 2-[4-(3-ethoxycarboxypropyloxy)-2-methoxyphenyl]-1-dehydroabietyl-6-fluoro-5-phenyl-benzimidazole Prepared analogously to Example 3d by reacting 5-bromo-1-dehydroabietyl-2-[4-(3-ethoxycarbonylpropyloxy)-2-methoxy-phenyl]-6-fluoro-benzimidazole with benzeneboric acid, tetrakis-(triphenylphosphine)-palladium(0) and potassium carbonate in water/dioxane.

Yield: 17% of theory
$C_{46}H_{53}FN_2O_4$ (716.95)
Mass spectrum: $(M+H)^+=717$ d. 2-[4-(3-carboxypropyloxy)-2-methoxy-phenyl]-1-dehydroabietyl-6-fluoro-5-phenyl-benzimidazole Prepared analogously to Example 16 by saponifying 2-[4-(3-ethoxycarboxypropyloxy)-2-methoxy-phenyl]-1-dehydroabietyl-6-fluoro-5-phenyl-benzimidazole with sodium hydroxide solution in THF/methanol (5:2).
Yield: 94% of theory
$C_{44}H_{49}FN_2O_4$ (688.89)
Mass spectrum: $(M+H)^+=689$

EXAMPLE 27

2-[4-(3-Carboxypropyloxy)-2-methoxy-phenyl]-1-dehydroabietyl-6-methoxy-5-phenyl-benzimidazole

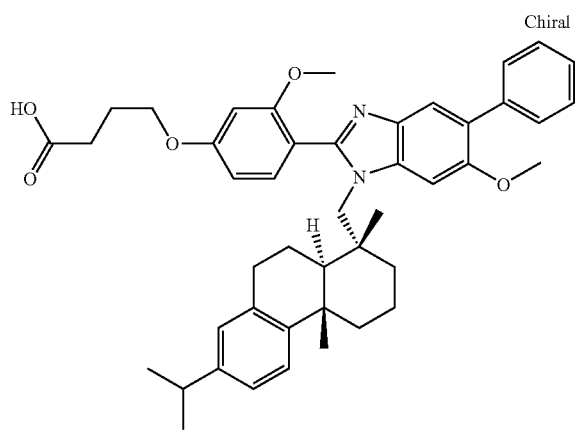

a. 1-bromo-2-dehydroabietylamino-2-methoxy-5-nitrobenzene 0.45 g (2.5 mmol) sodium methoxide solution (30 wt. % in methanol) are added dropwise within 5 minutes to a solution of 1.2 g (2.4 mmol) 1-bromo-2-dehydroabietylamino-2-fluoro-5-nitrobenzene (prepared analogously to Example 26a) in 30 ml of methanol. The mixture is stirred for 18 hours at ambient temperature and a further 0.45 g (2.5 mmol) sodium methoxide solution (30 wt. % in methanol) are added and the mixture is refluxed for 2.5 hours. Then the reaction solution is diluted with 600 ml of methanol at reflux temperature and heated for another 1.5 hours. The reaction solution is allowed to cool to ambient temperature, the solvent is eliminated in vacuo and the residue is triturated several times with water and sharply removed by suction filtering.
Yield: 1.22 g (98% of theory)
$C_{27}H_{35}BrN_2O_3$ (515.50)
Mass spectrum: $(M+H)^+=517, 515$ b. 5-bromo-1-dehydroabietyl-2-[4-(3-ethoxycarbonylpropyloxy)-2-methoxy-phenyl]-6-methoxy-benzimidazole Prepared analogously to Example 12a and 12b by catalytic hydrogenation of 1-bromo-2-dehydroabietylamino-2-methoxy-5-nitrobenzene on Raney nickel in methanol and subsequent reaction with 4-(3-ethoxycarbonylpropyloxy)-2-methoxy-benzaldehyde in DMF.

Yield: 28% of theory)
$C_{41}H_{51}BrN_2O_5$ (731.78)
Mass spectrum: $(M+H)^+=733, 731$ c. 2-[4-(3-ethoxycarbonylpropyloxy)-2-methoxy-phenyl]-1-dehydroabietyl-6-methoxy-5-phenyl-benzimidazole Prepared analogously to Example 26c by reacting 5-bromo-1-dehydroabietyl-2-[4-(3-ethoxycarbonylpropyloxy)-2-methoxy-phenyl]-6-methoxy-benzimidazole with benzeneboric acid, tetrakis-(triphenylphosphine)-palladium (0) and potassium carbonate in water/dioxane.
Yield: 51% of theory
$C_{47}H_{56}N_2O_5$ (728.98)
Mass spectrum: $(M+H)^+=729$ d. 2-[4-(3-carboxypropyloxy)-2-methoxy-phenyl]-1-dehydroabietyl-6-methoxy-5-phenyl-benzimidazole Prepared analogously to Example 26d by saponifying 2-[4-(3-ethoxycarbonylpropyloxy)-2-methoxy-phenyl]-1-dehydroabietyl-6-methoxy-5-phenyl-benzimidazole with sodium hydroxide solution in THF/methanol (2:1).
Yield: 95% of theory
$C_{45}H_{52}N_2O_5$ (700.93)
Mass spectrum: $(M+H)^+=701$

EXAMPLE 28

2-[4-(3-Carboxypropyloxy)-2-methoxy-phenyl]-1-dehydroabietyl-5-(trans-2-phenylethenyl)-benzimidazole

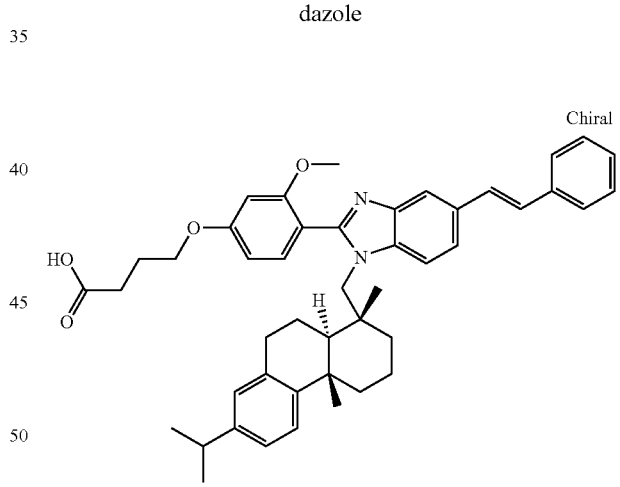

181 mg (0.36 mmol) 3-dihydroabietylamino-3-nitrostilbene (Example IV. 15) and 6.6 mg (0.017 mmol) 1,1-diethyl-4,4'-bipyridinium dibromide are dissolved in 2.5 ml dichloromethane and 0.3 ml of water and combined with a solution of 279 mg (1.6 mmol) sodium dithionite and 246 mg (1.8 mmol) potassium carbonate in 1.3 ml of water with vigorous stirring under a nitrogen atmosphere. The reaction mixture is stirred vigorously for 15 hours at 30° C. Then dichloromethane and water are added and the mixture is extracted with dichloromethane. The combined organic phases are dried over magnesium sulphate. The solvent is eliminated in vacuo. The crude product thus obtained is reacted analogously to Example 1c with 4-(3-carboxypropyloxy)-2-methoxybenzaldehyde in DMF.

Yield: 99 mg (39% of theory)
melting point: 59–72° C.
$C_{46}H_{52}N_2O_4$ (696.94)
Mass spectrum: (M+H)$^+$=697

The following compounds are obtained analogously to Example 28 using the starting materials described in Examples I to XIX:

EXAMPLE 28.1

2-[4-(3-Carboxypropyloxy)-2-methoxy-phenyl]-1-dehydroabietyl-5-(furan-3-yl)-benzimidazole

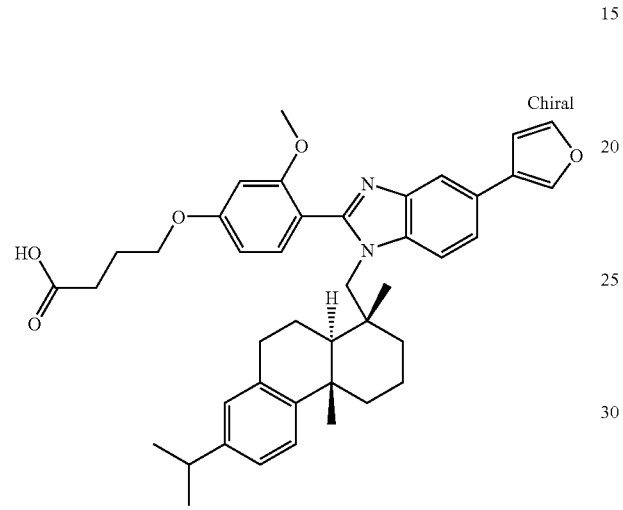

$C_{42}H_{48}N_2O_5$ (660.86)
Mass spectrum: (M+H)$^+$=661
$R_f$ value: 0.62 (silica gel, dichloromethane/methanol=9:1)

EXAMPLE 28.2

2-[4-(3-Carboxypropyloxy)-2-methoxy-phenyl]-1-dehydroabietyl-5-(5-chlorothiophen-2-yl)-benzimidazole

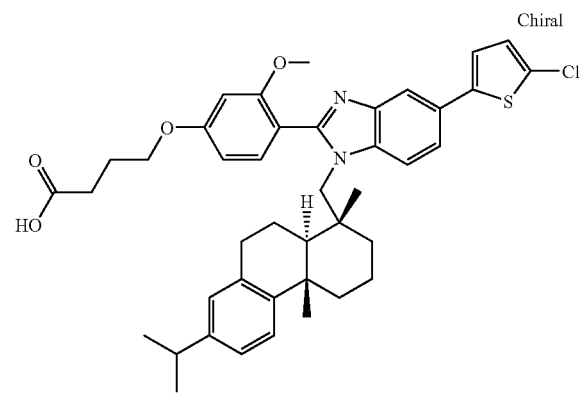

$C_{42}H_{47}ClN_2O_4S$ (711.37)
Mass spectrum: (M+H)$^+$=713, 711
$R_f$ value: 0.68 (silica gel, dichloromethane/methanol=9:1)

EXAMPLE 29

2-[4-(3-Carboxypropyloxy)-2-ethoxy-phenyl]-1-dehydroabietyl-5-phenyl-benzimidazole

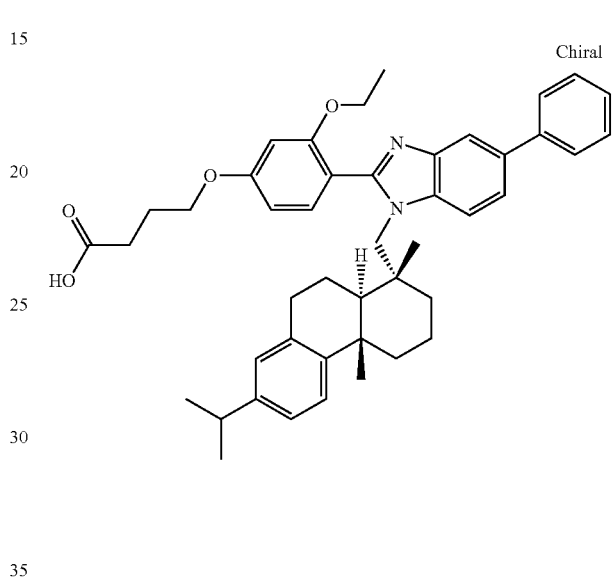

a. 2-[4-(3-ethoxycarbonylpropyloxy)-2-ethoxy-phenyl]-1-dehydroabietyl-5-phenyl-benzimidazole 150 mg (0.22 mmol) 2-[4-(3-ethoxycarbonyl-propyloxy)-2-hydroxy-phenyl]-1-dehydroabietyl-5-phenyl-benzimidazole (prepared analogously to Example 4) are dissolved in 2 ml DMF and combined with 21 μl (0.26 mmol)) ethyl iodide and 72 mg (0.52 mmol) potassium carbonate. The mixture is stirred for 15 hours at ambient temperature. Then the solvent is eliminated in vacuo and the residue is taken up in dichloromethane/water. It is extracted with dichloromethane. The combined organic extracts are dried over magnesium sulphate. Then the residue is evaporated to dryness.

Yield: 70 mg (45% of theory)
$C_{47}H_{56}N_2O_4$ (712.98)
Mass spectrum: (M+H)$^+$=713 b. 2-[4-(3-carboxypropyloxy)-2-ethoxy-phenyl]-1-dehydroabietyl-5-phenyl-benzimidazole Prepared analogously to Example 16 by saponifying 2-[4-(3-ethoxycarbonylpropyloxy)-2-ethoxy-phenyl]-1-dehydroabietyl-5-phenyl-benzimidazole with lithium hydroxide in THF/ethanol/water (8:8:1).

$C_{45}H_{52}N_2O_4$ (684.93)
Mass spectrum: (M+H)$^+$=685

EXAMPLE 30

2-[4-(3-Carboxypropylamino)-2-methoxy-phenyl]-1-dehydroabietyl-5-phenyl-benzimidazole

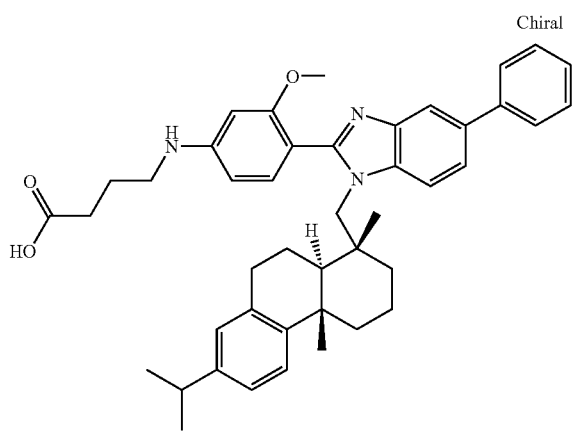

Chiral 270 mg (0.46 mmol) 2-(4-amino-2-methoxy-phenyl)-1-dehydroabietyl-5-phenyl-benzimidazole (prepared analogously to Example 4) are dissolved in 5 ml of dichloroethane under a nitrogen atmosphere and combined with 0.29 ml (0.46 mmol) of an aqueous 3-carboxypropionaldehyde solution and 412 mg (1.8 mmol) sodium triacetoxyborohydride. The mixture is stirred for 4 hours at ambient temperature and then the solvent is eliminated in vacuo. The residue is taken up in water/dichloromethane and extracted with dichloromethane. The combined extracts are dried over magnesium sulphate and evaporated to dryness. The residue is chromatographed on silica gel (dichloromethane/methanol=100:0–>0:20).

Yield: 11 mg (4% of theory)

$C_{44}H_{51}N_3O_3$ (669.91)

Mass spectrum: $(M+H)^+=670$ $R_f$ value: 0.41 (silica gel, dichloromethane/methanol=9:1)

EXAMPLE 31

Glucagon Binding Assay

The binding of the compounds of formula I according to the invention to the glucagon receptor was determined in a displacement binding assay which is based on the displacement of radiolabelled glucagon from a membrane fraction containing the recombinant human glucagon receptor.

The cDNA coding for the human glucagon receptor was cloned into the expression vector pcDNA3.1 (Invitrogene). BHK-21 cells (Baby Hamster Kidney C-13 cells, ATCC) were transfected with this construct and a stable cell clone was selected by treatment with G-418 (Gibco) and isolated.

A membrane fraction containing the recombinant human glucagon receptor was prepared from this clone by the following steps: Cells growing to confluence were detached using ice-cooled PBS buffer (Gibco) with 0.05% EDTA and suspended. After centrifugation the pellet was suspended in a buffer (10 mM tris/HCl, pH 7.2; 0.01 mM PMSF (phenylmethylsulphonylfluoride)) and incubated for 90 minutes at 4° C. After the lysate had been treated with a homogeniser (Dounce) cell nuclei and other cell constituents were separated off by centrifuging at 500 g for 10 minutes. The supernatant was then centrifuged at 100.000 g for 35 minutes to pellet the membranes. The precipitated membranes were suspended in incubation buffer (50 mM Tris/HCl, pH 7.2; 100 mM NaCl; 5 mM MgCl2; 1 mM EDTA; 0.2% BSA (bovine serum albumin)), aliquoted and stored at −80° C.

The displacement of glucagon was measured by incubating 20 μg of the membrane fraction, 50.00 cpm of 125I-glucagon (Amersham Pharmacia) and a concentration of the test substance for 60 minutes at 20° C. in a volume of 100 μl in incubation buffer in a microtitre plate (Optiplate, Packard Instruments). The bound radioligand was separated from the free ligand by filtration and washing using GC/B filters (Packard) on a Multiscreen vacuum filtration system (Millipore). The measurement was done using a Topcount scintillation counter (Packard). The binding in the presence of 1 μM of unlabelled glucagon (Wherl GmbH) was defined as non-specific. The data was analysed so as to determine the percentage of bound activity in the presence of a test substance. The results were calculated as % CTL. The compounds listed in Examples 1 to 27 yielded values less than or equal to 92% CTL at a test substance concentration of 10 μM.

The glucagon receptor antagonists according to the invention may be administered by oral, transdermal, inhalative or parenteral route. The compounds according to the invention are present as active ingredients in conventional formulations, for example in compositions consisting essentially of an inert pharmaceutical carrier and an effective dose of the active substance, such as for example tablets, coated tablets, capsules, lozenges, powders, solutions, suspensions, emulsions, syrups, suppositories, transdermal systems etc. An effective dose of the compounds according to the invention is between 1 and 100, preferably between 1 and 50, most preferably between 5–30 mg/dose for oral administration, and between 0.001 and 50, preferably between 0.1 and 10 mg/dose for intravenous or intramuscular administration. For inhalation, according to the invention, solutions containing 0.01 to 1.0, preferably 0.1 to 0.5% active substance are suitable. For administration by inhalation the use of powders is preferred. It is also possible to use the compounds according to the invention as a solution for infusion, preferably in a physiological saline or nutrient saline solution.

The compounds according to the invention may be used on their own or in conjunction with other active substances according to the invention, optionally also in conjunction with other pharmacologically active substances. Suitable preparations include for example tablets, capsules, suppositories, solutions, elixirs, emulsions or dispersible powders. Suitable tablets may be obtained, for example, by mixing the active substance(s) with known excipients, for example inert diluents such as calcium carbonate, calcium phosphate or lactose, disintegrants such as corn starch or alginic acid, binders such as starch or gelatine, lubricants such as magnesium stearate or talc and/or agents for delaying release, such as carboxymethyl cellulose, cellulose acetate phthalate, or polyvinyl acetate. The tablets may also comprise several layers.

Coated tablets may be prepared accordingly by coating cores produced analogously to the tablets with substances normally used for tablet coatings, for example collidone or shellac, gum arabic, talc, titanium dioxide or sugar. To achieve delayed release or prevent incompatibilities the core may also consist of a number of layers. Similarly the tablet coating may consist of a number or layers to achieve delayed release, possibly using the excipients mentioned above for the tablets.

Syrups or elixirs containing the active substances or combinations thereof according to the invention may additionally contain a sweetener such as saccharine, cyclamate, glycerol or sugar and a flavour enhancer, e.g. a flavouring such as vanilline or orange extract. They may also contain suspension adjuvants or thickeners such as sodium carboxymethyl cellulose, wetting agents such as, for example, condensation products of fatty alcohols with ethylene oxide, or preservatives such as p-hydroxybenzoates.

Solutions for injection are prepared in the usual way, e.g. with the addition of preservatives such as p-hydroxybenzoates, or stabilisers such as alkali metal salts of ethylenediamine tetraacetic acid, and transferred into injection vials or ampoules.

Capsules containing one or more active substances or combinations of active substances may for example be prepared by mixing the active substances with inert carriers such as lactose or sorbitol and packing them into gelatine capsules.

Suitable suppositories may be made for example by mixing with carriers provided for this purpose, such as neutral fats or polyethyleneglycol or the derivatives thereof.

A therapeutically effective daily dose is between 1 and 800 mg, preferably 10–300 mg per adult.

The Examples which follow illustrate the present invention without restricting its scope:

EXAMPLES OF PHARMACEUTICAL FORMULATIONS

| A) | Tablets | per tablet |
|---|---|---|
| | active substance of formula I | 100 mg |
| | lactose | 140 mg |
| | corn starch | 240 mg |
| | polyvinylpyrrolidone | 15 mg |
| | magnesium stearate | 5 mg |
| | | 500 mg |

The finely ground active substance, lactose and some of the corn starch are mixed together. The mixture is screened, then moistened with a solution of polyvinylpyrrolidone in water, kneaded, wet-granulated and dried. The granules, the remaining corn starch and the magnesium stearate are screened and mixed together. The mixture is compressed to produce tablets of suitable shape and size.

| B) | Tablets | per tablet |
|---|---|---|
| | active substance of formula IA | 80 mg |
| | corn starch | 190 mg |
| | lactose | 55 mg |
| | microcrystalline cellulose | 35 mg |
| | polyvinylpyrrolidone | 15 mg |
| | sodium-carboxymethyl starch | 23 mg |
| | magnesium stearate | 2 mg |
| | | 400 mg |

The finely ground active substance, some of the corn starch, lactose, microcrystalline cellulose and polyvinylpyrrolidone are mixed together, the mixture is screened and worked with the remaining corn starch and water to form a granulate which is dried and screened. The sodium-carboxymethyl starch and the magnesium stearate are added and mixed in and the mixture is compressed to form tablets of a suitable size.

| C) | Coated tablets | per coated tablet |
|---|---|---|
| | Active substance of formula IA | 5 mg |
| | Corn starch | 41.5 mg |
| | Lactose | 30 mg |
| | Polyvinylpyrrolidone | 3 mg |
| | Magnesium stearate | 0.5 mg |
| | | 80 mg |

The active substance, corn starch, lactose and polyvinylpyrrolidone are thoroughly mixed and moistened with water. The moist mass is pushed through a screen with a 1 mm mesh size, dried at about 45° C. and the granules are then passed through the same screen. After the magnesium stearate has been mixed in, convex tablet cores with a diameter of 6 mm are compressed in a tablet-making machine. The tablet cores thus produced are coated in known manner with a covering consisting essentially of sugar and talc. The finished coated tablets are polished with wax.

| D) | Capsules | per capsule |
|---|---|---|
| | Active substance of formula IA | 50 mg |
| | Corn starch | 268.5 mg |
| | Magnesium stearate | 1.5 mg |
| | | 320 mg |

The substance and corn starch are mixed and moistened with water. The moist mass is screened and dried. The dry granules are screened and mixed with magnesium stearate. The finished mixture is packed into size 1 hard gelatine capsules.

| E) | Ampoule solution | |
|---|---|---|
| | active substance of formula IA | 50 mg |
| | sodium chloride | 50 mg |
| | water for inj. | 5 ml |

The active substance is dissolved in water at its own pH or optionally at pH 5.5 to 6.5 and sodium chloride is added to make it isotonic. The solution obtained is filtered free from pyrogens and the filtrate is transferred under aseptic conditions into ampoules which are then sterilised and sealed by fusion. The ampoules contain 5 mg, 25 mg and 50 mg of active substance.

| F) | Suppositories | |
|---|---|---|
| | Active substance | 50 mg |
| | Solid fat | 1650 mg |
| | | 1700 mg |

The hard fat is melted. At 40° C. the ground active substance is homogeneously dispersed therein. It is cooled to 38° C. and poured into slightly chilled suppository moulds.

What is claimed is:
1. A compound of formula IA

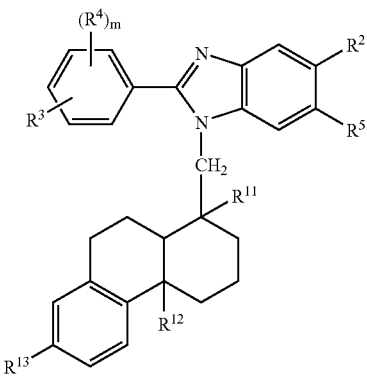

(IA)

wherein
- $R^{11}$, $R^{12}$ and $R^{13}$ each independently of one another denote hydrogen or halogen or $C_1$–$C_6$ alkyl, $C_1$–$C_6$ alkoxy, $C_1$–$C_6$ haloalkyl or $C_1$–$C_6$ haloalkoxy;
- $R^2$ denotes optionally substituted $C_6$–$C_{10}$ aryl or an optionally substituted, optionally benzo- or cyclohexano-fused 5- or 6-membered heteroaryl group, wherein the substituents are selected from the group consisting of halogen, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, piperidyl-$C_1$–$C_6$ alkyl, morpholino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonamino, carboxamido, carbox-$C_1$–$C_6$ alkylamido, carboxyl-$C_1$–$C_6$ alkyl, carboxyl-$C_1$–$C_6$ alkoxy, carboxyl, cyano, formyl, hydroxy and nitro, or
- denotes a carboxamide group of formula —CO—$NR^{21}R^{22}$, wherein
  - $R^{21}$ and $R^{22}$ each independently of one another denote hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, $C_6$–$C_{10}$ aryl, $C_6$–$C_{10}$ aryl-$C_1$–$C_6$ alkyl, $C_3$–$C_8$ cycloalkyl, $C_5$–$C_8$ cycloalkenyl, $C_3$–$C_8$ cycloalkyl-$C_1$–$C_6$ alkyl, $C_3$–$C_8$ cycloalkoxy-$C_1$–$C_6$ alkyl, $C_3$–$C_8$ cycloalkanoyl-$C_1$–$C_6$ alkyl, $C_5$–$C_8$ cycloalkenyl-$C_1$–$C_6$ alkyl, adamantyl-$C_1$–$C_6$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl; or
  - one of the groups $R^{21}$ and $R^{22}$ denotes hydrogen or $C_1$–$C_6$ alkyl, and the other denotes a group of formula —$(CH_2)_n$—X—Het wherein
- n denotes 0 or an integer from 1 to 6,
- X denotes CO or a single bond and if n is other than 0 may also denote O, S or NH, and
- Het denotes an optionally substituted 5- or 6-membered heterocyclic group; or
- $R^{21}$ and $R^{22}$ in each case form, with the enclosed nitrogen atom, an optionally substituted, optionally benzo- or cyclohexano-fused 5- or 6-membered heterocyclic ring, wherein one or two $CH_2$ groups may be replaced by O, S or $NR^{23}$, wherein
  - $R^{23}$ denotes hydrogen, $C_1$–$C_6$ alkyl or adamantyl-$C_1$–$C_6$ alkyl,
- $R^3$ denotes a group of formula A—(E)$_r$—Y— wherein
- A denotes a tetrazolyl group or a group of formula —$COOR^{31}$, wherein
  - $R^{31}$ denotes hydrogen or $C_1$–$C_6$ alkyl;
- E denotes a $C_1$–$C_6$ alkylenediyl or $C_2$–$C_6$ alkenylenediyl group or a $C_2$–$C_6$ alkynylenediyl group; and
- Y denotes O, CO—NH, NH—CO, NH, N($CH_3$) or a single bond; and
- r denotes 0 or 1;
- $R^4$ in each case independently of one another represent halogen, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl or di-($C_1$–$C_6$ alkyl)-amino-$C_1$–$C_6$ alkyl;
- $R^5$ denotes a hydrogen atom or $R^5$ together with the group $R^2$ forms a group of formula —N=CH—N=$CR^{51}$—, while
  - $R^{51}$ denotes a hydrogen atom or a group of formula —$NR^{52}R^{53}$, wherein
    - $R^{52}$ and $R^{53}$ each independently of one another denote hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, $C_6$–$C_{10}$ aryl, $C_6$–$C_{10}$ aryl-$C_1$–$C_6$ alkyl, $C_3$–$C_8$ cycloalkyl, $C_5$–$C_8$ cycloalkenyl or $C_3$–$C_8$ cycloalkyl-$C_1$–$C_6$ alkyl; and
- m denotes 0 or is an integer from 1 to 4.

2. The compound according to claim 1, wherein
- $R^{11}$, $R^{12}$ and $R^{13}$ each independently of one another denote hydrogen or $C_1$–$C_6$ alkyl;
- $R^2$ denotes optionally substituted phenyl, naphthyl, quinolinyl, isoquinolinyl or a 5- or 6-membered heteroaryl group selected from the group consisting of imidazolyl, pyrazolyl, furanyl, thiophenyl, thiazolyl, pyridyl, pyrimidyl and pyrazinyl,
wherein
the substituents are selected from the group consisting of fluorine, chlorine, bromine, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, phenyl, phenoxy, phenyl-$C_1$–$C_6$ alkyl, phenyl-$C_1$–$C_6$ alkoxy, $C_5$–$C_6$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, piperidyl-$C_1$–$C_6$ alkyl, morpholino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alkylamino, di-($C_1$–$C_6$ alkyl)-amino, $C_1$–$C_6$ alkanoylamino, $C_1$–$C_6$ alkylsulphonylamino, aminocarbonyl, $C_1$–$C_6$ carboxy-$C_1$–$C_6$ alkyl, carboxy-$C_1$–$C_6$ alkoxy, carboxl, cyano, formyl, hydroxy and nitro; or denotes a carboxamide group of formula —CO—$NR^{21}R^{22}$, wherein $R^{21}$ denotes hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, phenyl, $C_5$–$C_6$ cycloalkyl, $C_5$–$C_6$ cycloalkenyl, $C_5$–$C^8$ cycloalkyl-$C_1$–$C_6$ alkyl, $C_3$–$C_8$ cycloalkoxy-$C_1$–$C_6$ alkyl, $C_3$–$C_8$ cycloalkanoyl-$C_1$–$C_3$ alkyl, $C_5$–$C_8$ cycloalkenyl-$C_1$–$C_3$ alkyl, adamantyl-$C_1$–$C_2$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl or denotes phenyl-$C_1$–$C_6$ alkyl $R^{22}$ denotes hydrogen or $C_1$–$C_3$ alkyl, or one of the groups $R^{21}$ and $R^{22}$ denotes hydrogen or $C_1$–$C_3$ alkyl, and the other denotes a group of formula —(CH$_2$)$_n$—X—Het wherein n denotes an integer from 1 to 4, X denotes CO, O, S, NH or a single bond, and Het denotes an optionally substituted 5- or 6-membered heterocyclic group selected from among imidazolyl, pyrrolidinyl, pyrrolidonyl, morpholino, furanyl, thienyl, pyridyl and pyrimidyl, while the above-mentioned heterocyclic group may be substituted by nitro or di-($C_1$–$C_6$ alkoxy)-phenyl; or $R^{21}$ and $R^{22}$ in each case form, with the enclosed nitrogen atom, a tetrahydrobenzoazepino, morpholino, piperidyl, benzopiperidyl or cyclohexanopiperidyl group, $R^4$ in each case independently of one another represent fluorine, chlorine, bromine, $C_1$–$C_3$ alkyl, $C_1$–$C_3$ haloalkyl, $C_1$–$C_3$ alkoxy or $C_1$–$C_3$-haloalkoxy, $R^5$ denotes a hydrogen atom; and m is 0 or an integer from 1 to 2.

3. The compound according to claim 1 or 2, wherein $R^{11}$ and $R^{12}$ denote methyl, and $R^{13}$ denotes isopropyl.

4. The compound according claim 3, wherein $R^2$ denotes optionally substituted phenyl, naphthyl, quinolinyl, isoquinolinyl, imidazolyl, furanyl, thiophenyl, thiazolyl, pyridyl, pyrimidinyl, pyrazinyl, the substituents being selected from the group consisting of fluorine, chlorine, bromine, $C_1$–$C_3$ alkyl, trifluoromethyl, $C_1$–$C_3$ alkoxy, $C_1$–$C_3$ alkylthio, trifluoromethoxy, difluoromethoxy, $C_1$–$C_3$ alkanoyl, phenyl, phenoxy, phenyl-$C_1$–$C_2$ alkyl, phenyl-$C_1$–$C_2$ alkoxy, cyclohexyl, amino-$C_1$–$C_3$ alkyl, $C_1$–$C_3$ alkylamino-$C_1$–$C_3$ alkyl, di-($C_1$–$C_3$ alkyl)-amino-$C_1$–$C_3$ alkyl, piperidyl-$C_1$–$C_3$ alkyl, morpholino-$C_1$–$C_3$ alkyl, $C_1$–$C_3$ alkoxy-$C_1$–$C_3$ alkyl, di-($C_1$–$C_3$ alkoxy)-$C_1$–$C_3$ cyano-$C_1$–$C_3$ alkyl, hydroxy-$C_1$–$C_3$ alkyl, dihydroxy-$C_1$–$C_3$ alkyl, amino, $C_1$–$C_3$ alkylamino, di-($C_1$–$C_3$ alkyl)-amino, $C_1$–$C_3$ alkanoylamino, $C_1$–$C_3$ alkylsulphonylamino, aminocarbonyl, carboxy-$C_1$–$C_3$ alkyl, carboxy-$C_1$–$C_3$ alkoxy, carboxyl, cyano, formyl, hydroxy and nitro; or denotes a carboxamide group of formula —CO—$NR^{21}R^{22}$, wherein $R^{21}$ denotes hydrogen, $C_1$–$C_3$ alkyl, $C_2$–$C_6$ alkenyl, $C_6$–$C_{12}$ alkadienyl, 2,2,2-trifluoroethyl, $C_1$–$C_3$ alkoxy-$C_1$–$C_3$ alkyl, $C_1$–$C_3$ alkylthio-$C_1$–$C_3$ alkyl, phenyl, cyclohexyl, cyclohexenyl, cyclohexyl-$C_1$–$C_3$ alkyl, cyclohexyloxy-$C_1$–$C_3$ alkyl, cyclohexanoyl-$C_1$–$C_3$ alkyl, cyclohexenyl-$C_1$–$C_3$ alkyl, adamantyl-$C_1$–$C_2$ alkyl, amino-$C_1$–$C_3$ alkyl, $C_1$–$C_3$ alkylamino-$C_1$–$C_3$ alkyl, di-($C_1$–$C_3$ alkyl)-amino-$C_1$–$C_3$ alkyl, $C_1$–$C_3$ alkoxycarbonylamino-$C_1$–$C_3$ alkyl, cyano-$C_1$–$C_3$ alkyl, hydroxy-$C_1$–$C_3$ alkyl; or denotes phenyl-$C_1$–$C_6$ alkyl; or denotes a group of formula —(CH$_2$)$_n$—X—Het wherein n denotes an integer from 1 to 4, X denotes CO, O, S, NH or a single bond, and Het denotes imidazolyl, pyrrolidinyl, pyrrolidonyl, morpholino, furanyl, thienyl and pyridyl, which may be substituted by nitro or dimethoxyphenyl; and $R^{22}$ denotes hydrogen or methyl, or $R^{21}$ and $R^{22}$ in each case form, with the enclosed nitrogen atom, a tetrahydrobenzoazepino, morpholino, piperidyl, benzopiperidyl or cyclohexanopiperidyl group, $R^4$ in each case independently of one another represent fluorine, chlorine, bromine, $C_1$–$C_3$ alkyl, $C_1$–$C_3$ haloalkyl, $C_1$–$C_3$ alkoxy or $C_1$–$C_3$-haloalkoxy;

$R^5$ denotes a hydrogen atom; and m is 0 or an integer from 1 to 2.

5. A compound of formula IA1

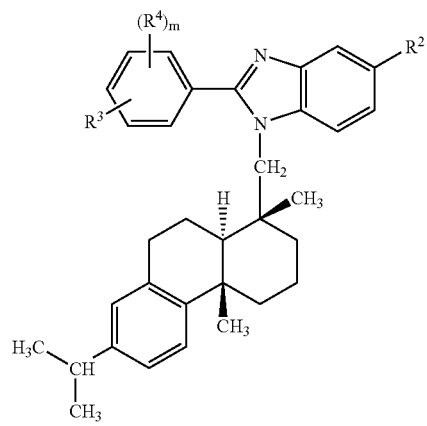

(IA1)

wherein $R^2$ denotes optionally substituted $C_6$–$C_{10}$ aryl or an optionally substituted, optionally benzo- or cyclohexano-fused 5- or 6-membered heteroaryl group, wherein the substituents are selected from the group consisting of halogen, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, piperidyl-$C_1$–$C_6$ alkyl, morpholino-$C_1$–$C_6$ alkyl, $C_1$–$C_6$ alkoxy-$C_1$–$C_6$ alkyl, di-($C_1$–$C_6$ alkoxy)-$C_1$–$C_6$ alkyl, cyano-$C_1$–$C_6$ alkyl, hydroxy-$C_1$–$C_6$ alkyl, dihydroxy-$C_1$–$C_6$ alkyl, amino, $C_1$–$C_6$ alky lamino, di-($C_1$–$C_6$ alkyl)-amino, $C_1$–$C_6$ alkanoylamino, $C_1$–$C_6$ alkylsulphonamino, carboxamido, carbox-$C_1$–$C_6$ alkylamido, carboxyl-$C_1$–$C_6$ alkyl, carboxyl-$C_1$–$C_6$ alkoxy, carboxyl, cyano, formyl, hydroxy and nitro, or denotes a carboxamide group of formula —CO—$NR^{21}R^{22}$, wherein $R^{21}$ and $R^{22}$ each independently of one another denote hydrogen, $C_1$–$C_6$ alkyl, $C_2$–$C_8$ alkenyl, $C_4$–$C_{12}$ alkadienyl, $C_1$–$C_6$ haloalkyl, $C_1$–$C_6$ alkoxy-$C_1$–$C_6$ alkyl, $C_1$–$C_6$ alkylthio-$C_1$–$C_6$ alkyl, $C_6$–$C_{10}$ aryl, $C_6$–$C_{10}$ aryl-$C_1$–$C_6$ alkyl, $C_3$–$C_8$ cycloalkyl, $C_5$–$C_8$ cycloalkenyl, $C_3$–$C_8$ cycloalkyl-$C_1$–$C_6$ alkyl, $C_3$–$C_8$ cycloalkoxy-$C_1$–$C_6$ alkyl, $C_3$–$C_8$ cycloalkanoyl-$C_1$–$C_6$ alkyl, $C_5$–$C_8$ cycloalkenyl-$C_1$–$C_6$ alkyl, adamantyl-$C_1$–$C_6$ alkyl, amino-$C_1$–$C_6$ alkyl, $C_1$–$C_6$ alkylamino-$C_1$–$C_6$ alkyl, di-($C_1$–$C_6$ alkyl)-amino-$C_1$–$C_6$ alkyl, $C_1$–$C_6$ alkoxycarbonylamino-$C_1$–$C_6$ alkyl, cyano-$C_1$–$C_6$ alkyl, hydroxy-$C_1$–$C_6$ alkyl; or one of the groups $R^{21}$ and $R^{22}$ denotes hydrogen or $C_1$–$C_6$ alkyl, and the other denotes a group of formula —$(CH_2)_n$—X—Het wherein n denotes 0 or an integer from 1 to 6, X denotes CO or a single bond and if n is other than 0 may also denote O, S or NH, and Het denotes an optionally substituted 5- or 6-membered heterocyclic group; or $R^{21}$ and $R^{22}$ in each case form, with the enclosed nitrogen atom, an optionally substituted, optionally benzo- or cyclohexano-fused 5- or 6-membered heterocyclic ring, wherein one or two $CH_2$ groups may be replaced by O, S or $NR^{23}$, wherein $R^{23}$ denotes hydrogen, $C_1$–$C_6$ alkyl or adamantyl-$C_1$–$C_6$ alkyl, $R^3$ denotes a group of formula A—$(E)_r$—Y— wherein

A denotes a tetrazolyl group or a group of formula —$COOR^{31}$, wherein $R^{31}$ denotes hydrogen or $C_1$–$C_6$ alkyl;

E denotes a $C_1$–$C_6$ alkylenediyl or $C_2$–$C_6$ alkenylenediyl group or a $C_2$–$C_6$ alkynylenediyl group; and Y denotes O, CO—NH, NH—CO, NH, $N(CH_3)$ or a single bond; and r denotes 0 or 1, $R^4$ in each case independently of one another represent halogen, $C_1$–$C_6$ alkyl, $C_1$–$C_6$ alkoxy, $C_1$–$C_6$ alkylthio, $C_1$–$C_6$ haloalkyl, $C_1$–$C_6$ haloalkoxy, $C_1$–$C_6$ alkanoyl, $C_6$–$C_{10}$ aryl, $C_6$–$C_{10}$ aryloxy, $C_6$–$C_{10}$ aryl-$C_1$–$C_6$ alkyl, $C_6$–$C_{10}$ aryl-$C_1$–$C_6$ alkoxy, $C_3$–$C_8$ cycloalkyl, amino-$C_1$–$C_6$ alkyl, $C_1$–$C_6$ alkylamino-$C_1$–$C_6$ alkyl or di-($C_1$–$C_6$ alkyl)-amino-$C_1$–$C_6$ alkyl;

and m denotes 0 or is and integer from 1 to 4.

6. The compound according to claims 1 or 5, wherein the group $R^3$ is in the meta or para position in relation to the benzimidazole group.

7. A Pharmaceutical composition comprising a compound according to claim 1 and a pharmacologically acceptable carrier.

8. The Pharmaceutical composition according to claim 7 further comprising an active substance selected from among: acarbose, beraprost, bexarotene, captopril, denileukin, diftitox, etanercept, farglitazar, fidarestat, glibenclamide, glibomuride, gliclazide, glimepiride, glipizide, glucagon, ilomastat, imidapril, insulin, lanreotide, linogliride, lisinopril, metformin, mexiletine, miglitol, minalrestat, mitiglinide, moxonidine, nafagrel, nateglinide, octreotide, orlistat, oxcarbazepine, pegvisomant, pioglitazone, ponalrestat, pramlintide, ramipril, repaglinide, rosiglitazone, sirolimus, sorbinil, tolrestat, troglitazone, voglibose, zenarestat and zopolrestat.

9. A method of treating diabetes mellitus comprising administering to a patient a pharmaceutically effective amount of a compound according to claim 1.

* * * * *